US012564858B2

(12) United States Patent
Wehler et al.

(10) Patent No.: US 12,564,858 B2

(45) Date of Patent: Mar. 3, 2026

(54) TREATMENT SYSTEM AND TREATMENT METHOD

(71) Applicant: Dürr Systems AG, Bietigheim-Bissingen (DE)

(72) Inventors: Sören Wehler, Ludwigsburg (DE); Frank Herre, Oberriexingen (DE); Dietmar Wieland, Waiblingen (DE); Elias-Joshua Nanninga, Bietigheim-Bissingen (DE); Daniel Ackermann, Ditzingen (DE); Uwe Ludwig, Karlsruhe (DE)

(73) Assignee: Dürr Systems AG, Bietigheim-Bissingen (DE)

( * ) Notice: Subject to any disclaimer, the term of this patent is extended or adjusted under 35 U.S.C. 154(b) by 542 days.

(21) Appl. No.: 17/763,189

(22) PCT Filed: Sep. 28, 2020

(86) PCT No.: PCT/DE2020/100830

§ 371 (c)(1),
(2) Date: Mar. 23, 2022

(87) PCT Pub. No.: WO2021/063444

PCT Pub. Date: Apr. 8, 2021

(65) Prior Publication Data

US 2023/0338980 A1 Oct. 26, 2023

(30) Foreign Application Priority Data

| | | |
|---|---|---|
| Sep. 30, 2019 | (DE) | 10 2019 215 079.9 |
| Sep. 30, 2019 | (DE) | 10 2019 215 080.2 |
| Jun. 19, 2020 | (DE) | 20 2020 103 567.3 |

(51) Int. Cl.

| | |
|---|---|
| *B05B 13/04* | (2006.01) |
| *B05B 1/04* | (2006.01) |

(Continued)

(52) U.S. Cl.

CPC ................ *B05D 1/02* (2013.01); *B05B 1/044* (2013.01); *B05B 1/262* (2013.01); *B05B 12/18* (2018.02);

(Continued)

(58) Field of Classification Search

USPC .... 118/309, 326, 634, 323, 321, 698, 62, 63

See application file for complete search history.

(56) References Cited

U.S. PATENT DOCUMENTS

| | | |
|---|---|---|
| 4,048,912 A | 9/1977 | Walker |
| 4,131,059 A | 12/1978 | Gustavsson |

(Continued)

FOREIGN PATENT DOCUMENTS

| | | | |
|---|---|---|---|
| CN | 103501918 A | 1/2014 | |
| CN | 105598986 B * | 5/2020 | ............. B25J 13/00 |

(Continued)

OTHER PUBLICATIONS

English Translation CN-105598986-B (Year: 2020).*

(Continued)

*Primary Examiner* — Yewebdar T Tadesse

(74) *Attorney, Agent, or Firm* — Hanley, Flight & Zimmerman, LLC

(57) ABSTRACT

Treatment system (100), having a treatment region for receiving workpieces (102) to be treated, and one or more operating devices (130) for performing one or more operations on the workpieces (102) to be treated.

26 Claims, 26 Drawing Sheets

(51) Int. Cl.

| | |
|---|---|
| ***B05B 1/26*** | (2006.01) |
| ***B05B 12/18*** | (2018.01) |
| ***B05B 13/02*** | (2006.01) |
| ***B05B 16/40*** | (2018.01) |
| ***B05D 1/02*** | (2006.01) |

(52) U.S. Cl.

CPC ...... *B05B 13/0221* (2013.01); *B05B 13/0452* (2013.01); *B05B 16/40* (2018.02)

(56) References Cited

U.S. PATENT DOCUMENTS

| | | | | |
|---|---|---|---|---|
| 4,893,398 | A | 1/1990 | Zimmer | |
| 5,090,361 | A * | 2/1992 | Ishibashi | B25J 18/005 118/313 |
| 7,255,747 | B2 * | 8/2007 | Ishikawa | H01L 21/6719 118/52 |
| 8,015,938 | B2 * | 9/2011 | Herre | B05B 16/40 362/147 |
| 10,478,847 | B2 | 11/2019 | Krumma et al. | |
| 10,782,676 | B2 | 9/2020 | Besik et al. | |
| 2005/0051085 | A1 | 3/2005 | Krogedal et al. | |
| 2010/0047465 | A1 | 2/2010 | Ansorge et al. | |
| 2010/0251963 | A1 | 10/2010 | Herre et al. | |
| 2011/0166708 | A1 | 7/2011 | Herre et al. | |
| 2011/0284343 | A1 | 11/2011 | Heim et al. | |
| 2012/0191243 | A1 | 7/2012 | Haas et al. | |
| 2014/0077002 | A1 | 3/2014 | Krayer | |
| 2016/0133489 | A1 * | 5/2016 | Janakiraman | H01L 21/67213 118/500 |
| 2017/0368579 | A1 | 12/2017 | Prus et al. | |
| 2018/0029230 | A1 | 2/2018 | Takahashi | |
| 2019/0054511 | A1 | 2/2019 | Alvarez | |
| 2019/0217869 | A1 | 7/2019 | Takeuchi et al. | |
| 2022/0339665 | A1 | 10/2022 | Wehler et al. | |

FOREIGN PATENT DOCUMENTS

| | | | |
|---|---|---|---|
| DE | 2540983 | | 4/1976 |
| DE | 2609030 | | 9/1977 |
| DE | 3506314 | | 1/1990 |
| DE | 69005404 | | 7/1994 |
| DE | 19610566 | | 9/1997 |
| DE | 29907779 | | 7/1999 |
| DE | 102004033640 | | 5/2005 |
| DE | 102004047924 | A1 | 4/2006 |
| DE | 202007008852 | | 11/2007 |
| DE | 102006032804 | | 1/2008 |
| DE | 102008056142 | | 5/2010 |
| DE | 102014102990 | | 9/2015 |
| DE | 102017116561 | A1 | 2/2018 |
| EP | 1785237 | A2 | 5/2007 |
| EP | 2095884 | | 9/2009 |
| EP | 2698232 | A2 | 2/2014 |
| EP | 3351352 | | 7/2018 |
| JP | 19830114761 | A | 6/1983 |
| JP | 19860200871 | A | 8/1986 |
| JP | 19870194457 | U | 8/1987 |
| JP | 2005040791 | A | 2/2005 |
| JP | 2005074299 | A | 3/2005 |
| JP | 2007118141 | A | 5/2007 |
| JP | 2012501820 | A | 1/2012 |
| JP | 2018001156 | A | 1/2018 |
| JP | 2018147179 | A | 9/2018 |
| KR | 100835740 | B1 | 6/2008 |
| WO | 2010099954 | A2 | 9/2010 |
| WO | 2016188626 | | 12/2016 |

OTHER PUBLICATIONS

European Patent Office, "Communication Pursuant to Article 94(3) EPC," issued in connection with European Patent Application No. 20789442.9, dated Jul. 25, 2024, 8 pages. Machine translated English.

European Patent Office, "Communication under Article 94(3) EPC," issued in connection with European Patent Application No. 20789443, dated Apr. 16, 2024, 8 pages. [English machine translation included].

International Searching Authority, "International Search Report," issued in connection with International Patent Application No. PCT/DE2020/100830, dated Feb. 8, 2021, 6 pages. [English translation included].

International Searching Authority, "Written Opinion," issued in connection with International Patent Application No. PCT/DE2020/100830, dated Feb. 8, 2021, 10 pages. [English translation included].

International Searching Authority, "International Preliminary Report on Patentability," issued in connection with International Patent Application No. PCT/DE2020/100830, issued Apr. 5, 2022, 12 pages. [English translation included].

International Searching Authority, "International Search Report," issued in connection with International Patent Application No. PCT/DE2020/100829, mailed Jan. 15, 2021, 7 pages. [English translation included].

International Searching Authority, "Written Opinion," issued in connection with International Patent Application No. PCT/DE2020/100829, mailed Jan. 15, 2021, 13 pages. [English translation included].

International Searching Authority, "International Preliminary Report on Patentability," issued in connection with International Patent Application No. PCT/DE2020/100829, issued Apr. 5, 2022, 15 pages. [English translation included].

European Patent Office, "Communication under Article 94(3) EPC," issued in connection with European Patent Application No. 20789443, dated Oct. 20, 2022, 10 pages. [English machine translation included].

European Patent Office, "Communication under Article 94(3) EPC," issued in connection with European Patent Application No. 20789442, dated Apr. 14, 2023, 6 pages. [English machine translation included].

European Patent Office, "Communication under Article 94(3) EPC," issued in connection with European Patent Application No. 20789442, dated Nov. 13, 2023, 6 pages. [English machine translation included].

European Patent Office, "Communication under Rule 94(3) EPC," issued in connection with European Patent Application No. 20789443, mailed Apr. 21, 2023, 10 pages. [English translation included].

United States Patent and Trademark Office, "Requirement for Restriction / Election," issued in connection with U.S. Appl. No. 17/763,190, dated Sep. 13, 2024, 6 pages.

United States Patent and Trademark Office, "Non-Final Office Action," issued in connection with U.S. Appl. No. 17/763,190, dated Jan. 13, 2025, 15 pages.

Korean Intellectual Property Office, "Request for the Submission of an Opinion," issued in connection with Korean Patent Application No. 10-2022-7014695, dated May 9, 2025, 37 pages. [English translation included.].

United States Patent and Trademark Office, "Notice of Allowance and Fee(s) Due," issued in connection with U.S. Appl. No. 17/763,190, dated Jul. 8, 2025, 20 pages.

* cited by examiner

TREATMENT SYSTEM AND TREATMENT METHOD

RELATED APPLICATION

This application is a national Phase of international application No. PCT/DE2020/100830 filed on Sep. 28, 2020, and claims the benefit of German applications No. 10 2019 215 080.2 filed on Sep. 30, 2019, No. 10 2019 215 079.9 filed on Sep. 30, 2019 and No. 20 2020 103 567.3 filed on Jun. 19, 2020, all of which are incorporated herein by reference in their entirety and for all purposes.

FIELD OF DISCLOSURE

The present invention relates to a treatment system for treating workpieces. A treatment system of this kind may be provided for example for treating vehicle bodies. In particular, a treatment system may serve for coating workpieces.

SUMMARY OF THE INVENTION

An object of the present invention is to provide a treatment system that is of simple construction and is usable flexibly and efficiently.

This object is achieved according to the invention by the independent device claim.

Further, an object of the present invention is to provide a treatment method by means of which workpieces are treatable simply, flexibly and efficiently.

This object is achieved according to the invention by the features of the independent method claim.

A treatment system for treating workpieces, in particular vehicle bodies, preferably comprises the following:

a treatment region for receiving workpieces to be treated;

one or more operating devices for performing one or more operations on the workpieces to be treated.

A treatment region is for example a processing region and/or coating region for processing and/or treating workpieces.

An operation to be performed on the workpieces that are to be treated is in particular a treatment operation such as a coating procedure and/or treatment procedure.

Optionally, the treatment system comprises at least one access region from which and/or at which the one or more operating devices are accessible, at least in an access condition of the one or more operating devices.

In particular, it may be provided for the one or more operating devices to be accessible from the at least one access region and/or at the at least one access region for a person, for example a worker, and/or mechanically, in particular for a maintenance machine and/or set-up machine, at least when the one or more operating devices are in an access condition.

An access condition of an operating device is in particular a condition other than a treatment condition and/or ready condition.

In an access condition of an operating device, it is in particular accessible for the purpose of performing maintenance operations and/or set-up operations. In particular, in an access condition of an operating device no operation is performable on a workpiece to be treated by means of this operating device.

A treatment condition of an operating device is in particular a condition in which, by means of this operating device, an operation such as a coating procedure and/or manipulation procedure is performed on a workpiece to be treated.

A ready condition of an operating device is in particular a condition in which this operating device is prepared for performing an operation on a workpiece to be treated.

In a treatment condition of an operating device, it is preferably arranged in the immediate vicinity of a workpiece to be treated, in order to be able to perform an operation on the workpiece to be treated.

In a ready condition of an operating device, it is preferably arranged at a greater spacing from a workpiece to be treated than in the treatment condition.

In an access condition of an operating device, it is preferably arranged at a spacing and/or remote from a workpiece to be treated. Preferably, when an operating device is in an access condition, it is arranged at least partly in an access region or adjoins the access region.

The at least one access region is preferably a region that is spatially different from and/or separated from the treatment region.

In particular, there is preferably no spatial overlap between the treatment region and the at least one access region.

The treatment region and the at least one access region are preferably sub-regions of a treatment space of the treatment system that is surrounded by a housing. The treatment space of the treatment system thus preferably comprises the treatment region and the at least one access region.

Here, the treatment space is delimited in particular by a base wall, in particular a person-accessible floor, a cover wall, in particular a filter cover, and two side walls arranged opposite one another. For the purpose of delimitation in the remaining two directions in space, either one or more further side walls, one or more locks, in particular air locks, one or more gates and/or doors, etc. are provided.

Preferably, one or more, in particular all, of the operating devices are arranged permanently or at least approximately permanently and/or entirely or at least approximately entirely within the treatment space, in particular between the two side walls. Preferably, the operating devices are not removed from the treatment space in order to perform maintenance operations and/or set-up operations.

Preferably, all the operating devices remain within the treatment space while treatment procedures are performed on the workpieces.

Preferably, all the operating devices are and/or remain permanently or at least approximately permanently and/or entirely or at least approximately entirely within a spatial region that is spanned by a minimum or maximum cross-sectional surface of the treatment space running perpendicularly to a direction of conveying when this cross-sectional surface is shifted in the direction of conveying up to both ends of the treatment space and/or the treatment system.

One or more, in particular all, of the access regions are preferably arranged such that they are always stationary, in particular being respectively arranged permanently in a single location, in particular within the treatment space.

Preferably, all the access regions are and/or remain permanently or at least approximately permanently and/or entirely or at least approximately entirely within a spatial region that is spanned by a minimum or maximum cross-sectional surface of the treatment space running perpendicularly to a direction of conveying when this cross-sectional surface is shifted in the direction of conveying up to both ends of the treatment space and/or the treatment system.

Preferably, the treatment system comprises a conveying device for conveying workpieces, wherein the workpieces are preferably conveyable, in a direction of conveying, into the treatment region, through the treatment region and/or out of the treatment region.

Here, it may be provided for the conveying device to enable conveying in a single direction, for example in the case of a treatment line of a treatment system. Moreover, by means of the conveying device it may be provided for the workpieces to be conveyable in different directions, for example through a supply opening and into a treatment space and, once treatment has been completed, out of the treatment space again through the same supply opening.

It may be favourable if the conveying device is arranged for conveying workpieces above a base wall of the treatment system, in particular above a person-accessible floor of the treatment system.

In particular, an upper side of the conveying device, at the top in relation to the direction of gravity, is arranged at the same level as a person-accessible floor of the treatment space of the treatment system.

As an alternative, it may be provided for an upper side of the conveying device, at the top in relation to the direction of gravity, to be arranged preferably at least approximately 30 cm, for example at least approximately 40 cm, in particular approximately 50 cm, above a person-accessible floor of the treatment space of the treatment system. By comparison with floor-level conveying devices that are conceivable as an alternative, this preferably allows an enlarged spatial region for a plurality of and/or additional operating devices to be created in the treatment space. Moreover, this preferably allows accessibility to the one or more operating devices to be optimised.

It may be favourable if the entire conveying device, in particular all of the components of the conveying device that are arranged in the treatment space, are arranged above the base wall, in particular above the person-accessible floor of the treatment space.

It may be favourable if the treatment system has a person-accessible floor that extends at different height levels. The person-accessible floor is in particular, or comprises, a grating floor.

Preferably, a normal level of the person-accessible floor is provided in an entry region and/or an exit region of the treatment space. The normal level is in particular a height level that makes it possible to step over the conveying device, in particular while observing existing safety regulations, for example while observing a maximum height of an obstacle formed by the conveying device of at most approximately 10 cm, in particular at most approximately 5 cm.

Preferably provided in the treatment region, in particular between the entry region and the exit region, is a sunken level in which the person-accessible floor is lower down than in the entry region and/or the exit region. In the region of the sunken level, the person-accessible floor is preferably at least approximately 300 mm, for example at least approximately 400 mm, in particular approximately 500 mm, lower down than the normal level.

Preferably, a connection is made between the sunken level and the normal level by one or more flights of stairs, wherein the one or more flights of stairs are for example arranged between two access regions, as seen in relation to a transverse direction extending horizontally and perpendicularly to the direction of conveying, in particular on either side of a conveying device for conveying the workpieces.

The treatment system may preferably comprise one or more guide elements for guiding a respective one or more operating devices.

It may be favourable if one or more, in particular all, of the guide elements of the treatment system are arranged above the base wall, in particular above the person-accessible floor of the treatment space. This can enable easy accessibility to the components of the treatment system.

The treatment system according to the invention preferably has a plurality of operating devices. In particular for the purpose of maintenance and/or set-up, for example for the purpose of cleaning, the operating devices are preferably accessible from an access region and/or at an access region.

It may be advantageous if a plurality of operating devices are accessible, at least in an access condition thereof, from a common access region and/or at a common access region.

Preferably, at least one access region is associated with a plurality of operating devices.

It may be favourable if each access region is respectively associated with a plurality of operating devices.

Further, it may be provided for each operating device to be associated with exactly one access region, wherein at least one operating device preferably shares a common access region with a respective one or more further operating devices.

One or more operating devices are preferably arranged and/or formed to be movable. In the present document, operating devices of this kind are designated in particular as movable operating devices.

The one or more operating devices are displaceable in particular along one or more guide elements, in particular in a guide direction.

Here, the guide direction is in particular at least approximately parallel with a direction of conveying of a conveying device.

It may be favourable if one or more operating devices are movable at least in part into the at least one access region and/or up to the at least one access region.

One or more operating devices are preferably movable as a whole and/or themselves movable.

It may be favourable if one or more operating devices each have an operational base that is arranged for example on a guide element. Further, the one or more operating devices preferably each comprise an operational element for performing an operation.

It may be favourable if the operational element and the operational base are connected to one another by means of an operational arm, in particular a robot arm.

Thus, the operational element is in particular arranged and/or formed such that it is movable in relation to the operational base.

It may be favourable if one or more operational elements of one or more operating devices are movable into the at least one access region and/or up to the at least one access region. The operational base and/or the operational arm of the respective operating device may in that case in particular be arranged outside and/or at a spacing from the access region.

It may be favourable if the operating devices are configured to be arranged in different access conditions, wherein in particular depending on a risk condition for a person, for example as a result of different electrical voltages at the operational element and/or the operational arm, mutually different parts and/or components of the respective operating device are accessible, in particular for a person, for example a worker, under different access conditions.

It may be favourable if one or more operating devices each have one or more operational elements, in particular one or more application elements and/or manipulating elements.

One or more of the operational elements, in particular all of the operational elements, are preferably movable in part and/or entirely and/or simultaneously and/or successively into the access region and/or are movable up to the access region, in particular in an access condition of the respective operating device.

An operational arm is movable and/or displaceable in particular multiaxially and/or with multiple joints. For example, a five-axis, six-axis or seven-axis configuration may be provided.

It may be favourable if the treatment system comprises one or more separating elements, in particular separating walls, by means of which the at least one access region and the treatment region are separated from one another.

The at least one access region and the treatment region are preferably connected to one another by means of one or more approach openings in one or more separating elements, in particular separating walls.

The one or more approach openings are in particular openings and/or recesses in the one or more separating elements.

As an alternative or in addition to a separating element taking the form of a separating wall, one or more nozzles, for example for the purpose of supplying an infeed air stream, may be provided. By means of one or more nozzles, it is possible in particular to produce an air curtain, for example an infeed air curtain, by means of which the treatment region and the at least one access region are separable from one another.

In particular, by means of one or more nozzles it is possible to prevent the air in the treatment region from flowing into the at least one access region.

By means of one or more nozzles, preferably an air curtain device of the treatment system is formed. Further, it may be provided for one or more nozzles to form a constituent part of an air curtain device.

In particular, it may be provided by means of one or more nozzles for an air curtain, for example an infeed air curtain, to be producible in one or more approach openings, in particular in order to prevent or at least minimise an exchange of air between the treatment region and the one or more access regions.

It may be advantageous if one or more nozzles, in particular slot nozzles, are arranged above, in relation to the direction of gravity, one or more approach openings, in particular directly and/or immediately and/or at a spacing above an upper edge of the one or more approach openings.

It may be favourable if the one or more nozzles are arranged and take a form such that a main direction of flow of a gas stream applied by means of the nozzles, in particular an air stream, forms an angle ($\alpha$, alpha) with the direction of gravity of at least approximately 5°, in particular at least approximately 10°, and/or at most approximately 30°, in particular at most approximately 20°.

Further, it may be provided for the nozzles to be arranged and/or formed variably, in particular variably and/or adjustably such that a main direction of flow of a gas stream applied by means of the nozzles, in particular an air stream, forms an adjustable angle ($\alpha$, alpha) with the direction of gravity, wherein the angle is preferably adjustable continuously or in discrete steps preferably between at least approximately 0° to approximately 90°, in particular between at least approximately 5° to approximately 45°.

It may be provided for one or more deflection elements to be arranged above, in relation to the direction of gravity, one or more approach openings, in particular directly above an upper edge of the one or more approach openings, wherein by means of the one or more deflection elements an air stream, in particular a recirculating air stream, that is guided through the treatment region, downwards in the direction of gravity, is configured to be diverted away from the one or more approach openings, in particular in a direction projecting away from the approach opening perpendicularly in relation to the direction of gravity.

A spacing between the one or more deflection elements and/or one or more nozzles on the one hand and the upper edge of the approach opening on the other is preferably at most approximately 700 mm, in particular at most approximately 500 mm, for example at most approximately 200 mm. As a result, a uniform flow can be produced in the region of the approach opening, preferably with low flow rates and low volumetric flow rates.

It may be favourable if an upper side of the deflection element, which deflects the air stream, forms an angle ($\beta$; beta) with the direction of gravity of at least approximately 10°, in particular at least approximately 20°, and/or at most approximately 40°, in particular at most approximately 30°.

In one embodiment of the invention, it may be provided for one or more nozzles, in particular slot nozzles, and one or more deflection elements to be arranged above, in relation to the direction of gravity, one or more approach openings, in particular directly above an upper edge of the one or more approach openings, wherein the one or more nozzles are arranged below the one or more deflection elements and/or open into a spatial region arranged directly below the one or more deflection elements.

One or more nozzles, in particular slot nozzles, preferably project into the treatment region or from the separating element in the direction of the treatment region. In particular, it may be provided for one or more nozzles, in particular slot nozzles, in themselves or together with a deflection element, to take a form that as seen in cross section is at least approximately triangular, wherein one side of the triangle preferably runs at least approximately horizontally.

In particular for the purpose of stabilising flow, it may be provided for the one or more approach openings and/or the one or more separating elements each to be provided with one or more diverting elements, in particular lateral diverting elements, by means of which an air flow is influenceable in an area surrounding the one or more approach openings.

One or more diverting elements, in particular lateral diverting elements, are preferably stabilising elements.

It may be favourable if one or more lateral diverting elements are arranged in particular adjacent to and/or at a spacing from one or more side edges of the one or more approach openings, wherein the one or more lateral diverting elements preferably extend at least approximately vertically and/or at least approximately perpendicularly to the separating element that receives or carries or supports the respective lateral diverting element.

In particular, in each case a lateral diverting element is arranged on each side of the one or more approach openings.

The lateral diverting elements are preferably arranged and/or formed at least approximately parallel to one another.

It may be provided for one or more deflection elements, one or more nozzles and/or one or more diverting elements, in particular lateral diverting elements, to be arranged at a spacing from the respective approach opening such that a separating element portion that surrounds the respective approach opening and is in particular planar is formed, along which and/or by means of which preferably an air stream that is as far as possible free of disruption and/or laminar is achievable.

It may be advantageous if the separating element portion takes a form that is in particular planar below the respective approach opening and/or is not provided with deflection elements and/or diverting elements. This can preferably prevent the formation of eddies.

The separating element portion extends away from the approach opening preferably on one side, on two sides, on three sides or on four sides, in particular upwards, downwards and/or to the side, in particular in each case over a distance of at least approximately 50 mm, preferably at least approximately 100 mm, for example at least approximately 150 mm. This can even out flow in the region of the approach opening.

An access region and/or a spatial region that is separated from the treatment region by means of at least one separating element, in particular at least one separating wall, is preferably a so-called cubicle or a maintenance tower, or forms a so-called cubicle or maintenance tower.

Preferably, by means of an air guiding device an air stream is suppliable in particular to the one or more access regions and/or to one or more nozzles, for example one or more nozzles of one or more air curtain devices.

It may be provided for a primary common air stream to be drawn in by suction and/or conditioned and then supplied as the air stream to each access region or air curtain device. As an alternative, it may be provided for each air stream to be provided and/or conditioned separately for each access region or air curtain device, independently of the other air streams.

Preferably, the air stream is dividable into two stream parts, wherein one stream part is suppliable to the access region and a further stream part is suppliable to one or more nozzles, for example one or more nozzles of an air curtain device. Here, the division may take place directly upstream of the access region and/or directly upstream of the one or more nozzles.

It may be favourable if the division is controllable manually or automatically, by open or closed-loop control, for example using one or more valves or dampers, wherein preferably a control device is provided that takes a form and is constructed for the purpose of controlling the division, by open or closed-loop control, in particular depending on air stream parameters in the treatment region of the treatment system and/or depending on air stream parameters of the air stream that is supplied and/or divided or to be divided.

An air stream, in particular an air stream part, is supplied to the access region for example by way of a filter cover or a plenum directly above the access region. As an alternative or in addition, an air stream, in particular an air stream part, may be supplied to the access region by way of one or more nozzles in the access region or above the access region, for example by means of one or more fan nozzles that take the form for example of a quarter cylinder and/or have a cross section that takes the form of a quarter circle and are arranged for example along one, two or more than two edge regions between a cover of the access region and a separating wall.

For example, two nozzles, in particular fan nozzles, arranged opposite one another may be arranged on either side of an admission opening and/or on either side of an approach opening.

As an alternative or in addition to nozzles taking the form of fan nozzles, one or more triangular nozzles may also be provided.

It may be favourable if a nozzle, in particular a fan nozzle, is arranged on the side of the separating element on which the approach opening is arranged. A further nozzle, in particular a further fan nozzle, is preferably arranged on the opposite side to this side.

In particular, the use of an air curtain device can preferably make it possible for there to be no need for a quantity of fresh air supplied for example to one or more access regions to be provided and/or supplied in addition to a quantity of fresh air for observing predetermined air parameters in the treatment region.

Rather, it may preferably be provided for a proportion of the fresh air stream by volume in a recirculating air stream by volume to be at most approximately 20%, in particular at most approximately 15%, for example at most approximately 10%, advantageously at most approximately 5%, when this is supplied to the one or more access regions. As a result, preferably a person-accessible atmosphere can be maintained in the one or more access regions, and preferably at the same time an explosive atmosphere can be avoided in the treatment region.

From an energy point of view, an optimum proportion of the fresh air stream by volume that is supplied is preferably between approximately 3% and approximately 7% of the recirculating air stream by volume.

Further, there may preferably result an advantage from an energy point of view if—depending on climatic conditions and the proportion of the fresh air stream by volume in the recirculating air stream by volume—a temperature difference between the temperature of the fresh air stream and the temperature of the recirculating air stream is at most approximately 7°, in particular at most approximately 5°, preferably at most approximately 2°.

As a concrete example of an access region it may be provided for it to have the following dimensions (in each case internal dimensions between the walls delimiting the access region):

Base surface area approximately 1 500 mm×1 500 mm;

Height approximately 2 500 mm.

A volumetric flow of air supplied to the respective access region is preferably at most approximately 400 $m^3/h$, for example at least approximately 600 $m^3/h$, and/or at most approximately 1 500 $m^3/h$, for example at most approximately 1 000 $m^3/h$. In particular, a volumetric flow of air of for example approximately 860 $m^3/h$ may be advantageous.

A flow rate of the air flowing through the access region is on average preferably at least approximately 0.1 m/s, for example at least approximately 0.14 m/s, and/or at most approximately 0.3 m/s, for example at most approximately 0.16 m/s. In particular, a flow rate of this kind of approximately 0.16 m/s may be advantageous.

It may be provided for the flow rate of the air flowing through the treatment region to be, in the centre and/or on average, preferably at least approximately 0.2 m/s, for example at least approximately 0.3 m/s, and/or at most approximately 0.6 m/s, for example at most approximately 0.5 m/s. In particular, a flow rate of this kind of approximately 0.35 to approximately 0.4 m/s may be advantageous.

In an edge region of the treatment region and/or upstream and/or downstream of the treatment region, as seen in relation to a direction of conveying, the flow rate of the air may be on average preferably at least approximately 0.1 m/s, for example at least approximately 0.2 m/s, and/or at most approximately 0.4 m/s, for example at most approximately 0.3 m/s. In particular, a flow rate of this kind of approximately 0.22 to approximately 0.28 m/s may be advantageous.

The average flow rate, in particular a sink rate, in the treatment region is preferably greater than the average flow rate, in particular a sink rate, in the access region or is at least approximately the same size as this, wherein in particular a deviation of at most approximately 5% is provided.

If there is a large difference in the sink rates upstream and downstream of the approach opening, a pressure difference is produced, which may result in the two air streams being mixed. An air curtain can preferably minimise this exchange and stabilise the separation of the recirculating air and the fresh air.

If the speed in the access region is low, the speed of the air forming the air curtain must preferably be accelerated in order to achieve optimum fluidic separation.

In order to optimise a separating effect between the treatment region and the access region, as an alternative or in addition to an air curtain it is possible to provide a mechanical closing device for at least partly or entirely closing or covering the approach opening. For example, a saloon-door solution or a sliding window are conceivable. Mechanical closing devices are preferably monitorable, in particular for the purpose of avoiding collisions of closing elements of the closing device with one or more operating devices if the operating devices are to be put into an access condition.

The temperatures of the air streams may influence the fluidic separation of the treatment region from the access region. Preferably, for this reason, the temperature difference between the air stream in the treatment region and the air stream in the access region is at most approximately 10 K, in particular at most approximately 7 K, for example at most approximately 4 K.

As the supply air for the one or more access regions there may be used for example air from a clean space, in which case the air should be for example in a temperature window of between approximately 16° C. and approximately 30° C. if the temperature of the recirculating air stream in the treatment region is approximately 23° C.

One or more approach openings may for example be always open.

As an alternative or in addition, it may be provided for one or more approach openings to be closable, in particular closable automatically, for example by a motor. Further, a manual opening and manual closing of one or more approach openings may be provided.

For the purpose of closing one or more approach openings, in particular one or more flaps and/or sliders may be provided.

It may be favourable if one or more approach openings are opened automatically if and/or as soon as one or more operating devices are put in an access condition and so are to be accessible from the access region that is associated with the respective approach opening.

Preferably, the respective approach opening is closed for example automatically if the operating device is once again put in a ready condition and/or treatment condition and/or leaves the access region.

One or more approach openings, in particular all of the approach openings, preferably have a height, in particular an inside clearance, that corresponds to at most approximately 40%, for example at most approximately 20%, preferably at most approximately 10%, of a height of the treatment space (in particular the spacing between the cover wall and the base wall).

A width, in particular an inside width, of one or more approach openings, in particular all of the approach openings, is preferably at most approximately 20%, in particular at most approximately 10%, for example approximately 5%, of a width of the treatment space (in particular the spacing between mutually opposite side walls in relation to a vertical longitudinal centre plane of the treatment space).

Preferably, a spatial region of the treatment space that is separated from the treatment region by means of one or more separating elements, and in particular comprises or forms the access region, extends over at least approximately 50% of, preferably at least approximately 80% of, in particular over the entire height of the treatment space (in particular the spacing between the base wall and the cover wall).

It may be favourable if one or more approach openings are arranged in one or more separating elements, in particular separating walls, wherein the one or more separating elements are arranged in particular transversely, preferably at least approximately perpendicularly, to a direction of conveying and/or a guide direction.

It may be favourable if the one or more approach openings are arranged in an upper half and/or a top or middle third of a treatment space of the treatment system.

In particular, it may be provided for one or more approach openings to be arranged at least approximately 80 cm, for example at least approximately 1 m, and/or at most approximately 1.80 m, for example at most approximately 1.50 m, above a person-accessible floor in the spatial region of the treatment space that is separated off by means of one or more separating elements, in particular in relation to a centre point of the respective approach opening. As a result, simple accessibility to one or more operational elements of one or more operating devices may be made possible for a person.

Thus, at least one access region is accessible, preferably from one or two directions running parallel to the direction of conveying and/or parallel to a guide direction, from the treatment region or an intermediate region arranged between the treatment region and the respective access region.

As an alternative or in addition, it may be provided for one or more approach openings to be arranged in one or more separating elements, in particular separating walls, wherein the one or more separating elements are arranged and/or oriented at least approximately parallel to the direction of conveying and/or guide direction.

One or more access regions, in particular all of the access regions, are preferably arranged closer to a vertical longitudinal centre plane of the treatment space or extend further in the direction of the vertical longitudinal centre plane of the treatment space than one or more, in particular all, of the guide elements for guiding the operating devices associated with the respective access region.

One or more separating elements, in particular all of the separating elements, that separate the at least one access region and the treatment region from one another are preferably arranged and/or positioned on an inner side, facing the treatment region, of the side walls surrounding the treatment space.

In particular, preferably at least one portion of at least one side wall forms one or more delimiting walls of one or more access regions. It may be favourable if one or more admission openings, in particular one or more doors, are arranged in the one or more portions of the respective side wall, such that the spatial region of the treatment space that is separated off from the treatment region by means of the one or more separating elements is accessible to one or more persons from outside the treatment space.

It may be advantageous if one or more approach openings each have a plurality of opening portions by means of which differently dimensioned free cross sections of the respective approach opening are clearable or blockable.

It may be favourable if, for example depending on a respective operating mode of the treatment system and/or depending on a respective maintenance operation or set-up operation at one or more operating devices, different opening portions of the one or more approach openings are clearable or blockable, in particular by means of one or more mechanical closing elements.

Further, it may be provided for one or more or all of the approach openings to be entirely blockable, for example by closing all of the opening portions of the respective approach opening.

The opening portions may be arranged or take a form such that they overlap one another, are adjacent to one another or are spaced from one another.

It may be advantageous if one or more or all of the opening portions are mechanically closable, for example by means of one or more flaps or doors that are configured to be put selectively into an open position or a blocking position for example by means of one or more hinges or sliding elements.

It may be favourable if, for the purpose of closing one or more or all of the opening portions of one or more or all of the approach openings, one or more or all of the blocking elements take a form that is partly or entirely transparent, in particular being configured such that a person can see through them. In particular, it may be provided for one or more or all of the blocking elements to be formed from or to comprise a transparent material. As an alternative or in addition, it may be provided for one or more or all of the blocking elements to take a form and/or to be arranged such that they are not entirely continuous, but for example interrupted, for example in the manner of a grating.

It may be advantageous if one or more or all of the blocking elements are configured to be put into a blocking position and/or an open position automatically, in particular driven autonomously and/or mechanically.

As an alternative or in addition, it may further be provided for one or more or all of the blocking elements to be configured to be put into a blocking position and/or an open position manually, in particular by a person, for example a worker.

A position of one or more or all of the blocking elements is preferably determinable by means of a control device, in particular being detectable by sensor.

In one embodiment of the invention, it may be provided for an admission opening through which a person, in particular a worker, has admission to the access region to be openable only if one or more or all of the blocking elements are arranged in a respectively predetermined position. Here, the admission opening may be closed or closable, in particular mechanically or pneumatically, in order to deny admission.

As an alternative or in addition to the variants above of one or more or all of the blocking elements, it may be provided for one or more or all of the blocking elements to be configured to be actuated by means of an operating device, in particular by means of the operating device to which access in the access region is to be given. For example, it may be provided for one or more or all of the blocking elements of an approach opening to be configured to be actuated, in particular to be pressed open or to be otherwise put into the open position, by means of an operating device if the operating device extends or projects through, or projects up to, the approach opening. The one or more or all of the blocking elements are preferably configured to be put back into a blocking position once the operating device is removed from the approach opening, wherein in particular they may take a form such that they are reset automatically.

It may be provided for an air curtain to be produced by one or more nozzles of the treatment system, wherein the treatment region and the at least one access region are separated from one another by means of the air curtain.

One or more persons may in particular enter the access region.

The one or more admission openings are preferably closable, in particular in order to avoid an undesired exchange of air with an area surrounding the treatment system.

In order to minimise an exchange of air and/or to minimise ingress of contaminants into the treatment space, it may be provided for the admission opening to comprise a lock and/or an air curtain and/or a compressed-air shower, etc.

The access region is preferably accessible to a person from outside a housing of the treatment system through the admission opening, in particular a door.

The access region is preferably accessible to one or more operating devices from the treatment region through an approach opening.

In particular, it is provided for the access region to be accessible to the one or more operating devices through the approach opening directly from the treatment region.

Further, it is in particular provided for the access region to be accessible to a person directly from outside the housing of the treatment system through the admission opening. In particular, the person need not step through the treatment region in order to reach the access region.

Preferably, the person does not come into contact with the atmosphere in the treatment region in order to reach the access region.

Preferably, the access region has a gas composition different from that of the treatment region, in particular a lower noxious substance load, for example a smaller concentration of solvents.

In the access region there prevails, preferably permanently, an atmosphere that enables a person to be there without protection, whereas in the treatment region there may be a higher concentration of noxious substances, in particular a higher concentration of solvents, in particular having a noxious substance load, for example a concentration of solvents, that is above a maximum concentration for the workplace.

In one embodiment of the invention, it may be provided for the treatment system to comprise an air supply device that comprises a recirculating air supply device and/or an infeed air supply device.

By means of the recirculating air supply device, a recirculating air stream is preferably guidable through the treatment region multiple times.

By means of the infeed air supply device, an infeed air stream, in particular a fresh air stream and/or a stream of factory air, is preferably suppliable to the one or more access regions.

In particular, by means of the infeed air supply device a respective infeed air stream is suppliable to each of the spatial regions of the treatment space that are separated off from the treatment region by means of one or more separating elements.

Generally, infeed air is for example fresh air and/or factory air. The infeed air may be supplied from the respective source (for example from the surrounding area and/or from the factory) unconditioned and/or unchanged. As an alternative, a conditioned supply may be made, in which case the infeed air is or has been conditioned, in particular by being heated, cooled, humidified and/or dehumidified.

By means of the air supply device, preferably a separate air supply is possible to the one or more access regions on the one hand and the treatment region on the other, as a result of which in particular different noxious substance loads, in particular concentrations of solvents, are obtainable, in particular adjustable. Preferably, with a view to optimum protection of persons, this can minimise the noxious substance load in the one or more access regions, whereas for example with a view to operating the treatment system in a manner saving as much energy as possible the air guided through the treatment region is recirculated multiple times and thus the purifying expense of purifying exhaust air and the conditioning expense of conditioning the total quantity of air required are minimised.

It may be advantageous if, by means of the recirculating air supply device, the recirculating air stream from the treatment region and the infeed air stream from the one or more access regions are combinable into a common stream.

By means of the recirculating air supply device, preferably at least a stream part by volume of the common stream is suppliable to the treatment region again as a recirculating air stream.

By means of exhaust air guidance, preferably a stream part by volume of the common stream is configured to be guided away as exhaust air.

In particular, preferably downstream of a stripping device for purifying the common stream, the common stream is divided into the stream part by volume, which is supplied to the treatment region again, and the exhaust air stream, which is purified, for example by means of a thermal purification device, in particular a regenerative thermal exhaust gas purification device, and is finally discharged to the surrounding area or re-used in another manner.

It may be advantageous if one or more, in particular all, of the access regions preferably have a respective inlet that is arranged in particular at an upper end, as seen in relation to the direction of gravity, of a spatial region of the treatment space that is separated off from the treatment region by means of the one or more separating elements.

The inlet is in particular arranged in a cover region, in particular a cover wall, of the treatment space.

Further, it may be provided for one or more, in particular all, of the access regions preferably to have a respective outlet that is arranged in particular at a bottom end, as seen in relation to the direction of gravity, of a spatial region of the treatment space that is separated off from the treatment region by means of the one or more separating elements.

One or more outlets preferably open into the treatment region, in particular at a base region of the treatment region that is at the bottom in relation to the direction of gravity.

It may be favourable if one or more or all of the outlets are adjustable in respect of a respective cross-sectional surface for the purpose of adjusting, in particular controlling by open or closed-loop control, a volumetric flow, for example manually or automatically by means of a valve device or flap device. As a result, it is possible in particular to exert an influence on the flow conditions and/or flow guidance within the treatment space and/or within the at least one access region.

As an alternative or in addition, it may be provided for one or more, in particular all, of the access regions not to have a separate outlet but for the one or more approach openings to form the single outlet for the air stream supplied to the access region.

Further, it may be provided for one or more outlets to open into a raw gas shaft that is arranged below the treatment space, such that it is in particular provided for the air guided away from the access regions to be combined with the air guided away from the treatment region only once it is downstream of the treatment region.

The cross sections of flow through the one or more approach openings and the one or more outlets are preferably selected such that the infeed air, in particular fresh air and/or factory air, that is supplied by way of the one or more inlets flows out of the access region and through the approach opening in the direction of the treatment region.

As an alternative or in addition, it may be provided for one or more approach openings and/or one or more outlets to be dimensioned, in particular in respect of the respective cross section of flow, such that, in particular with an appropriately selected volumetric flow of the infeed air stream that is supplied by way of one or more inlets through the one or more approach openings, an air stream that is directed out of the treatment region and into the access region is generated.

In a further development of the invention, it may be provided for the infeed air, in particular fresh air and/or factory air, that is guided through the access region to be used, preferably without or with only slight contamination by recirculating air that is guided through the treatment region, for flushing one or more guide elements, in particular in order to prevent and/or at least minimise an undesired egress of recirculating air in the region of the one or more guide elements.

The admixture of infeed air to the recirculating air is then produced in particular in the region of the one or more guide elements.

It may be advantageous if the treatment system comprises a control device by means of which the treatment system is configured to be selectively put in different operating modes.

In particular one or more of the following operating modes are provided:

a) A treatment mode, in which one or more workpieces are treated in the treatment region by means of one or more operating devices, during which preferably no persons are or may be in the one or more access regions. A treatment mode of this kind serves in particular to minimise the need for infeed air, in which case in particular the atmosphere prevailing in the access regions is not suitable for access to persons without protection.

b) A safety mode, in which one or more workpieces are treated in the treatment region by means of one or more operating devices, during which preferably at least one person is or may be in the one or more access regions. In a safety mode of this kind, preferably the atmosphere prevailing in the one or more access regions has a noxious substance load that is low enough for persons to be able to be there without protection. In particular, a noxious substance load below the maximum permitted workplace concentrations is provided in the one or more access regions when the treatment system is operated in safety mode. The treatment system may be put in safety mode in particular in order to be able to perform maintenance and/or set-up operations on the operating devices, while at the same time further treatment procedures are performed on the workpieces in the treatment region. Thus, preferably there is no need to entirely stop the treatment system in order to be able to perform at least individual maintenance and/or set-up operations at the one or more operating devices.

c) A maintenance mode, in which no treatment of workpieces takes place in the treatment region. The treatment system is preferably only put in maintenance mode if there is a need to maintain components or parts of the treatment system that, even in an access condition of one or more operating devices, are not accessible in an access region or from the access region.

For example, using one or more sensors that are arranged for example in or on one or more admission openings, and/or on the basis of a maintenance prediction and/or maintenance plan, the treatment system can automatically be put in the treatment mode, safety mode or maintenance mode as required, preferably by means of the control device.

Further, preferably one or more operating devices can preferably be deactivated automatically in respect of one or more functions by means of the control device, in particular if the respective operating device is put in the access condition. For example, it may be provided for a high voltage that is applied across an operational element of an operating device to be switched off when the operational element concerned approaches the access region and/or is moved into the access region.

It may be favourable if the treatment system has a plurality of safety regions and/or safety steps, which are graded in particular in respect of the degree of risk to a person and/or in respect of a likelihood of contamination and/or damage to a workpiece.

In particular, the safety regions and/or safety steps are arranged such that as the distance from the treatment region increases, an increasingly lower risk step is provided.

In the individual safety regions and/or safety steps, in particular different speeds of movement of the workpieces and/or the operating devices, in particular the operational elements, may be provided, wherein preferably the highest speeds of movement are permitted in the treatment region itself, whereas the lowest speeds are preferably permitted in the access region or other regions that are accessible to persons. In between there may be provided intermediate regions, in particular intermediate steps, in order to provide transitional regions between high and low speeds of movement.

It may be favourable if the treatment system comprises one or more automatic maintenance devices, in particular cleaning devices, for respectively one or more operational elements. In particular, an automatic cleaning device may be a so-called bell cleaner for cleaning one or more operational elements, wherein the one or more operational elements may be in particular application heads, in particular spray heads.

The one or more automatic maintenance devices, in particular cleaning devices, may be arranged for example outside the access region and/or on a side of the one or more separating elements, in particular separating walls, that faces the treatment space.

As an alternative or in addition, it may be provided for one or more automatic maintenance devices, in particular cleaning devices, to be arranged within the access region and/or on a side of the one or more separating elements, in particular separating walls, remote from the treatment space.

It may be advantageous if, in safety mode, one or more operating devices, in particular one or more operational elements of the one or more operating devices, are movable in particular successively in time into the at least one access region and/or up to the at least one access region such that a maintenance operation and/or a set-up operation is performable by a person. In particular, it is provided here for the workpiece treatment, in particular workpiece coating, not to be interrupted in safety mode.

The one or more operating devices that are put in an access condition, in particular in order to perform a maintenance operation and/or a set-up operation, are at least temporarily replaced in respect of their function, preferably by one or more further operating devices of the treatment system.

The treatment system, in particular the operating devices, are preferably operable in a degraded mode in which all of the operations that are required for treating the workpieces are assigned to operating devices which, in the event of a disruption or defect, are not in an access condition and/or disrupted condition but are in a ready condition and/or treatment condition.

It may be favourable if the treatment system has more operating devices than are needed for performing the operations required for treating the workpieces. In this way, individual or a plurality of operating devices can respectively successively be temporarily uncoupled from individual tasks and put in the access condition for the purpose of performing one or more maintenance operations and/or set-up operations.

It may be provided for the treatment system to comprise a conveying device by means of which the workpieces are conveyable in a direction of conveying, into the treatment region, through the treatment region and/or out of the treatment region.

Preferably, at least two access regions are provided that are arranged and/or formed on mutually opposite sides of a vertical longitudinal centre plane of the treatment system running parallel to the direction of conveying.

In this way, the workpieces are accessible in particular from both sides, wherein preferably a simultaneous treatment on both sides and/or successively alternating treatment, in each case from one side, of the workpieces can be provided.

As an alternative or in addition, it may be provided for at least two access regions to be provided, of which at least one access region is arranged upstream of a treatment region, as seen in the direction of conveying, and of which at least one further access region is arranged downstream of the treatment region, as seen in the direction of conveying.

Preferably, in this way at least two access regions are provided that are arranged opposite one another in relation to a transverse centre plane, running perpendicularly to the direction of conveying, of the treatment region and/or treatment system.

In particular, it may be provided for two or four access regions to be associated with each treatment region, wherein the access regions are arranged in particular in corner regions of a treatment space surrounding the treatment region.

Below the treatment region, in particular directly below the treatment space, there is preferably arranged a stripping device for stripping contaminants out of an air stream guided through the treatment region.

The stripping device is fluidically connected to the treatment region in particular by means of a raw gas shaft of the treatment system.

The air stream that is guided away from the treatment region is suppliable, in particular by way of the raw gas shaft, to one or more stripping units of the stripping device.

The raw gas shaft is in particular arranged substantially centrally below the treatment space. In particular, the raw gas shaft preferably extends in the direction of conveying of the treatment system, for example directly below the conveying device.

Arranged above the treatment region, in particular directly above the treatment space, there is preferably a plenum for supplying air to the treatment region.

The plenum may be for example a split plenum, by means of which different air streams are suppliable to different regions of the treatment space. For example, by means of a split plenum recirculating air can be supplied to the treatment region, whereas for example infeed air, in particular fresh air and/or factory air, is supplied to one or more access regions.

Further, the treatment system preferably comprises one or more ventilators for driving one or more air streams, in particular for driving the recirculating air stream and/or the infeed air stream and/or the exhaust air stream.

In particular, the use of a split plenum and/or the use of additional nozzles can have the effect of dividing the treatment space into regions with different sink rates.

In particular, it may be provided for an air stream, in particular a recirculating air stream, to be supplied to the treatment region at a higher sink rate than one or more air streams are supplied to one or more further regions, in particular one or more access regions.

For example, it may be provided for the treatment space to be divided, in particular in the direction of conveying, into regions of different sink rates, wherein a region with the maximum sink rate is preferably arranged centrally in the treatment region or comprises the treatment region. Preferably one or two or more than two regions of reduced sink rate are provided upstream and/or downstream, as seen in the direction of conveying, of the region with the maximum sink rate, wherein the sink rate preferably decreases as the distance from the region with the maximum sink rate increases.

Preferably, it is provided for a sink rate in the region with the maximum sink rate to be at least approximately 0.25 m/s, for example at least approximately 0.35 m/s, and/or at most approximately 0.5 m/s, for example at most approximately 0.4 m/s, in particular approximately 0.35 m/s.

In one or both of the regions directly adjoining this, the sink rate is preferably at least approximately 0.15 m/s, for example at least approximately 0.2 m/s, and/or at most approximately 0.4 m/s, for example at most approximately 0.3 m/s, in particular approximately 0.25 m/s.

As the distance from the region with the maximum sink rate increases, there is preferably provided at least one region with a sink rate of at least approximately 0.05 m/s, for example at least approximately 0.08 m/s, and/or at most approximately 0.3 m/s, for example at most approximately 0.2 m/s, in particular approximately 0.1 m/s.

For the supply of air to one or more or all of the access regions, preferably at least one separate air guidance is provided.

The treatment method is in particular a method for treating workpieces, in particular vehicle bodies.

Preferably, in the method one or more operations are performed on the workpieces in a treatment region by means of one or more operating devices.

Further, one or more operating devices are preferably put in an access condition and are then preferably accessible from at least one access region and/or at at least one access region, in particular for the purpose of performing maintenance operations and/or set-up operations.

Preferably, the treatment system is selectively operated in different operating modes, wherein in particular one or more of the following operating modes are provided:

- a treatment mode, in which one or more workpieces are treated in the treatment region by means of one or more operating devices, during which preferably no persons are or may be in the one or more access regions; and/or
- a safety mode, in which one or more workpieces are treated in the treatment region by means of one or more operating devices, during which preferably at least one person is or may be in the one or more access regions; and/or
- a maintenance mode, in which no treatment of workpieces takes place in the treatment region.

It may be favourable if operating devices that are different from one another are successively put in an access condition, and if at least one maintenance operation and/or set-up operation is performed on each of them, while in the treatment region one or more treatment operations for treating the workpieces are performed, in particular are continued and/or maintained uninterrupted, by means of one or more operating devices that are not in the access condition.

In particular, it may be provided for a plurality of operating devices to have mutually overlapping task regions in order that maintenance and/or set-up times can be shortened by alternate use of the operating devices.

In one embodiment of the invention, it may be provided for example for at least one operating device that takes the form of an external painting robot, depending on the availability and/or on the functional scope of the one or more other operating devices, to fulfil at least one additional task, for example an internal painting operation and/or a manipulating operation, in particular an opening or closing procedure of a body bonnet or door of the workpiece.

Further, in one embodiment of the invention, it may be provided for example for at least one operating device that takes the form of an internal painting robot, depending on the availability and/or on the functional scope of the one or more other operating devices, to fulfil at least one additional task, for example an external painting operation or a manipulating operation, in particular an opening or closing procedure of a body bonnet or door of the workpiece.

It may be favourable if one or more manipulating operations, in particular one or more opening or closing procedures of a body bonnet or door of the workpiece, are performable by a plurality of operating devices, in particular a plurality of operating devices that differ in respect of their main task. For example, the same at least one manipulating operation is performable by means of a plurality of operating devices that take the form of painting robots.

It may be favourable if the at least one manipulating operation is performable by the workpieces in a variable manner, in particular alternately, depending on process details of the treatment procedure for treating the workpieces. In particular, there may be provided a control device that takes a form and is constructed such that which of the operating devices performs the respective manipulating operation in the individual case is selectable by means of this control device, depending on process details of the treatment procedure.

The method preferably has individual or a plurality of the features and/or advantages described in conjunction with the treatment system.

Further, preferably the treatment system has individual or a plurality of the features and/or advantages described in conjunction with the method.

In one embodiment of the invention, it may be provided for the treatment system to comprise one or more guide elements on which there are preferably displaceably arranged respectively one or more operating devices. It may be favourable if one or more guide elements, in particular all of the guide elements, take the form of guide rails.

The one or more guide elements are formed and/or oriented preferably in certain regions or entirely at least approximately parallel to one another and/or in certain regions or entirely at least approximately parallel to a direction of conveying of a conveying device of the treatment system.

In particular, a guide direction in which one or more operating devices are displaceable in a manner guided by means of the one or more guide elements is at least approximately parallel to the direction of conveying or is oblique or perpendicular thereto.

The wording "at least approximately" and the wording "approximately" or "substantially" should be understood in particular to mean a deviation of at most approximately 20%, preferably at most approximately 10%, of the value indicated, wherein in the case of angular values a deviation of at most 20°, in particular at most 10°, preferably at most 5°, is provided.

It may be advantageous if the treatment system comprises two or more than two guide elements that are arranged on the same side in respect of a vertical longitudinal centre plane of the treatment system, in particular on a side wall of a housing of the treatment system that surrounds the treatment region.

The vertical longitudinal centre plane of the treatment system is in particular a plane running parallel between the side walls of the housing.

In particular, the vertical longitudinal centre plane is arranged centrally between the side walls of the housing.

The vertical longitudinal centre plane of the treatment system in particular forms a plane of symmetry for the side walls, one or more operating devices and/or one or more guide elements and/or one or more access regions.

It may be advantageous if the treatment system comprises two or more than two guide elements that are arranged on mutually opposite sides in respect of a vertical longitudinal centre plane of the treatment system, in particular on mutually opposite side walls of a housing of the treatment system that surrounds the treatment region.

Preferably, the treatment system comprises a conveying device. The one or more guide elements are preferably arranged below the conveying device, in relation to the direction of gravity, in particular entirely below an upper side of the conveying device that upwardly delimits the conveying device, in relation to the direction of gravity.

As an alternative or in addition, it may be provided for one or more guide elements to be arranged above the conveying device, as seen in the direction of gravity, in particular entirely above an upper side of the conveying device that upwardly delimits the conveying device, as seen in the direction of gravity.

Moreover, as an alternative or in addition it may be provided for one or more guide elements to be arranged at the same level as the conveying device, as seen in the direction of gravity, in particular at the same level as an upper side of the conveying device that upwardly limits the conveying device, as seen in the direction of gravity.

A plurality of operating devices are preferably displaceable past one another in a guide direction of one or more guide elements of the treatment system and/or in a direction of conveying of a conveying device of the treatment system.

Here, the operating devices are preferably formed and/or arranged such that they can theoretically collide with one another as a result of the fundamental movability of the respective operating device, that is to say that they occupy movement spaces that in particular at least partly overlap one another.

Preferably, the operating devices are programmed and/or controlled such that collision thereof is avoided. In particular, a movement mode or movement condition of one or more operating devices in which they avoid the overlap region and are thus movable past one another may be set.

In particular, one or more operating devices are put in the movement mode if the respective operating device is to be taken out of a ready condition or treatment condition and put in the access condition and, for this purpose, is to be displaced past a further operating device.

One or more guide elements of the treatment system preferably each guide exactly two or more than two operating devices.

In particular, mutually different operating devices are provided that are guided on in each case only one of the guide elements.

It may be favourable if there is associated with a plurality of operating devices a common access region, from which and/or at which the operating devices are accessible, at least in an access condition thereof.

The operating devices are in particular configured to be put in the access condition successively in order to make it possible to perform a maintenance and/or set-up operation.

A common access region may preferably be associated with two or more than two operating devices that are guided on mutually different guide elements of the treatment system.

For example, two or three operating devices that are guided on two or three mutually different guide elements may be arrangeable at a common end region of the guide elements and, there, may be suppliable to the access region.

The common end region of the guide elements is in particular a spatial region of the treatment space in which each of the guide elements ends.

It may be advantageous if there is arranged between two guide elements, in a guide direction of one or more guide elements of the treatment system and/or in a direction of conveying of a conveying device of the treatment system, an access region from which and/or at which at least two operating devices that are guided on the two guide elements are accessible, at least in an access condition of the operating devices.

It may in particular be favourable if one operating device is arranged on a guide element and a further operating device is arranged on a further guide element, wherein preferably the same access region is associated with both operating devices.

The access region may in this case be arranged in particular between the two operating devices.

The access region may for example interrupt one or more guide elements or indeed be arranged for example in a central region of one or more guide elements.

In a case of this kind, too, preferably two or more than two operating devices may be provided with which the same access region is associated, wherein the access region is arranged in particular between the operating devices.

One or more access regions preferably interrupt one or more guide elements, in particular in the direction of conveying and/or the guide direction.

As an alternative or in addition, it may be provided for one or more access regions to be arranged for example in a central region on guide elements that are uninterrupted in the direction of conveying and/or the guide direction.

It may be advantageous if a respective access region is arranged at mutually opposite end regions of one or more guide elements, in a guide direction of one or more guide elements of the treatment system and/or in a direction of conveying of a conveying device of the treatment system.

In particular, as a result of this in each case two operating devices may be provided per guide element, wherein each operating device is respectively associated with one of the two access regions.

For example, it may be provided for respectively three guide elements to be arranged on each side wall of the treatment space, wherein there are arranged on each guide element respectively two operating devices. If a respective access region is arranged in the end regions of the guide elements, this results in four access regions, from which and/or at which all twelve operating devices are accessible for the purpose of performing maintenance and/or set-up operations, at least in the respective access condition of each operating device.

It goes without saying that it is also possible to provide more or fewer guide elements and/or operating devices and/or access regions.

In one embodiment of the invention, it may be provided for the treatment system to comprise one or more fixed operating devices. The term “fixed operating device” should be understood in particular to mean an operating device that comprises an operational base that is of fixed location and/or unmovable. An operational arm of an operating device of this kind is preferably movable relative to the operational base but not in common with the operational base.

As an alternative to one or more fixed operating devices, the treatment system may optionally comprise one or more movable operating devices, in particular one or more operating devices in which an operational base is arranged and/or formed to be movable, in particular to be shiftable along a guide element.

In particular if the treatment device comprises one or more fixed operating devices and one or more movable operating devices, it may be provided for the one or more fixed operating devices to be arranged between one or more movable operating devices on the one hand and an access region on the other, in particular in relation to a direction of conveying of a conveying device of the treatment system. In particular, it may be provided for a respective operational base of the one or more fixed operating devices to be arranged between one or more guide elements for guiding the one or more movable operating devices, on the one hand, and the access region, on the other, in particular in relation to the direction of conveying.

It may be favourable if the one or more fixed operating devices and the one or more movable operating devices are associated with the same access region.

It may be advantageous if one or more movable operating devices engage over or embrace one or more fixed operating devices, in particular on an upper side and/or on a side that is remote from a centre of the treatment space, of an operational arm of the one or more fixed operating devices, in order to supply an operational element of the respective movable operating device to the access region or to introduce it into the access region.

Further, it may be advantageous if a plurality of movable operating devices, in particular a plurality of movable operating devices arranged on a common guide element, are associated with the same access region. In this case, it may be provided for one of the movable operating devices to engage over or to embrace at least one further one of the movable operating devices, in particular on an upper side and/or on a side that is remote from a centre of the treatment space, of an operational arm of the one or more further movable operating devices, in order to supply an operational element of the movable operating device to the access region or to introduce it into the access region.

It may be provided for the treatment system to comprise a plurality of pairs of operating devices or groups of operating devices, which respectively comprise exactly one or more movable operating device and exactly one or more fixed operating device and are associated with a common access region. For example, in each case two or four such pairs of operating devices or groups of operating devices are associated with each treatment region.

Preferably, the treatment system has a holding point that is independent of the type of workpiece that is respectively to be treated. The holding point is in particular a location in the treatment region up to which for example a frontmost or rearmost point on the workpiece to be treated is conveyed, in relation to a direction of conveying, before treatment of the workpiece is started.

Depending on an individual maximum longitudinal extent of different types of workpiece to be treated, the workpieces extend from the holding point by different amounts in or in opposition to the direction of conveying. In particular for the purpose of reliable treatment of all types of workpiece, it may thus preferably be provided for at least one fixed operating device, which is arranged in particular on a side of the treatment space remote from the holding point, to take a form and to be constructed such that the shortest type of workpiece to be treated is still treatable. For example, an operational arm of this operating device may be of an appropriate length in order still to be able to reach even the shortest type of workpiece.

The treatment system preferably comprises an at least approximately cuboid treatment space that, in particular substantially centrally, comprises the treatment region.

Preferably, there are arranged and/or formed in one, two, three or four corner regions of the treatment space one, two, three or four access regions.

In particular, a respective access region is arranged and/or formed in each corner region of the treatment space.

A corner region of a treatment space is in particular a region that is arranged in one of the four corners in relation to a horizontal cross section of the treatment space and preferably extends over at least approximately 50%, for example at least approximately 80%, preferably approximately 100%, of a total height of the treatment region and/or the treatment space.

Preferably, one or more access regions, in particular all of the access regions, are formed and/or arranged to be at least approximately cuboid.

It may be favourable if the treatment system comprises a treatment line that has in particular a plurality of treatment regions succeeding one another in a conveying direction of a conveying device of the treatment system. Arranged between two treatment regions are preferably in each case one or more access regions from which and/or at which at least two operating devices are accessible for the purpose of performing operations in mutually different treatment regions, at least in an access condition of the operating devices.

The one or more access regions are in particular accessible from both sides. In particular, two-sided approach openings are provided in one or more separating elements, in particular separating walls, for the purpose of separating the respective access region off from the treatment region.

In one embodiment of the invention, it is provided for the treatment system to comprise one or more guide elements for movably, in particular displaceably, guiding one or more operating devices. The one or more guide elements are preferably arranged on a side wall of the treatment space, wherein in particular electronic and/or electrical and/or pneumatic components of the one or more operating devices are arranged in part outside the side wall.

It may be provided for an outer side wall of one or more access regions to be substantially flush with the side wall of the treatment space and/or the treatment region.

As an alternative, it may be provided for an outer side wall of one or more access regions to be arranged outwardly offset in relation to the side wall of the treatment space and/or treatment region. As a result, in particular the width of passage for guiding a workpiece between two access regions may be increased.

It may be favourable if the outer side wall of one or more access regions is arranged outwardly offset in relation to the side wall of the treatment space by at most the amount by which structural and/or mechanical and/or electronic and/or electrical and/or pneumatic components of the one or more operating devices project outwardly away from the side wall of the treatment space. A spatial region that is needed in any case because of the components, on a side of the side wall of the treatment space that is remote from the treatment space, can thus also be used efficiently for positioning the one or more access regions.

Further preferred features and/or advantages of the invention form the subject matter of the description below and the representation of exemplary embodiments in the drawings.

BRIEF DESCRIPTION OF THE DRAWINGS

FIG. 3 shows a schematic plan view of an outlet side of the treatment system from FIG. 1, wherein the operating devices are shown on only one side and in addition a conveying device for conveying workpieces is sketched in;

DETAILED DESCRIPTION OF THE DRAWINGS

Figure 1:
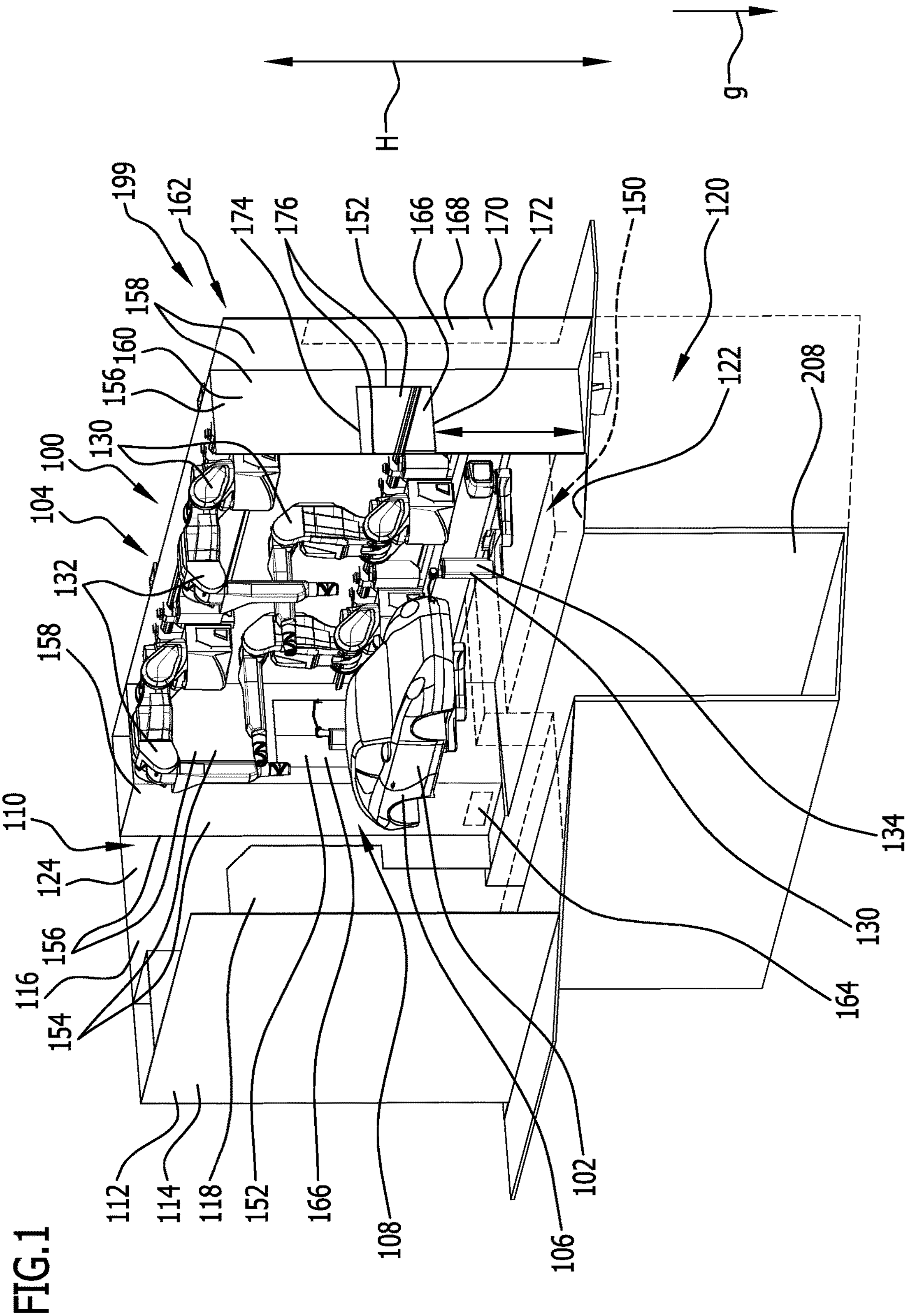
FIG. 1 shows a schematic, perspective, partly cut-away illustration of a treatment system for treating workpieces, wherein for the sake of optimised illustration only one-sided operating devices are shown.

A treatment system that is illustrated in FIGS. 1 to 10 and is designated 100 as a whole serves in particular for treating workpieces 102.

The treatment system 100 is in particular a painting system 104 for painting vehicle bodies 106.

Preferably, the treatment system 100 comprises a treatment region 108 into which the workpieces 102 are successively introducible in order to perform one or more treatment operations, in particular coating steps.

The treatment region 108 is in particular a constituent part of a treatment space 110 that is surrounded by a housing 112 of the treatment system 100.

The housing 112 takes an in particular substantially cuboid form. The treatment space 110 thus preferably likewise takes a substantially cuboid form.

The housing 112 comprises two mutually opposite side walls 114 and an inlet side 116. The inlet side 116 in particular comprises a supply opening 118 through which the workpieces are introducible into and/or guidable out of the treatment space 110.

Optionally, a further side wall 114 may be arranged opposite the inlet side 116. Further, an outlet side 120 may be opposite the inlet side 116.

In the former case, the treatment system 100 is in particular a single-box system with one-sided supply. In the latter case, the treatment system is a through-passage single-box system, or a constituent part of a handling line.

In relation to the direction of gravity g, the treatment space 110 is delimited at its lower side by a base wall 122 and at its upper side by a cover wall 124.

Figure 2:
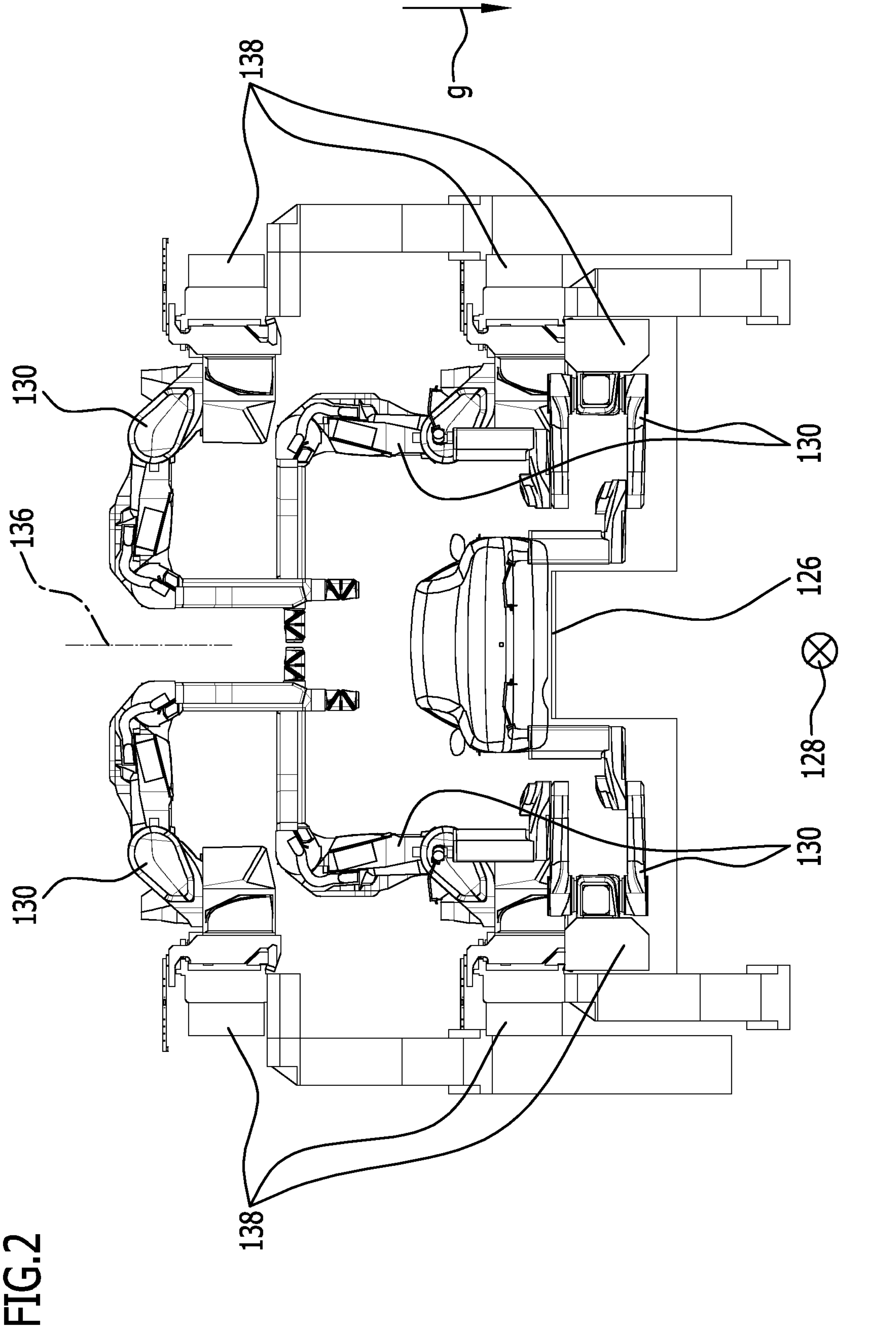
FIG. 2 shows a schematic plan view of an inlet side of the treatment system from FIG. 1, wherein a housing of the treatment system is not shown.

The treatment system 100 preferably comprises a conveying device 126 for conveying the workpieces 102 in a direction of conveying 128 (see in particular FIG. 2).

The two mutually opposite side walls 114 of the housing 112 are in particular oriented parallel to the direction of conveying 128.

The inlet side 116 and the outlet side 120 are preferably oriented substantially perpendicularly to the direction of conveying 128.

Figure 6:
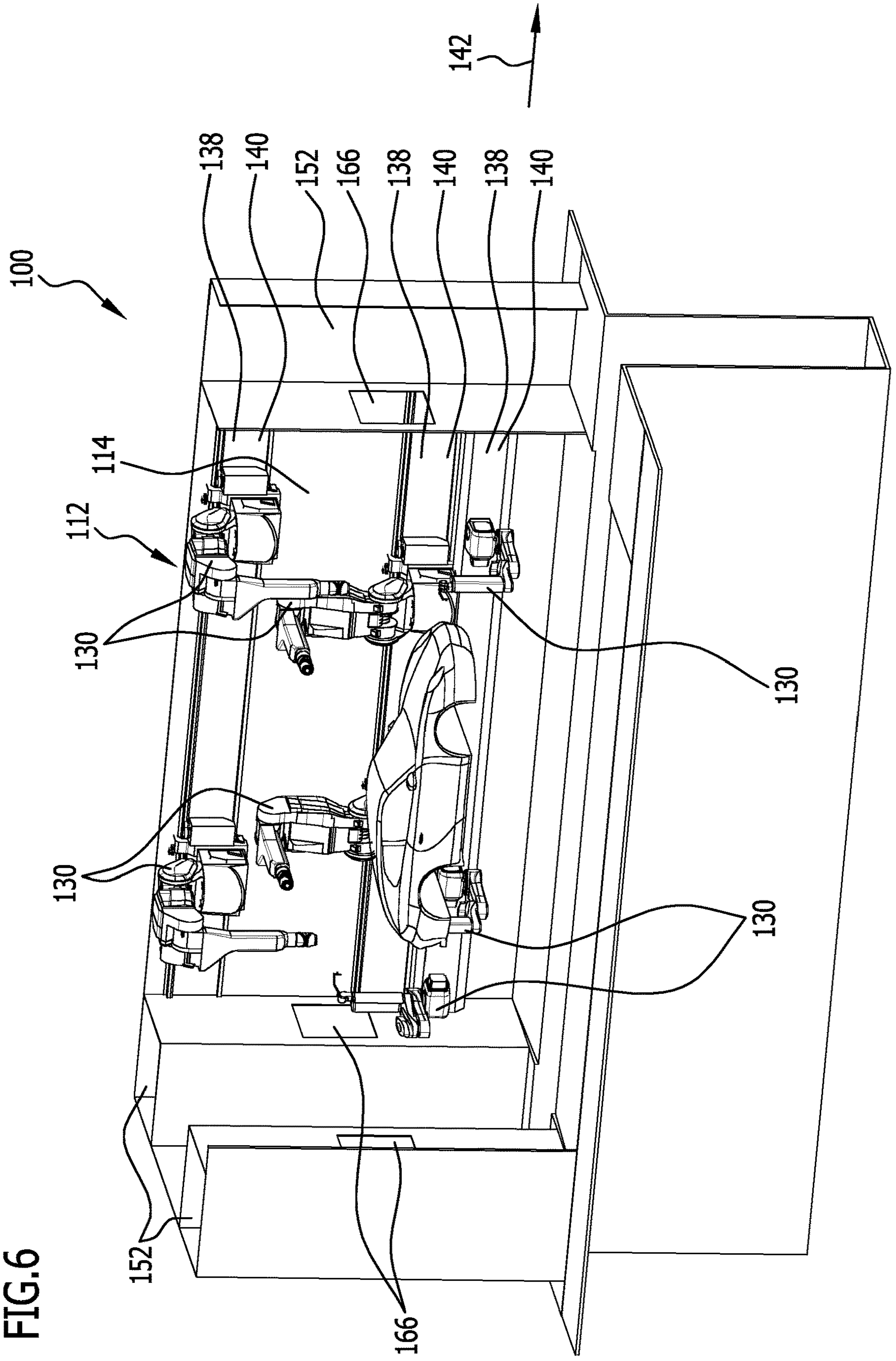
FIG. 6 shows a further schematic, perspective, partly cut-away illustration, similar to FIG. 1, of the treatment system from FIG. 1.

As can be seen in particular from FIGS. 1 and 6, the treatment system 100 preferably comprises a plurality of operating devices 130 for performing one or more operations for the purpose of treating the workpieces 102.

The operations are in particular coating operations and/or manipulating operations.

The operating devices 130 are thus in particular application devices and/or manipulation devices, for example application robots 132 and/or manipulating robots 134.

Preferably, both operating devices 130 that take the form of application robots 132 and also further operating devices 130 that take the form of manipulating robots 134 are provided.

As can be seen in particular from FIG. 2, the operating devices 130 are preferably provided on both side walls 114 of the treatment space 110.

In particular, a substantially mirror-symmetrical arrangement of the operating devices 130 in relation to a vertical longitudinal centre plane 136 of the treatment space 110 is provided.

For the purpose of simplifying the description of the application devices 130, reference is made below in particular to FIGS. 1 and 6, which show only the operating devices 130 on a single side wall 114. The opposite side wall 114 may be correspondingly identically provided with the operating devices 130 illustrated in FIGS. 1 and 6.

Further, in alternative embodiments (not shown), it is likewise possible to dispense with individual operating devices 130 or to provide additional further operating devices 130.

It goes without saying that an asymmetrical arrangement of the operating device 130 in relation to the vertical longitudinal centre plane 136 may also be provided.

As is apparent in particular from FIG. 6, the treatment system 100 preferably comprises one or more, for example three, guide elements 138 for guiding respectively one or more operating devices 130. For example, on each guide element 138 respectively two operating devices 130 are guided, in particular displaceably guided.

The guide elements 138 in particular form or take the form of guide rails 140.

The guide elements 138 extend in particular in a guide direction 142.

The guide direction 142 is in particular at least approximately parallel to the conveying direction 128 of the conveying device 126.

It may be favourable if two or more than two guide elements 138 are each provided with and/or serve to guide two application devices 130 taking the form of application robots 132.

A further guide element 138 preferably serves to receive and/or guide one, two or more than two operating devices 130 that take the form of manipulating robots 134.

The guide element 138 for receiving and/or guiding the one or more operating devices 130 that take the form of manipulating robots 134 is preferably arranged below the one or more guide elements 138 that serve to receive one or more operating devices 130 that take the form of application robots 132.

Figure 7:
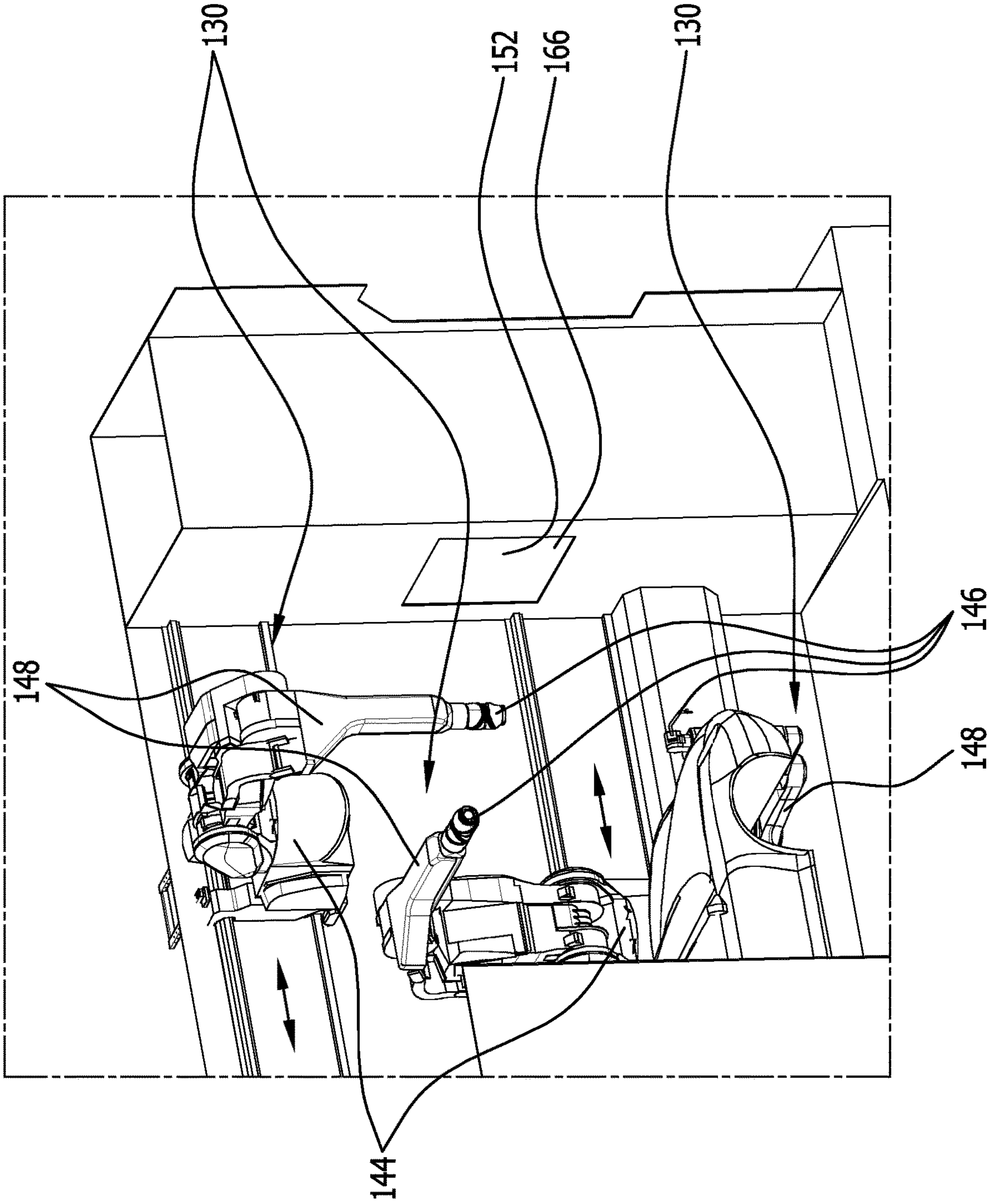
FIG. 7 shows an enlarged illustration of an access region in a treatment space of the treatment system from FIG. 1.

As can be seen in particular from FIG. 7, each operating device 130 preferably comprises an operational base 144 by means of which the respective operating device 130 is arranged in particular displaceably on the respective guide element 138.

Further, each operating device 130 preferably comprises an operational element 146 that serves to perform an operation. An operational element 146 may for example be a spray head for the application of coating material.

Further, an operational element 146 may be for example a gripper by means of which an operating device 130 taking the form of a manipulating robot 134 acts, for example for the purpose of opening doors, for example on a workpiece 102 that takes the form of a vehicle body 106.

The operational base 144 and the operational element 146 of each operating device 130 are arranged in particular at mutually opposite ends of an operational arm 148 of each operating device 130.

The operational arm 148 of each operating device 130 takes the form for example of a jointed arm and/or robot arm.

In particular, multiple joints and/or multiaxial robot arms may be provided as the operational arm 148.

As can be seen in particular from FIG. 2, the operating devices 130 are arrangeable in different positions and/or movement conditions, wherein in particular the operating devices 130 on mutually different guide elements 138 may extend into mutually overlapping spatial regions. Thus, as the operating device 130 moves along the guide elements 138, a potential collision may arise.

By means of a control device (not illustrated) of the treatment system 100, preferably coordination of the operating device 130 may be performed such that they can be moved past one another without collisions, in particular by suitable positioning and/or orientation of the respective operational arm 148.

Figure 3:
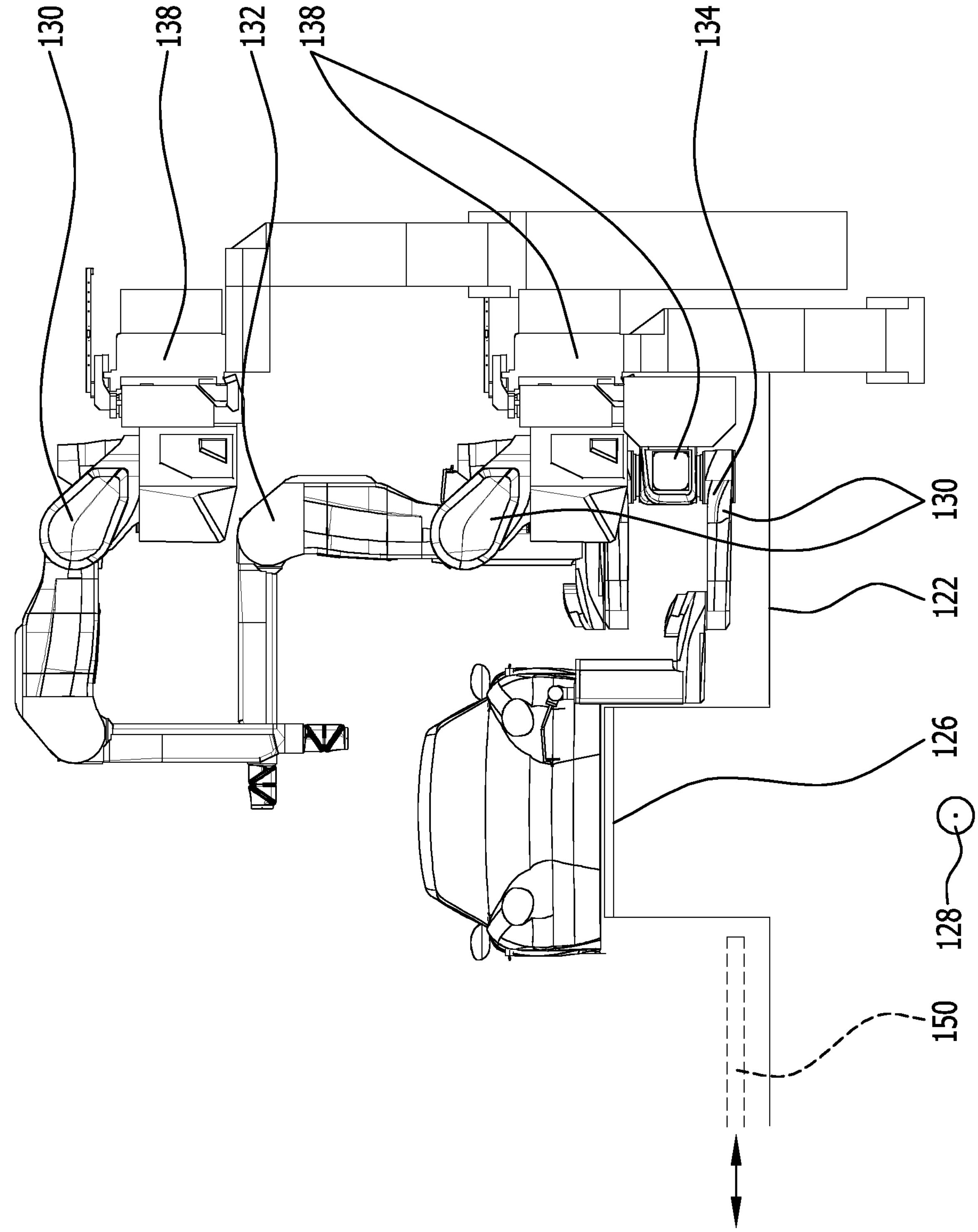
Figure 4:
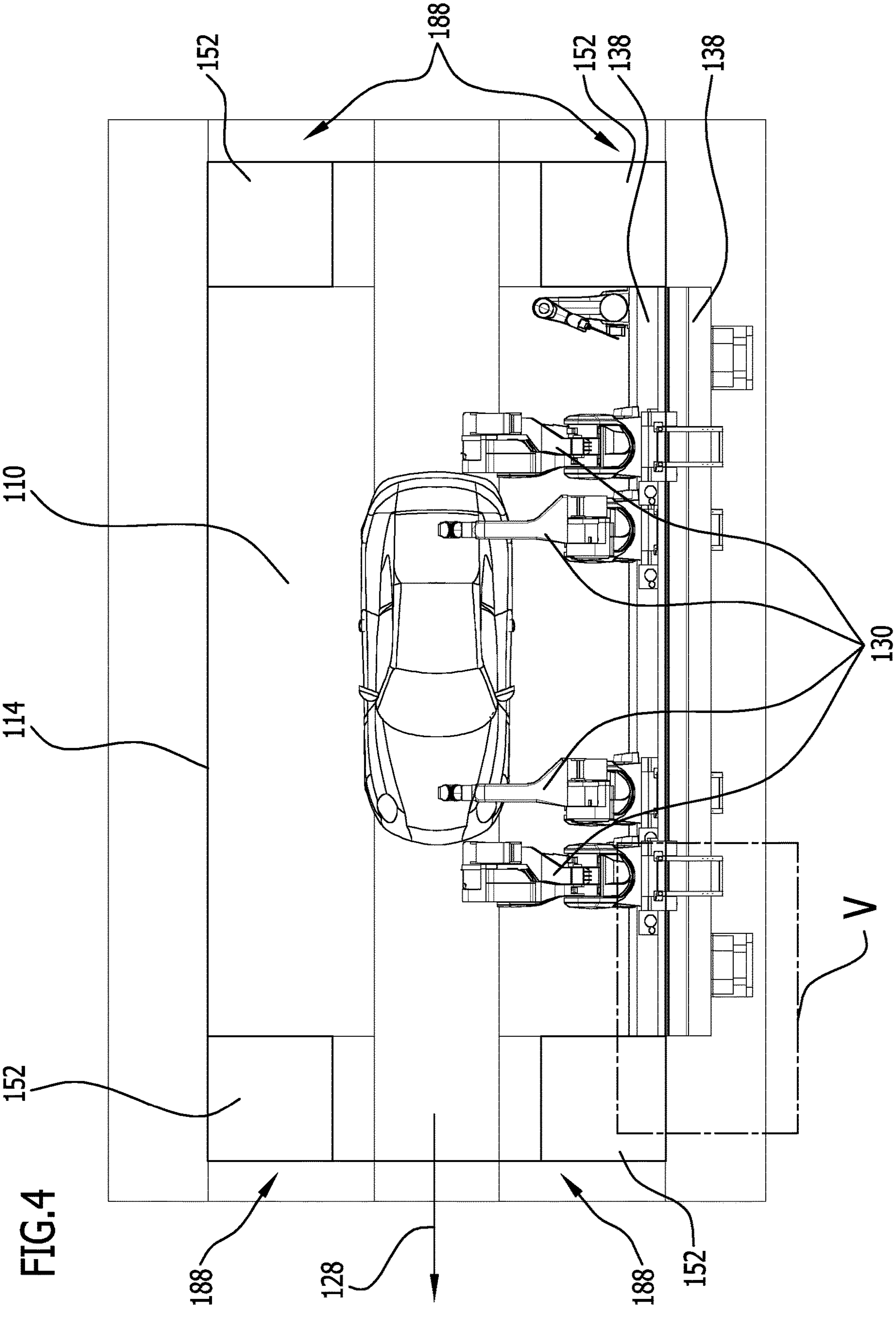
FIG. 4 shows a schematic plan view of the treatment system from FIG. 1, wherein the operating devices are shown on only one side.
Figure 5:
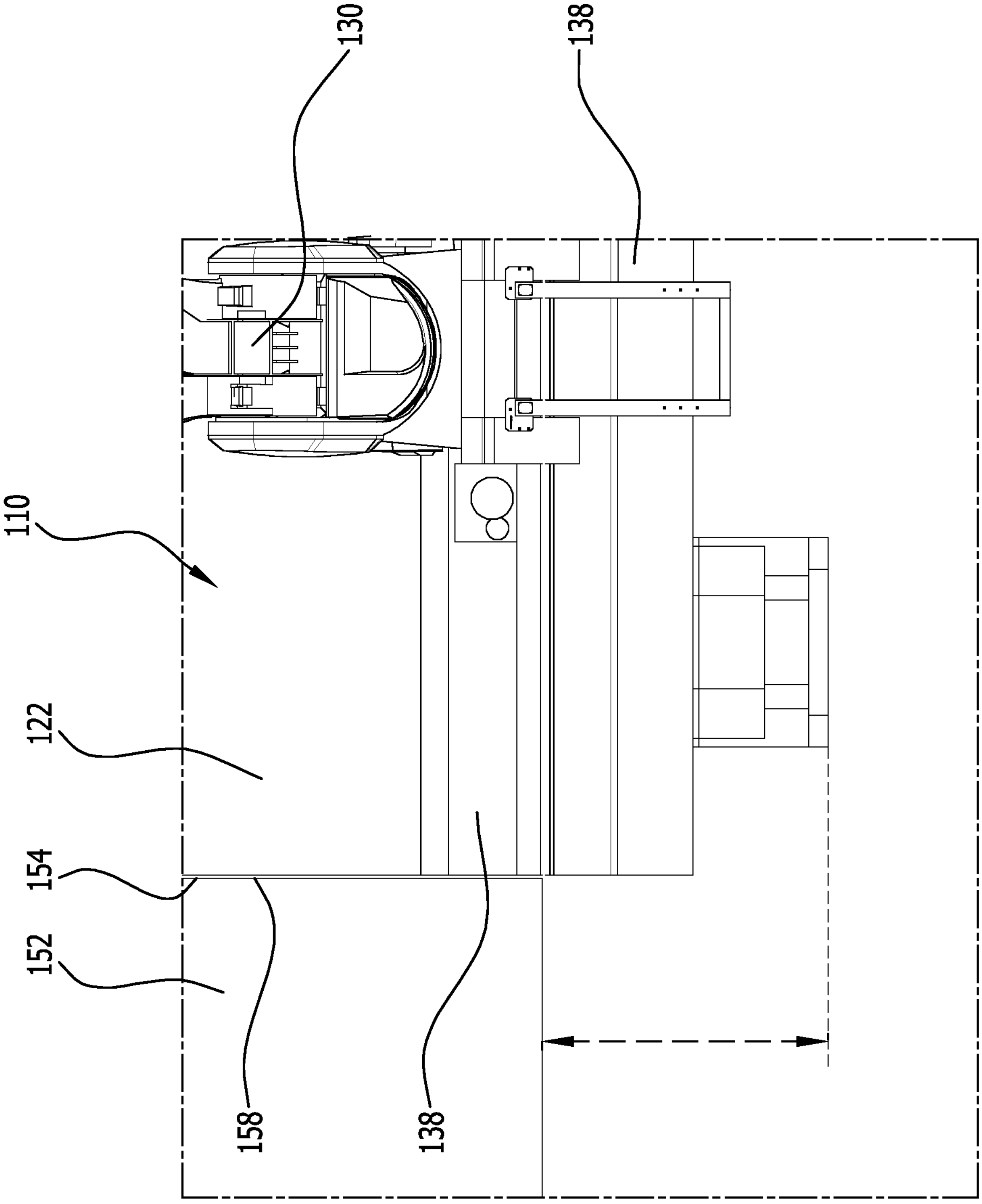
FIG. 5 shows an enlarged illustration of the region V in FIG. 4.

As can be seen in particular from FIG. 3, the base wall 122 may itself be person-accessible. The base wall 122 may thus form a person-accessible floor 150 of the treatment space 110.

Preferably, however, it is provided for there to be arranged above the base wall 122 delimiting the treatment space 110 an additional person-accessible floor 150 that is for example retractable, pivotal and/or slidable into the region above the base wall 122.

The person-accessible floor 150 may then be introduced in particular only when required, in order for example to provide a person-accessible region in the treatment space 110 only for maintenance purposes.

In this case, the person-accessible floor 150 is preferably furthermore below all the operating devices 130 and/or all the guide elements 138. As a result, in particular simple accessibility of the operating devices 130 and/or the guide elements 138 can be ensured in the event of maintenance. The person-accessible floor 150 is in this case furthermore preferably arranged below the conveying device 126.

If the conveying device 126 is itself person-accessible, there is preferably produced between the person-accessible floor 150 and an upper side of the conveying device 126 a step or offset of preferably at most approximately 70 cm, in particular at most approximately 60 cm, for example approximately 50 cm. In such a case, a safety barrier may be unnecessary.

As can be seen in particular from FIGS. 1, 4, 6 and 7, the treatment space 110 preferably comprises a plurality of spatial regions that are separated from the treatment region 108 and are designated access regions 152 below. Below, the separated spatial regions are as a whole designated an access region 152 in order to enable a simple description of the invention. However, it may also be provided for the spatial regions, which from a functional point of view are to be regarded as the access region 152, to be only sub-spaces of the spatial regions separated from the treatment space 110.

An access region 152 is in particular a region which a person can enter in order to gain access to one or more operating devices 130, in particular without needing to enter the treatment region 108 or being exposed to its atmosphere.

For this purpose, the operating devices 130 are in particular configured to be put into an access condition in order to allow a person access from the access region 152 or in the access region 152. This is described in more detail below.

The access regions 152 are spatially separated from the treatment region 108 in particular by means of a plurality of separating elements 154.

The separating elements 154 are in particular separating walls 156.

For example, the separating walls 156 form shaft walls 158 of an access region 152 taking the form of a maintenance shaft 160.

The access regions 152 are preferably flushed with infeed air, and/or infeed air flows through them, by means of an infeed air supply device 199 to be described below.

The infeed air is in particular fresh air and/or factory air, preferably unconditioned fresh air and/or factory air.

For this purpose, the access regions 152 have an inlet 162 that is arranged in particular at an upper end of the access region 152 in relation to the direction of gravity g.

Further, preferably one or more outlets 164 (to be described below) are provided. Different variations of the outlets 164 may be provided. This is discussed below with reference to FIG. 16.

The relevant point here is merely that the access region 152 is supplied with infeed air through the inlet 162 and, as a result of the presence of the separating elements 154, in particular the separating walls 156, the infeed air does not mix or only mixes to an insubstantial extent with the gas, in particular the recirculating air, in the treatment region 108.

The air flowing through the access region 152 thus has a low concentration of noxious substances, with the result that persons can be in the access region 152 without protection, in particular even while workpieces 102 are being treated in the treatment region 108.

At least one separating element 154 preferably has an approach opening 166.

The approach opening 166 in particular makes a connection between the access region 152 and the treatment region 108.

In particular, it may be provided for at least one part, in particular an operational element 146, of an operating device 130 to be introducible into the access region 152 through the approach opening 166 in order to enable a maintenance and/or set-up operation to be performed.

In particular, the operating devices 130 are movable successively such that at least their respective operational element 146 projects into the access region 152 or is arranged therein. Because maintenance and/or set-up operations are performable on the operating devices 130 in the access region 152, and because the access region 152 has, preferably always or at least temporarily, an atmosphere that is not harmful to persons, the treatment of workpieces 102 in the treatment region 108 can preferably be continued while maintenance and/or set-up operations are being performed.

Access to the access region 152 for one or more persons is possible in particular through an admission opening 168 in a side wall 114 of the housing 112 of the treatment system 100.

In particular, the admission opening 168 is a door 170 through which a person can enter the access region 152.

The approach opening 166 is preferably arranged in at least one separating element 154 such that an operational element 146 of an operating device 130 that projects through the approach opening 166 and into the access region 152 is comfortably accessible to a person in the access region 152, for example being at hip height and/or chest height.

In particular, a centre of the approach opening 166 is in this case preferably arranged at least approximately 1 m, for example at least approximately 1.20 m, and/or at most approximately 1.80 m, in particular at most approximately 1.60 m, above a person-accessible floor 150 in the access region 152.

Preferably, the approach opening 166 has a lower edge 172, at the bottom in relation to the direction of gravity g, and an upper edge 174, at the top in relation to the direction of gravity g and opposite this lower edge 172. Moreover, two side edges 176 that connect the two edges 172, 174 to one another are provided.

Preferably, the upper edge 174 of the approach opening 166 is at a height of at most approximately 2 m above the person-accessible floor 150, for example at a height of at most approximately 1.80 m above the person-accessible floor 150 in the access region 152.

A lower edge 172 is preferably at least approximately 80 cm, preferably at least approximately 1.20 m, above the person-accessible floor 150 of the access region 152.

The approach opening 166 is preferably dimensioned such that one or more operational elements 146 of one or more operating devices 130 are configured to pass, in particular to reach, through the approach opening 166 unimpeded. For example, the free passage area of the approach opening 166 is at least 50% larger, for example at least 100% larger, and/or at most approximately 500% larger, for example at most approximately 200% larger, than a maximum cross-sectional surface of one or more, in particular all, of the operational elements 146 that are or are to be introducible into the access region 152 through the respective approach opening 166.

The shape of the approach opening 166 may be selected for example to be rectangular.

As an alternative, the approach opening 166 may also have a shape adapted to the external contour of one or more, in particular all, of the operational elements 146.

The approach opening 166, in particular a geometric centre thereof, is preferably arranged substantially centrally in relation to a height H of the treatment space 110, in particular in a range between approximately 30% and approximately 70%, preferably in a range between approximately 40% and approximately 60%, of the height H of the treatment space 110.

It may be favourable if the approach opening 166 is arranged and/or formed entirely in a central third of the treatment space 110 in relation to the height thereof.

It may be favourable if the approach opening 166 is arranged at least approximately at the same height as a workpiece 102. Further, it may be provided for one or more approach openings 166 to be arranged above or overlapping with one or more workpieces 102, in relation to a vertical direction running parallel to the direction of gravity.

The operating devices 130 are preferably configured to be put selectively in different conditions in order to perform different operations.

In particular, a ready condition or a treatment condition may be provided in which workpieces 102 are treated or at least the respective operating device 130 is ready therefor.

Further, an access condition is preferably provided in which the respective operating device 130 is movable relative to the access region 152 in particular for the purpose of performing maintenance and/or set-up operations. In particular, in the access condition of an operational element 146 of the respective operating device 130 is arranged in the access region 152.

The operating devices 130 preferably take a form such that they are configured to move past one another for the purpose of being put in the access condition and/or the treatment condition and/or the ready condition, and in particular do not obstruct one another, at least with the exception of the operating devices 130 that are guided on the same guide element 138.

Further, the operating devices 130 are preferably formed and/or controlled such that they have mutually overlapping activity profiles and thus can at least partly replace one another at least temporarily.

For example, two or more than two operating devices 130 may be formed and/or controlled for the purpose of performing the same coating procedure, with the result that, in the event of maintenance of one of the operating devices 130 being necessary, this coating procedure can continue to be performed on the workpieces 102, that is by one of the operating devices 130 while the other operating device 130 is put in the access condition and is maintained, for example being cleaned, in the access region.

One or more operating devices 130 are thus formed and/or arranged and/or controlled such that they are in particular redundant.

Since, when they are in operation, the operating devices 130 represent a risk to persons and/or other components of the treatment system 100, for example as a result of high-voltage discharges, etc., preferably a plurality of safety regions are provided in the treatment system 100, which are graded in particular in respect of the respective potential for risk and/or damage.

Figure 9:
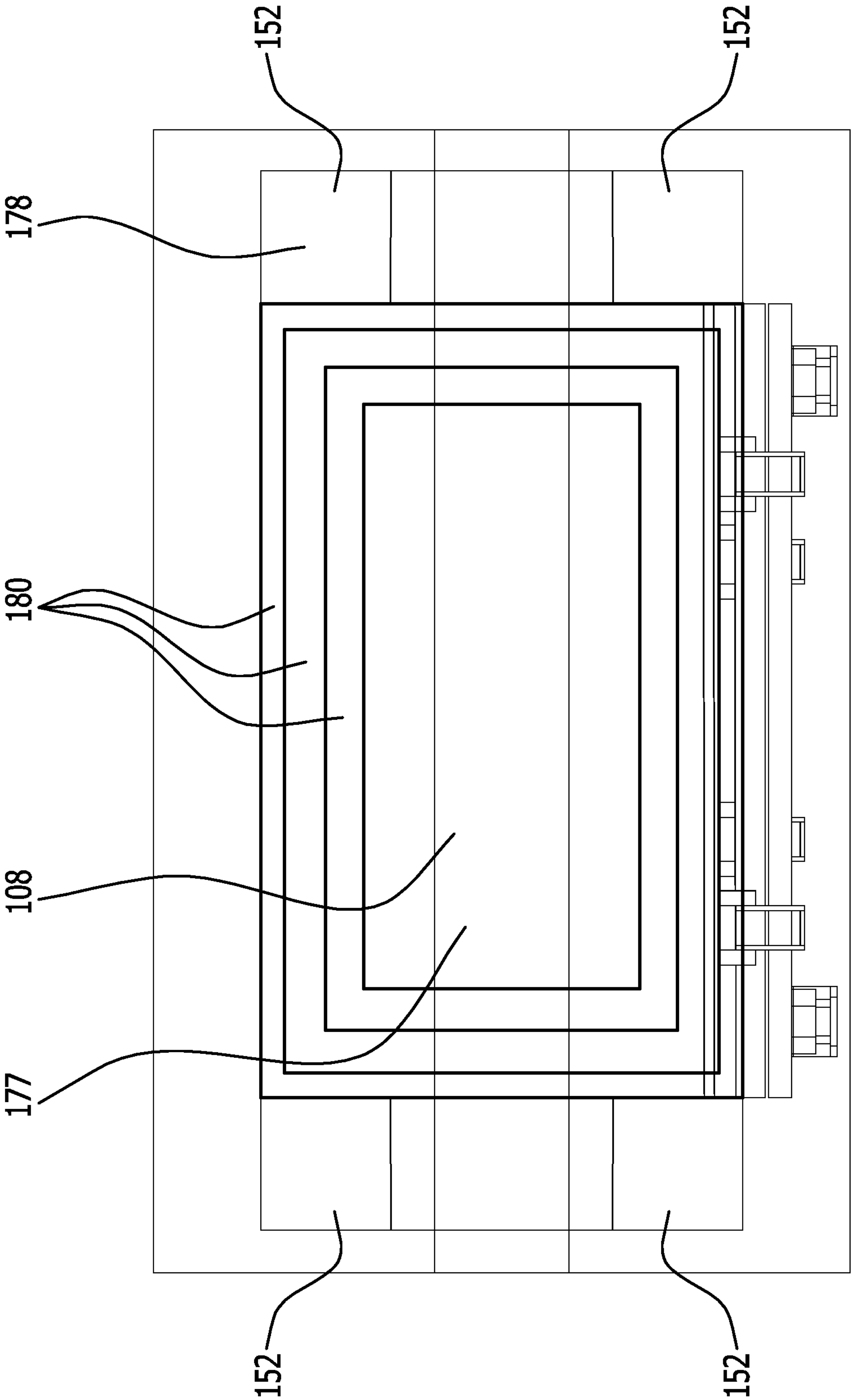
FIG. 9 shows a schematic plan view of the treatment system, corresponding to FIG. 4, wherein different safety regions are indicated.
Figure 10:
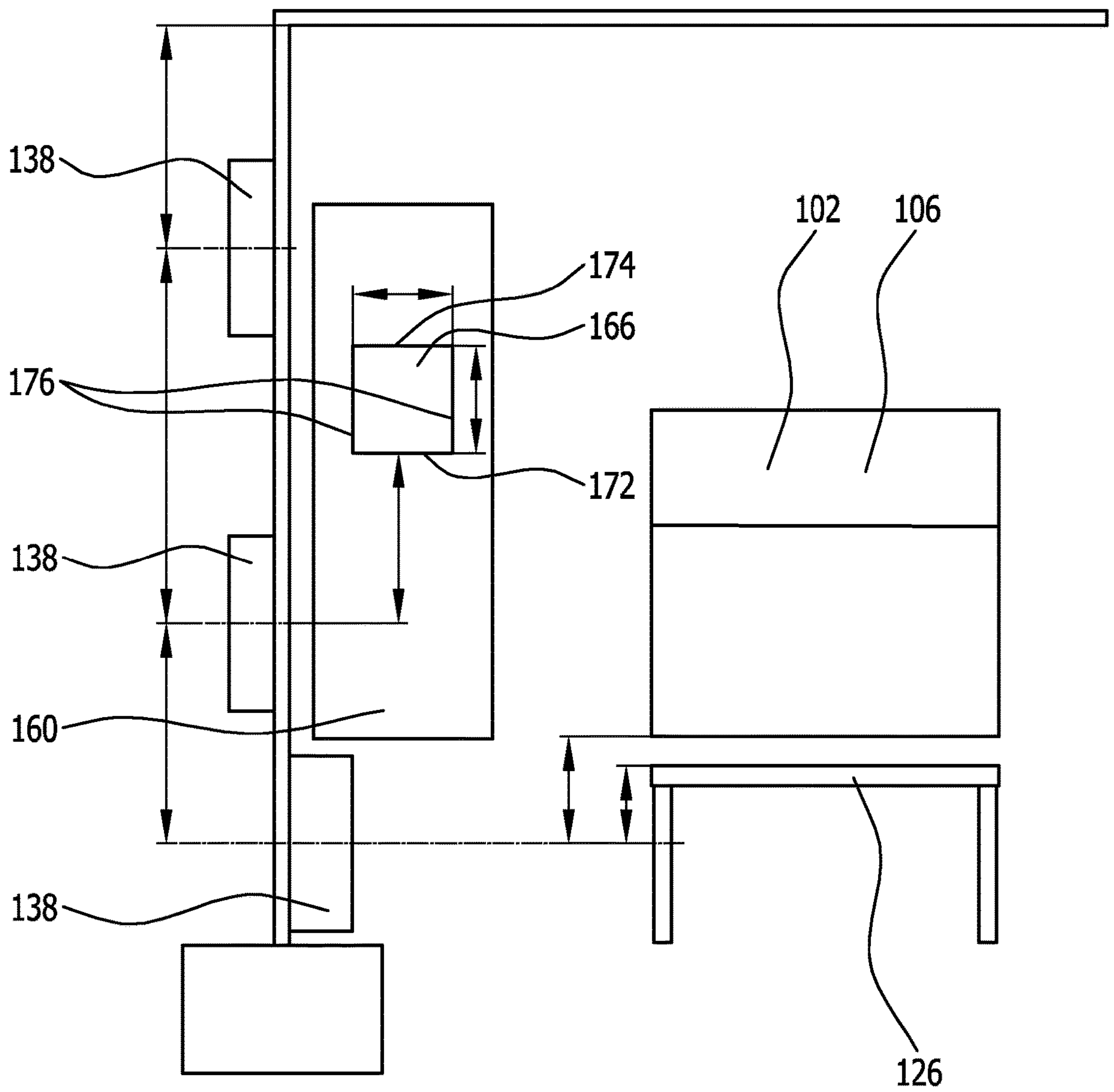
FIG. 10 shows a schematic, simplified illustration of a vertical cross section through the treatment system from FIG. 1.

As can be seen from FIG. 9, this gives in particular a high-risk region 177 in the treatment region 108.

No persons may have access to this high-risk region 177 while a treatment procedure is performed. In particular, the maximum speeds of movement of the operating devices 130 are permitted in the high-risk region 177. Moreover, a high-voltage supply is activated in the high-risk region 177 in order to perform treatment procedures.

The access region 152 is in particular a low-risk region 178. In this low-risk region 178, the operating devices 130 are preferably moved at the minimum speed. Moreover, the high voltage is preferably deactivated, with the result that a risk of injury to persons and a risk of damage to further components of the treatment system 100 is minimised as far as possible.

Between the high-risk region 177 and the low-risk region 178 there are preferably provided further intermediate-risk regions 180 in which there are in particular graded speed limits for moving the operating devices 130.

All of the regions 177, 178, 180 may be made secure by additional safety measures. For example, it may be provided for a movement of the operating devices 130 to be permitted in individual regions, for example in the low-risk region 178 and/or in one or more of the intermediate-risk regions 180 adjacent thereto, only if a person enables this, for example by pressing an acceptance switch.

Further, it may be provided for one or more, in particular all, of the operating devices 130 to be monitored, for example by camera. One or more persons can view, for example on a display, the images and/or videos captured by one or more cameras, in particular to assess possible faults or indeed proper functioning of the treatment system 100.

Figure 8:
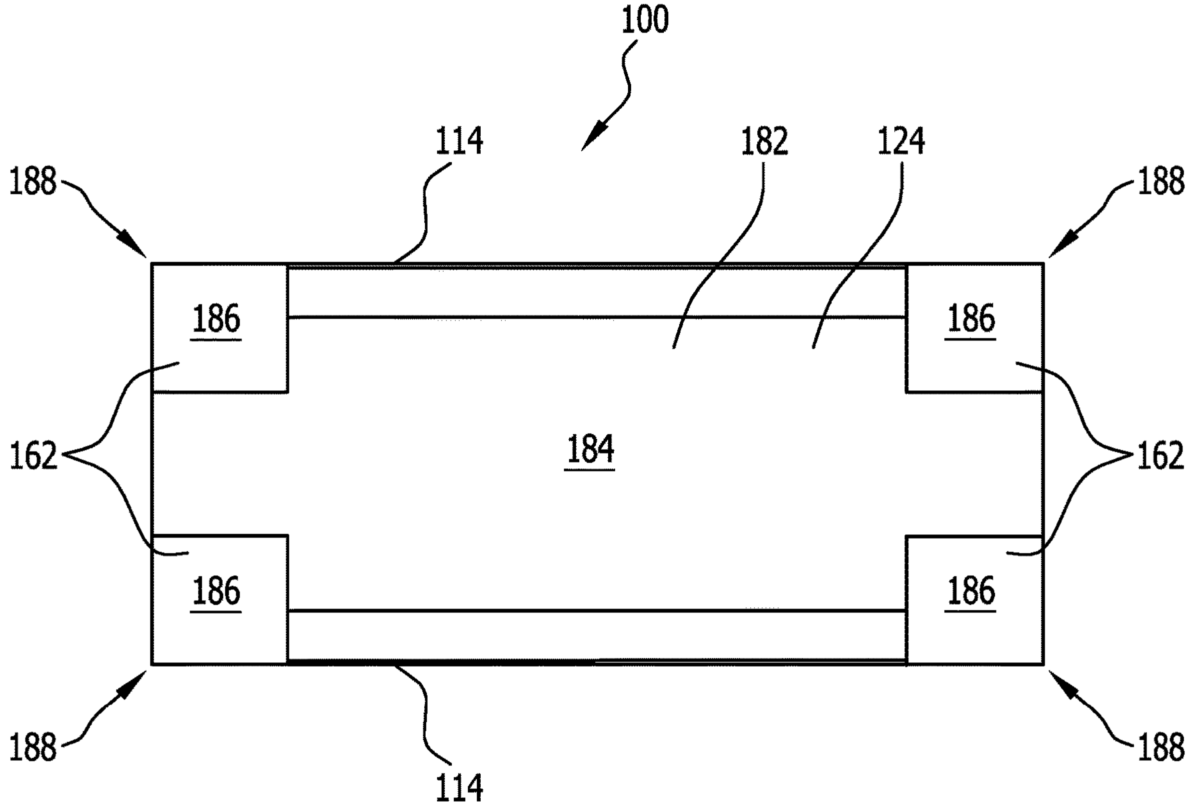
FIG. 8 shows a simplified illustration of the treatment system from FIG. 1, looking towards a cover wall that upwardly delimits the treatment space.

FIG. 8 shows a simplified illustration of a cover wall 124 of the treatment system 100.

In particular, one or more air streams are supplied to the treatment space 110 through this cover wall 124.

Here, the cover wall 124 comprises in particular a substantially central filter cover 182 through which a recirculating air stream is suppliable to the treatment region 108.

Further, the cover wall 124 comprises a plurality of inlets 162 for supplying an air stream, in particular one or more infeed air streams 186, to the access regions 152.

Here, the access regions 152 are arranged in corner regions 188 of the substantially cuboid treatment space 110.

One or more additional flow regions may be made facing the side walls 114, wherein a corresponding air stream supply may likewise be provided through the cover wall 124, where appropriate separated from the recirculating air stream 184, or indeed through one or more guide elements 138.

Figure 11:
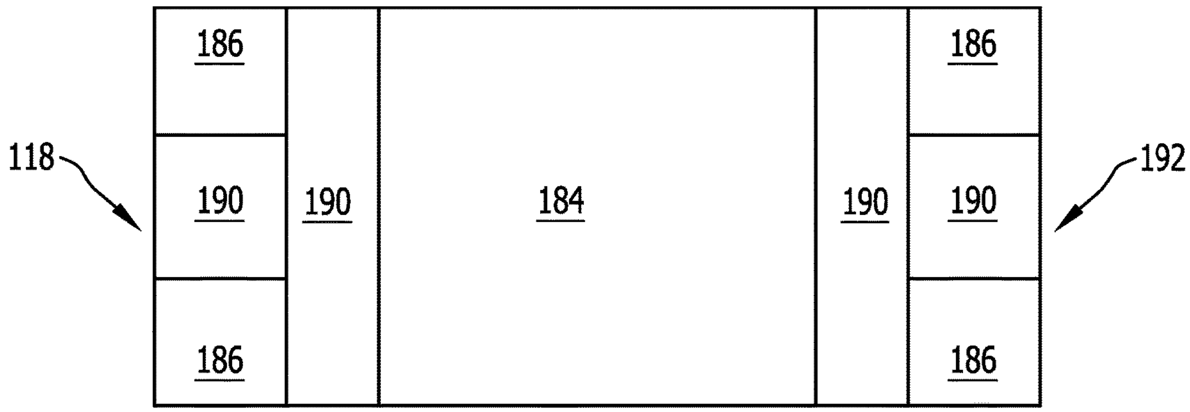
FIG. 11 shows a schematic illustration, corresponding to FIG. 8, of an alternative embodiment of a treatment system, in which alternative air guidance is provided.
Figure 12:
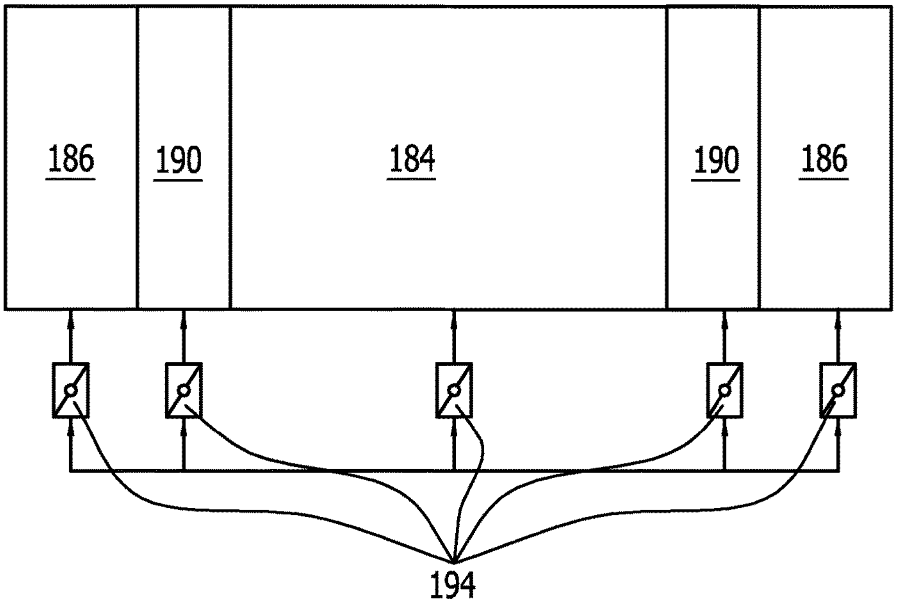
FIG. 12 shows a schematic illustration, corresponding to FIG. 8, of a further alternative embodiment of a treatment system, in which further alternative air guidance is provided.

FIGS. 11 and 12 illustrate alternative flow variants, which differ from the flow guidance illustrated in FIG. 8 substantially in that further flow regions are made, in particular between the recirculating air stream 184 that is supplied to the treatment region 108 and the infeed air streams 186 supplied to the access regions 152.

These further regions in particular form air locks or air curtains for more efficient separation of the atmosphere in the treatment region 108 on the one hand from the atmospheres in the access regions 152 on the other.

These regions are therefore designated separation regions 190 below.

A separation region 190 may moreover, as an alternative or in addition, be provided in the region of a supply opening 118 and/or an opposite guiding-away opening 192, wherein as a result in particular a lock function can be achieved in the region of conveying the workpieces 102.

Otherwise, the alternative flow guidance that is illustrated in FIG. 11 corresponds, as regards its structure and functioning, to the embodiment illustrated in FIG. 8, so in this respect reference is made to the description thereof above.

A further alternative embodiment, illustrated in FIG. 12, of flow guidance differs from the embodiment illustrated in FIG. 11 substantially in that a separate infeed air stream 186 is not supplied to each access region 152 but, rather, two flow portions, each encompassing two access regions 152, are formed continuously between the two side walls 114.

These flow portions are separated from the recirculating air stream 184 to be supplied to the treatment region 108 by the separation regions 190.

By suitable control of valves 194, preferably the volumetric flows and/or speeds of the air streams to be supplied to the individual regions can be controlled in a targeted manner, in particular in order to minimise noxious substance load in the access regions 152 and at the same time to minimise the conditioning expense of conditioning the recirculating air stream 184 and/or the infeed air stream 186.

Otherwise, the alternative embodiment of the flow guidance that is illustrated in FIG. 12 corresponds, as regards its structure and functioning, to the embodiment illustrated in FIG. 11, so in this respect reference is made to the description thereof above.

Figure 13:
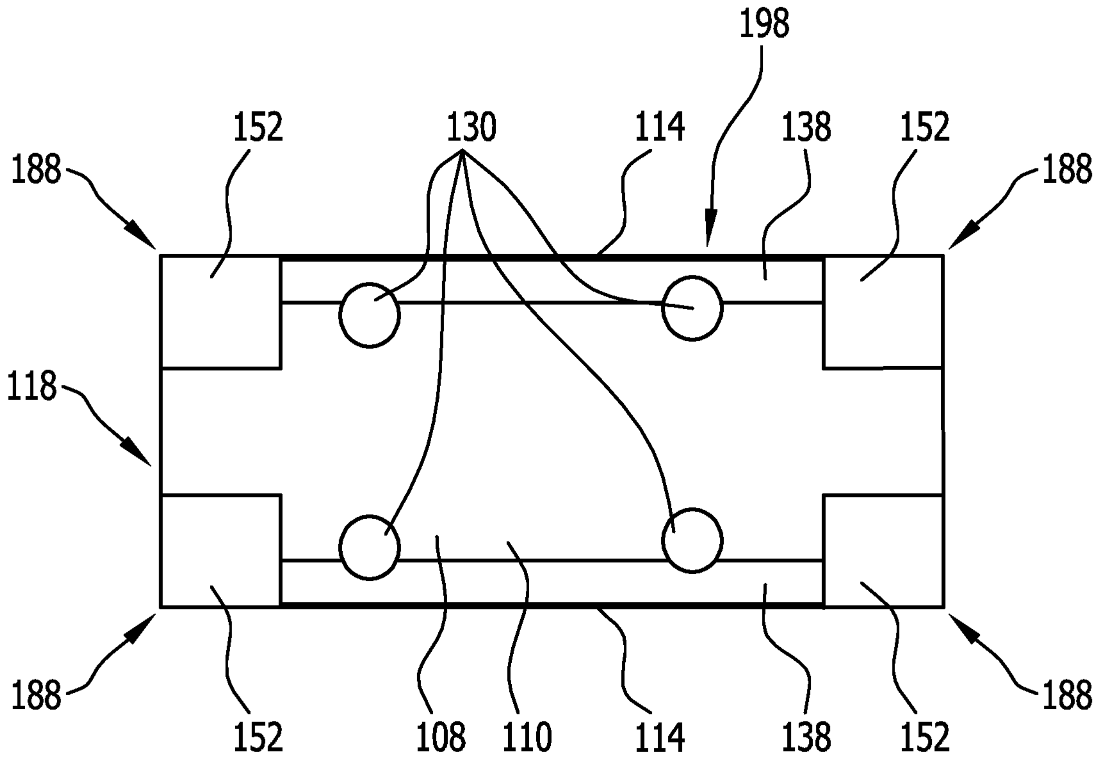
FIG. 13 shows a simplified illustration of a treatment system, wherein four operating devices and four access regions, arranged in corner regions of the treatment space, are provided.

FIG. 13 represents a simplified illustration of a treatment system 100.

The treatment system 100 is in this case illustrated in plan view from above and comprises an access region 152 in each of the corner regions 188 of a treatment space 110, and moreover two guide elements 138 that are arranged on mutually opposite side walls 114 and on each of which there are displaceably arranged two operating devices 130.

By means of the operating devices 130 the treatment region 108 is in particular accessible in order to treat workpieces 12 (not illustrated in FIG. 13).

It can in particular be seen from FIG. 13 that, by moving it suitably, each operating device 130 has the same access to an access region 152 and thus maintenance and/or set-up operations are performable on each operating device 130.

Figure 14:
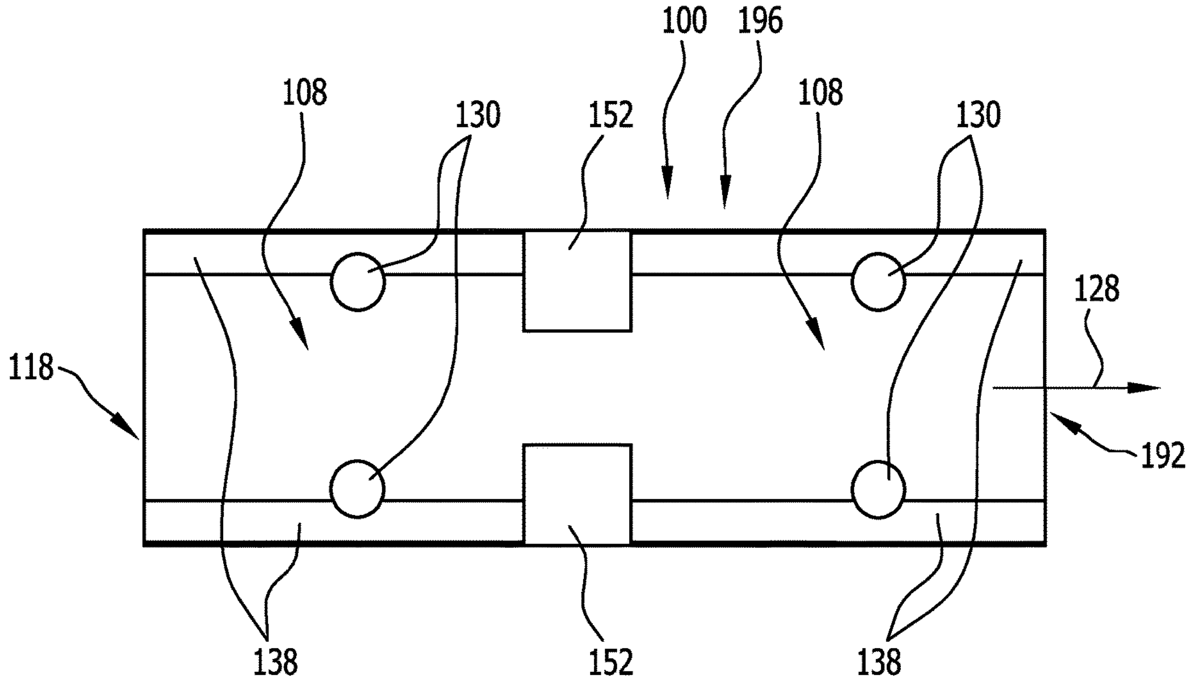
FIG. 14 shows a schematic illustration, corresponding to FIG. 13, of an alternative embodiment of a treatment system, in which an access region is respectively arranged between each two operating devices.

An alternative embodiment of a treatment system 100, illustrated in FIG. 14, differs from the embodiment illustrated in FIG. 13 substantially in that only two access regions 152 are provided, each arranged between two operating devices 130.

Each operating device 130 thus shares an access region 152 with a further operating device 130.

It may be provided for the operating devices 130 that are arranged upstream of the access regions 152, as seen in a direction of conveying 128, to serve for treating workpieces 102 in a first treatment region 108, while the operating devices 130 arranged downstream of the access regions 152 as seen in the direction of conveying 128 serve to treat workpieces 102 in a further treatment region 108.

In this way, in the embodiment of the treatment system 100 that is illustrated in FIG. 14, the access regions 152 are each associated with a plurality of operating devices 130 from different treatment regions 108.

The embodiment of the treatment system 100 that is illustrated in FIG. 14 may in particular be used in treatment lines 196, while the embodiment of the treatment system 100 that is illustrated in FIG. 13 may in particular be a treatment box 198.

In the embodiment of the treatment system 100 that is illustrated in FIG. 14, the guide elements 138 for guiding the operating devices 130 are interrupted by the access regions 152.

However, it may also be provided for the access regions 152 to be arranged substantially centrally on guide elements 138 that are continuous in the direction of conveying 128, and to be arranged offset from the vertical longitudinal centre plane of the treatment space 110.

Otherwise, the embodiment of the treatment system 100 that is illustrated in FIG. 14 corresponds, as regards its structure and functioning, to the embodiment illustrated in FIG. 13, so in this respect reference is made to the description thereof above.

Figure 15:
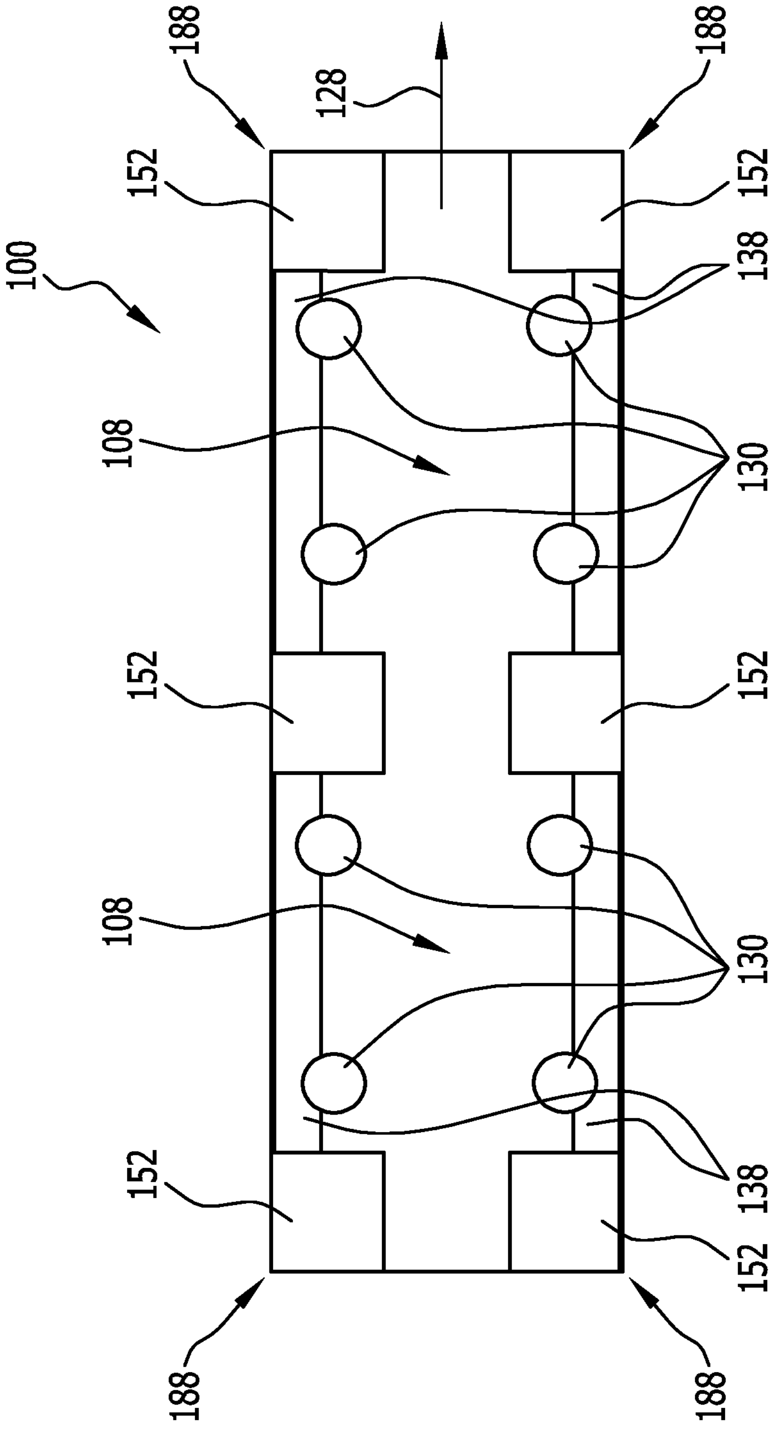
FIG. 15 shows a schematic illustration, corresponding to FIG. 13, of a further alternative embodiment of a treatment system, in which a plurality of treatment regions are provided, wherein both in the corner regions of the treatment space, which comprises the plurality of treatment regions, and in a central region respectively two access regions are provided, wherein two operating devices are respectively arranged in a conveying direction between each two access regions.

An embodiment of a treatment system 100 that is illustrated in FIG. 15 differs from the embodiment illustrated in FIG. 14 substantially in that further operating devices 130 and further access regions 152 are provided.

In particular, six access regions 152 are provided, of which four access regions 152 are arranged in the corner regions 188.

Two further access regions 152 are arranged in particular substantially centrally in the treatment space 110, as seen in the direction of conveying 128.

Preferably here, eight operating devices 130 are provided, wherein four guide elements 138 are provided for guiding the, in total, eight operating devices 130.

The access regions 152 are arranged in particular at ends of the guide elements 138, with the result that each operating device 130 has access to one of the access regions 152.

Otherwise, the embodiment of the treatment system 100 that is illustrated in FIG. 15 corresponds, as regards its structure and functioning, to the embodiment illustrated in FIG. 14, so in this respect reference is made to the description thereof above.

Figure 16:
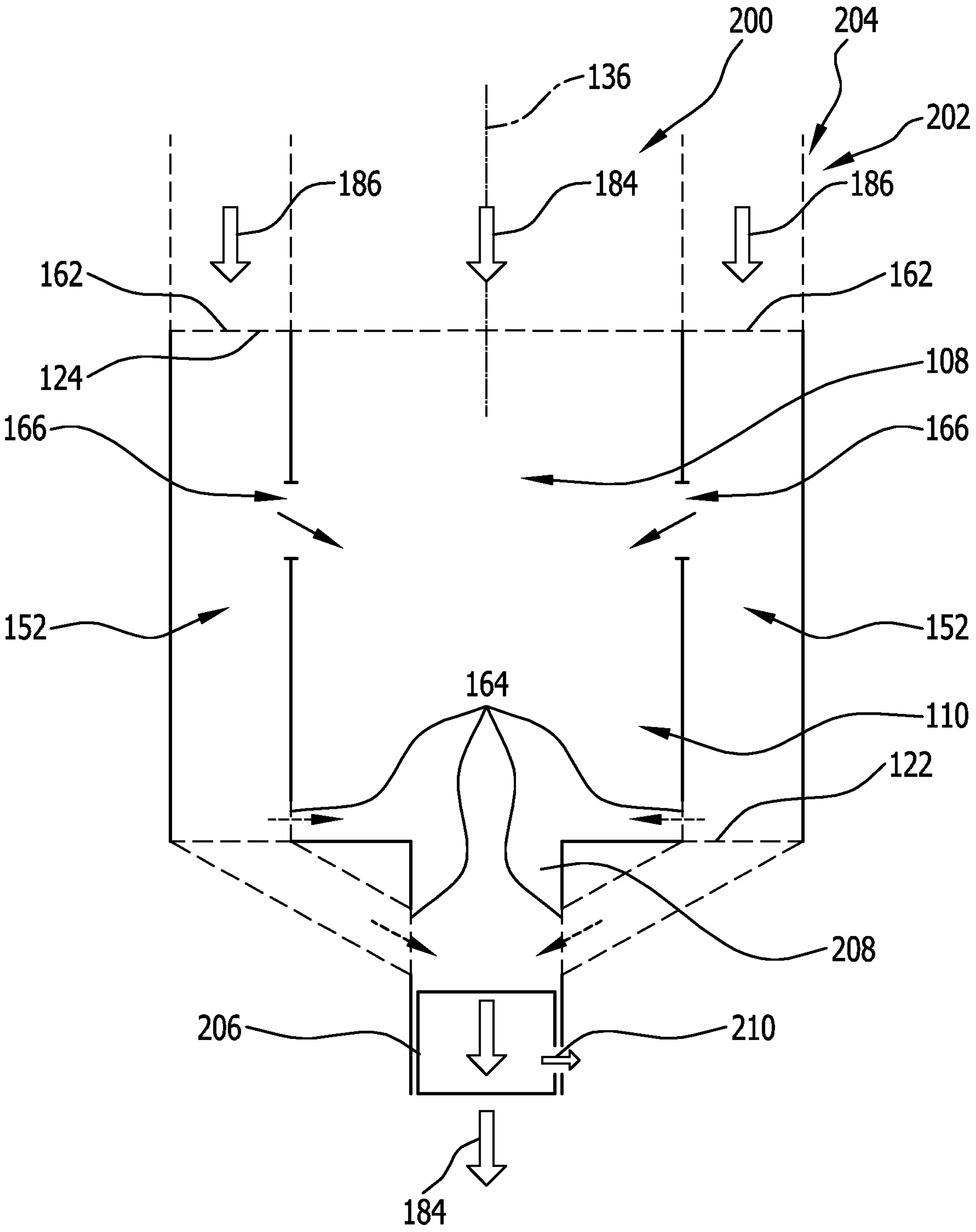
FIG. 16 shows a schematic vertical cross section through a treatment system, for the purpose of indicating different air guidance variants.
Figure 17:
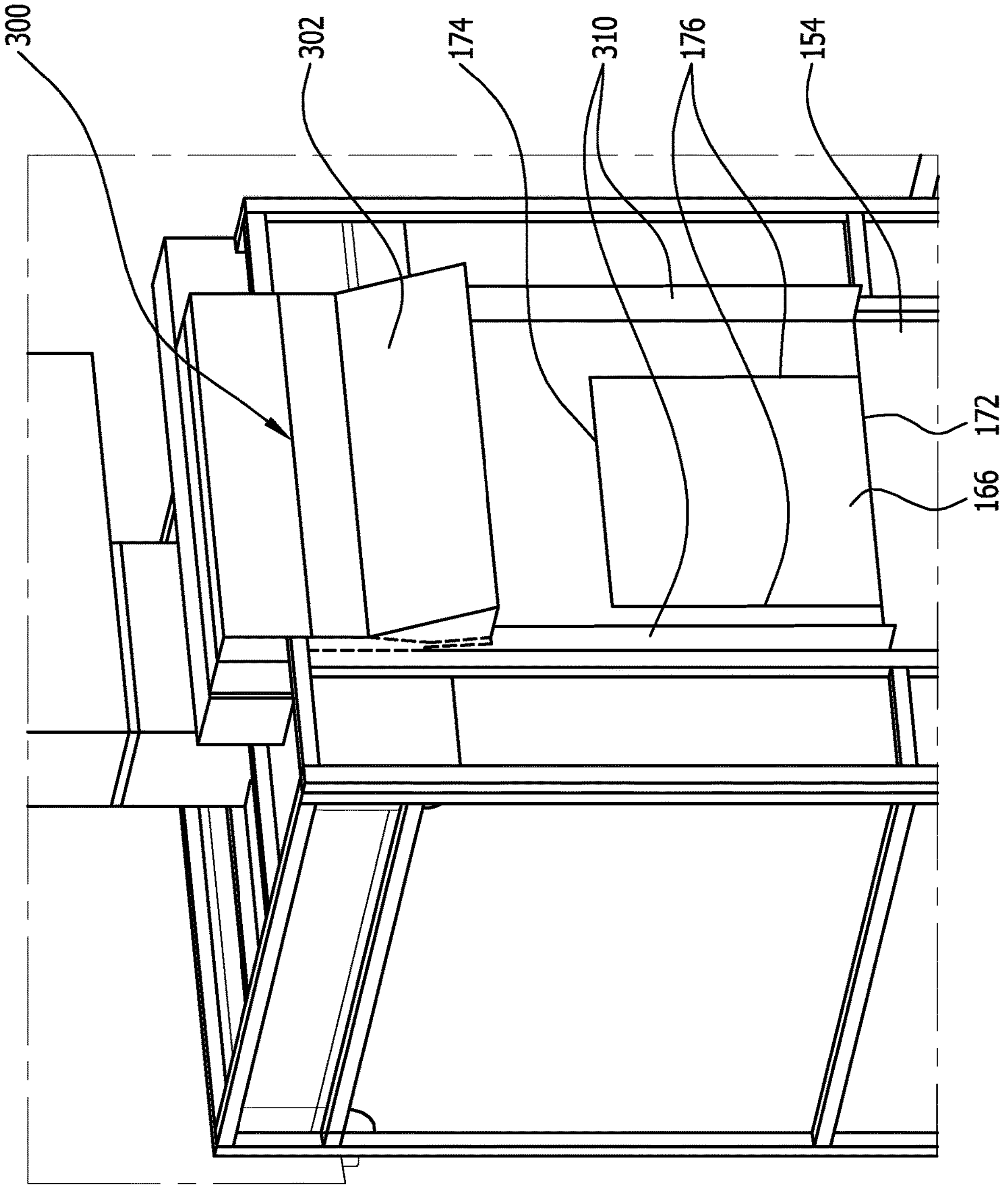
FIG. 17 shows a schematic, perspective illustration of a separating element and an approach opening arranged therein, wherein there is additionally provided an air curtain device for fluidic separation of a treatment region of the treatment system from an access region.

FIG. 16 shows a schematic illustration of air guidance that may in principle be provided in all of the treatment systems 100 that are illustrated and/or described.

For this reason, reference is made below in particular to the treatment system 100 according to FIGS. 1 to 10, since all the variations arising from FIG. 16 can also be provided in the case of the treatment system 100 according to FIGS. 1 to 10.

According to FIG. 16, the treatment system 100 comprises in particular a recirculating air supply device 200, by means of which a recirculating air stream 184 is suppliable to the treatment region 108.

Further, the treatment system 100 comprises an infeed air supply device 202 by means of which one or more infeed air streams 186, in particular fresh air streams and/or factory air streams, are suppliable to the access regions 152 through the inlets 162.

In particular, the supply of the recirculating air stream 184 and the infeed air stream 186 is by way of a plenum 204, in particular a split plenum above the treatment space 110.

Provided below the treatment space 110 there is in particular a stripping device 206 of the treatment system 10, by means of which the gas stream guided away out of the treatment space 110 can be freed of contaminants.

As can be seen from FIG. 16, the recirculating air stream 184 and the one or more infeed air streams 186 are combined, for example in the region of a raw gas shaft 208 below the treatment space 110, and hence mixed.

Some of the common stream that is obtained in this way is supplied to the treatment region 108 again, as a recirculating air stream 184. The return of the recirculating air stream 184, that is to say the supply out of the region of the treatment system 100 arranged below the treatment space 110 and into the region of the plenum 204 arranged above the treatment space 110, is preferably performed within an external contour of the treatment system 100, wherein for example according to FIG. 5 in particular it is possible to make use of a width region that is present on the outside of the side walls 14 as a result of components of the guide elements 138 and/or operating devices 130 projecting beyond the side wall 114.

As can further be seen from FIG. 16, preferably some of the common stream is guided away as exhaust air, through an exhaust air guide 210 of the treatment system 100.

For the purpose of maintaining a constant pressure, the part guided away as exhaust air corresponds substantially to the part supplied as infeed air.

A number of options exist for combining the recirculating air stream 184 with the one or more infeed air streams 186.

For example, it may be provided for the at least one infeed air stream 186 to flow into the treatment region 108 exclusively through the approach openings 166.

As an alternative or in addition, it may be provided for there to be provided above or below the base wall 122, in a lower end region of the access region 152 in relation to the direction of gravity g, one or more outlets 164 through which the at least one infeed air stream 186 is guided to the recirculating air stream 184.

The outlets 164 may be arranged in particular above the base wall 122 and thus open into the treatment region 108.

One or more outlets 164 are preferably arranged facing the vertical longitudinal centre plane 136 of the treatment space 110, or indeed oriented for example running perpendicularly thereto, that is to say arranged or formed in separating elements 154 that are oriented transversely, in particular perpendicularly, to the vertical longitudinal centre plane 136 of the treatment space 110.

Further, it may be provided for one or more outlets 164 to open directly into the raw gas shaft 208, and thus for the recirculating air stream 184 to be mixed with the at least one infeed air stream 186 only once it is in the raw gas shaft 208.

It may further be advantageous if an outlet 164 is provided that is arranged in the same separating element 154 as the approach opening 166, wherein the outlet 164 is in particular arranged vertically directly below the approach opening 166.

It may be favourable if one or more or all of the outlets 164 are adjustable in respect of a respective cross-sectional surface for the purpose of adjusting, in particular controlling by open or closed-loop control, a volumetric flow, for example manually or automatically by means of a valve device or damper device. As a result, in particular it is possible to exert an effect on the flow conditions and/or flow guidance within the treatment space 110.

As a result of suitably guiding the recirculating air stream 184 and/or the infeed air streams 186, it is possible, in particular in the at least one access region 152, to achieve atmospheric conditions with minimal concentrations of noxious substances, which enable one or more persons to be in the at least one access region 152 without protection. Thus, the fact that workpieces 102 are being treated in the treatment region 108 is not an obstacle to performing maintenance and/or set-up operations on the one or more operating devices 130. Thus, the treatment system 100 can be used for workpiece treatment particularly efficiently.

FIGS. 17 to 20 illustrate an optional further development of the treatment system 100.

This further development may in principle be provided in all treatment systems 100 in which a treatment region 108 is separated from an access region 152 by means of a separating element 154.

In particular if there is an approach opening 166 arranged in the separating element 154, it is possible, by means of an air curtain device 300 according to the embodiment illustrated in FIGS. 17 to 20, to achieve an advantageous fluidic separation of the atmosphere prevailing in the treatment region 108 on the one hand from the atmosphere prevailing in the access region 152 on the other.

For this purpose, the air curtain device 300 preferably comprises a deflection element 302, which takes the form for example of a baffle plate oriented obliquely in relation to the direction of gravity g. The deflection element 302 forms for example an angle $\beta$ of 25° with the direction of gravity g.

By means of the deflection element 302, it is possible to divert an air stream that is guided through the treatment region 108 from top to bottom, in relation to the direction of gravity g, away from the separating element 154, in particular in order to prevent the air stream flowing through the treatment region 108 from flowing through the approach opening 166 and into the access region 152.

Further, the air curtain device 300 preferably comprises one or more nozzles 304, for example a slot nozzle 306.

The slot nozzle 306 is arranged in particular below the deflection element 302 and makes it possible for air, for example infeed air, in particular fresh air, to flow into the spatial region below the deflection element 302.

The air supplied through the nozzle 304 is in particular supplied at an angle $\alpha$ (nozzle angle) between the separating element 154 and the deflection element 302, wherein the angle $\alpha$ is for example approximately 15°. This angle $\alpha$ is preferably adjustable manually and/or automatically, for example by a motor, in particular during start-up of the air curtain device 300 and/or during operation of the air curtain device 300.

The air that is supplied through the nozzle 304 flows in particular along the separating element 154, downwards in relation to the direction of gravity g, and thus forms an air curtain on the separating element 154, that is to say between the separating element 154 and the air flowing through the treatment region 108.

The deflection element 302 and the nozzle 304 are preferably arranged at a spacing from the approach opening 166, with the result that it is possible to establish a uniform and/or laminar flow in a separating element portion 308 of the separating element 154 that surrounds the approach opening 166 and is in particular planar. As a result, preferably little turbulence is produced in the region of the approach opening 166 and thus efficient fluidic separation is produced between the treatment region 108 and the access region 152.

On either side of the approach opening 106, in particular from the deflection element 302 at least as far as the lower edge 172 of the approach opening 106, there preferably extend two lateral diverting elements 310 of the air curtain device 300.

The lateral diverting elements 310 project in particular perpendicularly away from the separating element 154 and extend substantially in the vertical direction and parallel to one another.

By means of the lateral diverting elements 310, it is preferably likewise possible to optimise laminar flow in the region of the approach opening 166. In particular, lateral turbulence or transverse flow can preferably be minimised or avoided entirely by means of the lateral diverting elements 310.

The air supplied to the nozzle 304 is in particular supplied to the nozzle 304 by way of a nozzle casing 312 of the air curtain device 300. For the purpose of optimum and/or uniform air provision to the nozzle 304 by way of the nozzle casing 312, the nozzle casing 312 preferably has a height of at least approximately 70 mm, in particular at least approximately 100 mm.

The nozzle casing 312 is for its part fed for example by a ventilator (not illustrated), wherein additional conditioning devices for heating, cooling, humidifying and/or dehumidifying the air stream to be supplied to the nozzle 304 may be provided.

In particular, the nozzle casing 312, together with the nozzle 304, is a constituent part of the air supply device 199, in particular the infeed air supply device 202.

By means of the air supply device 199, an air stream is preferably suppliable on the one hand to the nozzle casing 312 and on the other to a distributor duct 314 by means of which air is in turn suppliable to one or more supply ducts 316 of the treatment system 100.

Figure 18:
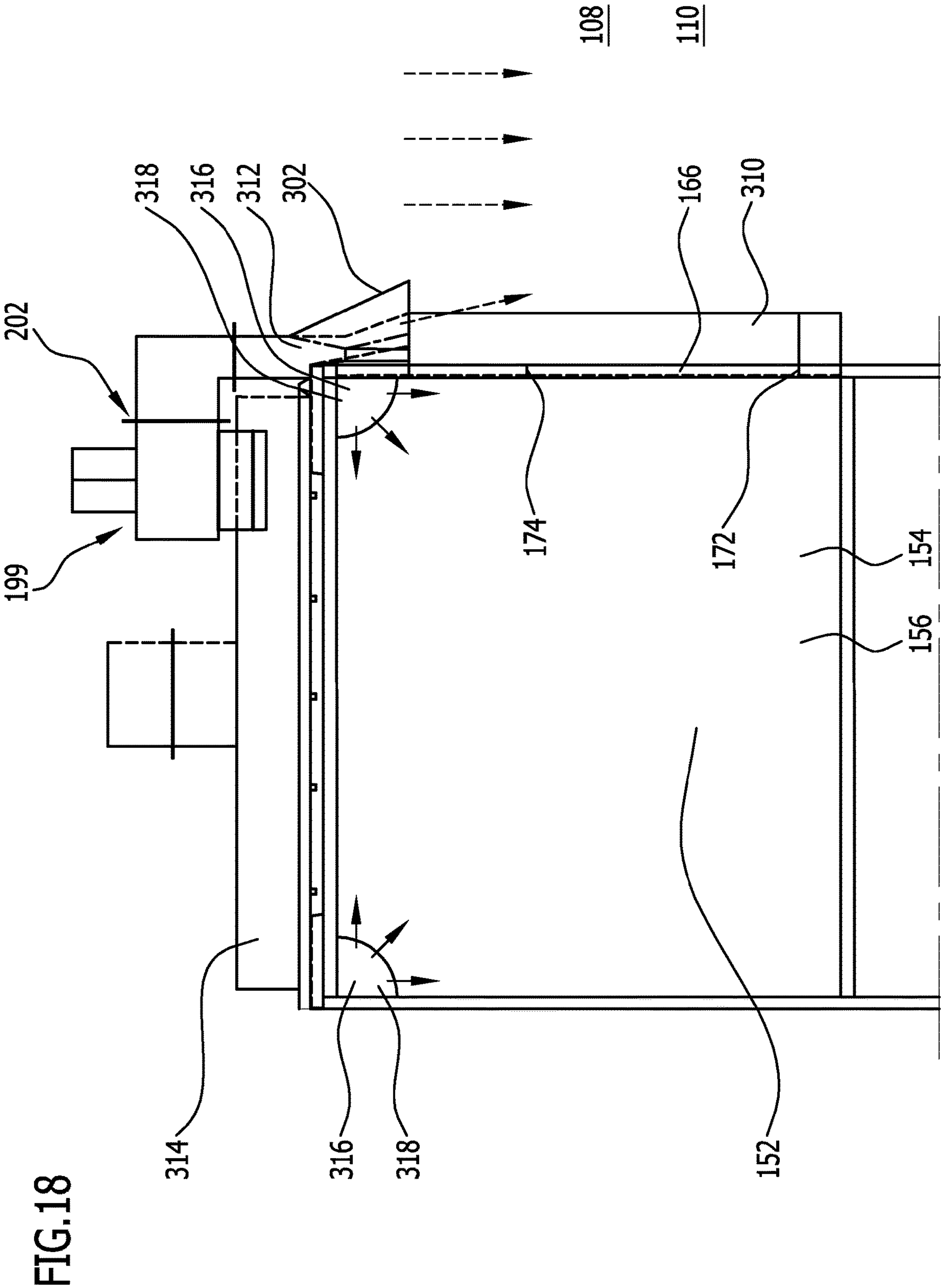
FIG. 18 shows a schematic vertical section through the separating wall, the approach opening and the air curtain device from FIG. 17.
Figure 19:
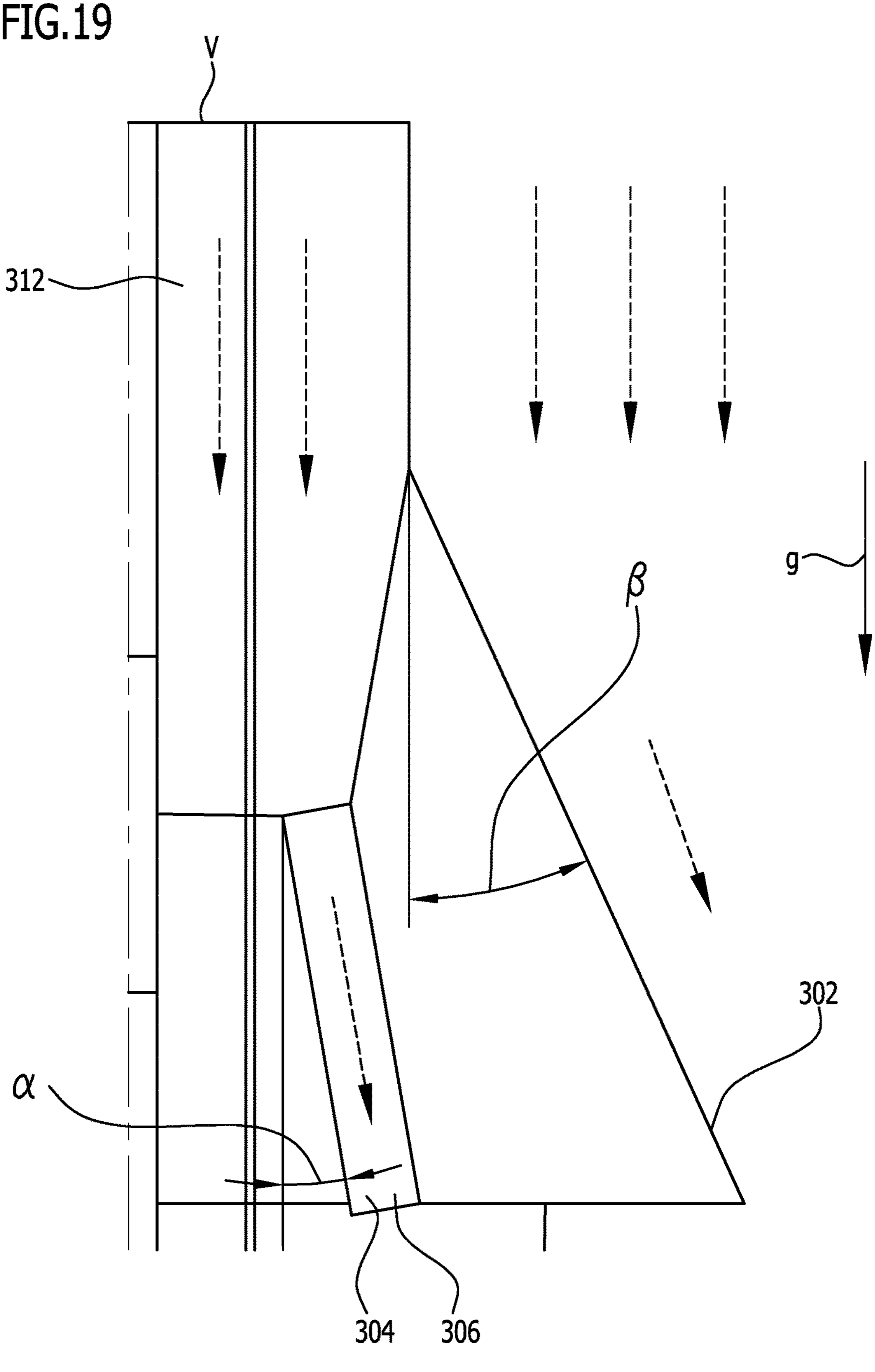
FIG. 19 shows an enlarged illustration of the air curtain device according to the illustration in FIG. 18.
Figure 20:
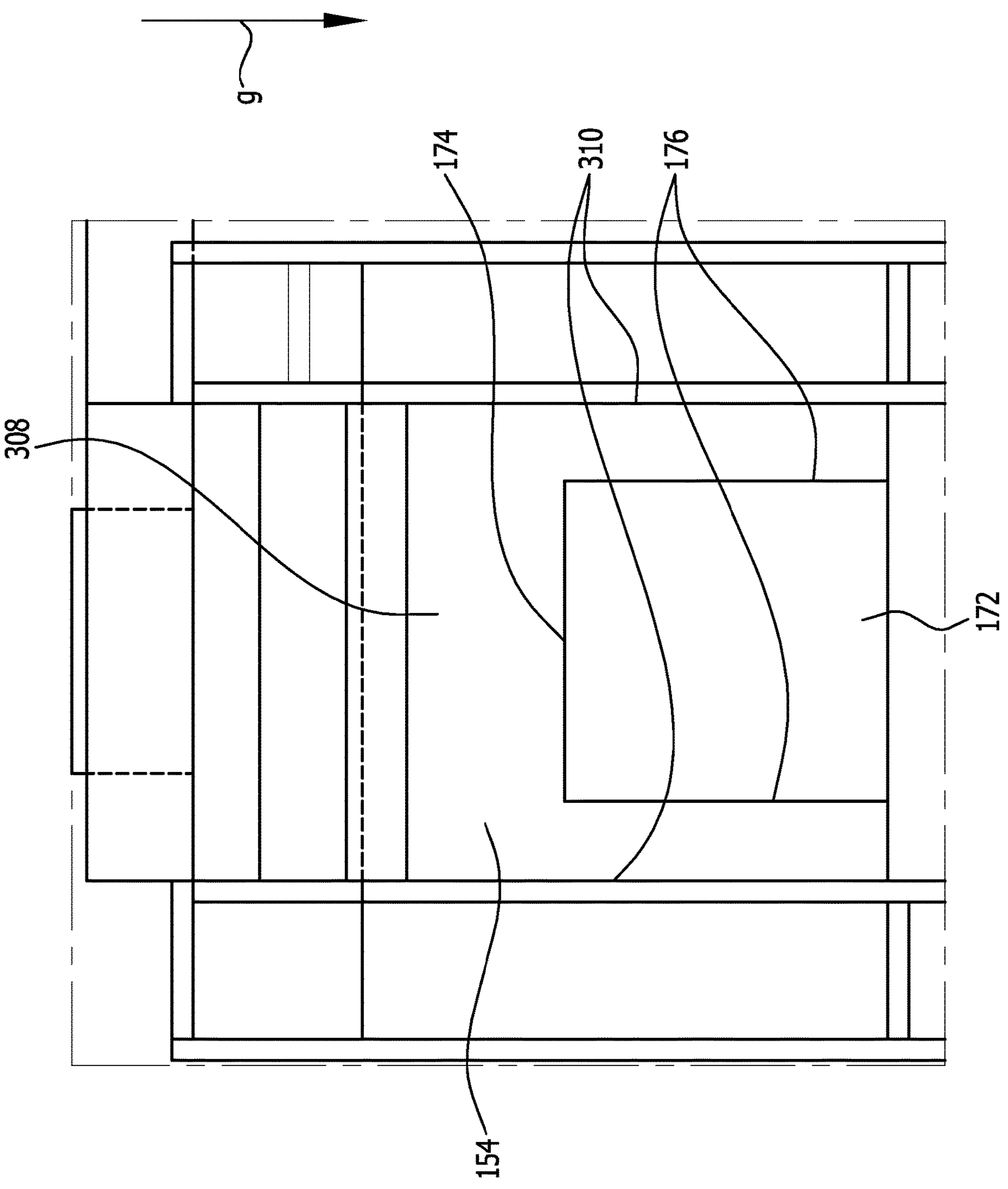
FIG. 20 shows a schematic front view of the separating wall, the approach opening and the air curtain device from FIG. 17.

The one or more supply ducts 316 open for example into one or more fan nozzles 318, for example fan nozzles 318 that take the form of a quarter cylinder and/or have a cross section that takes the form of a quarter circle and/or are arranged in two corner regions at an upper end of the access region 152, in relation to the direction of gravity g (see in particular FIG. 18).

Through the fan nozzles 318 it is preferably possible to supply an air stream, in particular an infeed air stream, for example a fresh air stream, to the access region 152.

As an alternative or in addition to fan nozzles, textile ducts may for example be provided, in which the air can flow through a textile wall and into the access region 152.

As a result of a suitable selection of the flow conditions, directions of flow, diverting elements, in particular lateral diverting elements 310, deflection elements 302, angles $\alpha$, $\beta$ and/or air temperatures, it is preferably possible to optimise a fluidic separation of the access region 152 from the treatment region 108.

Figure 21:
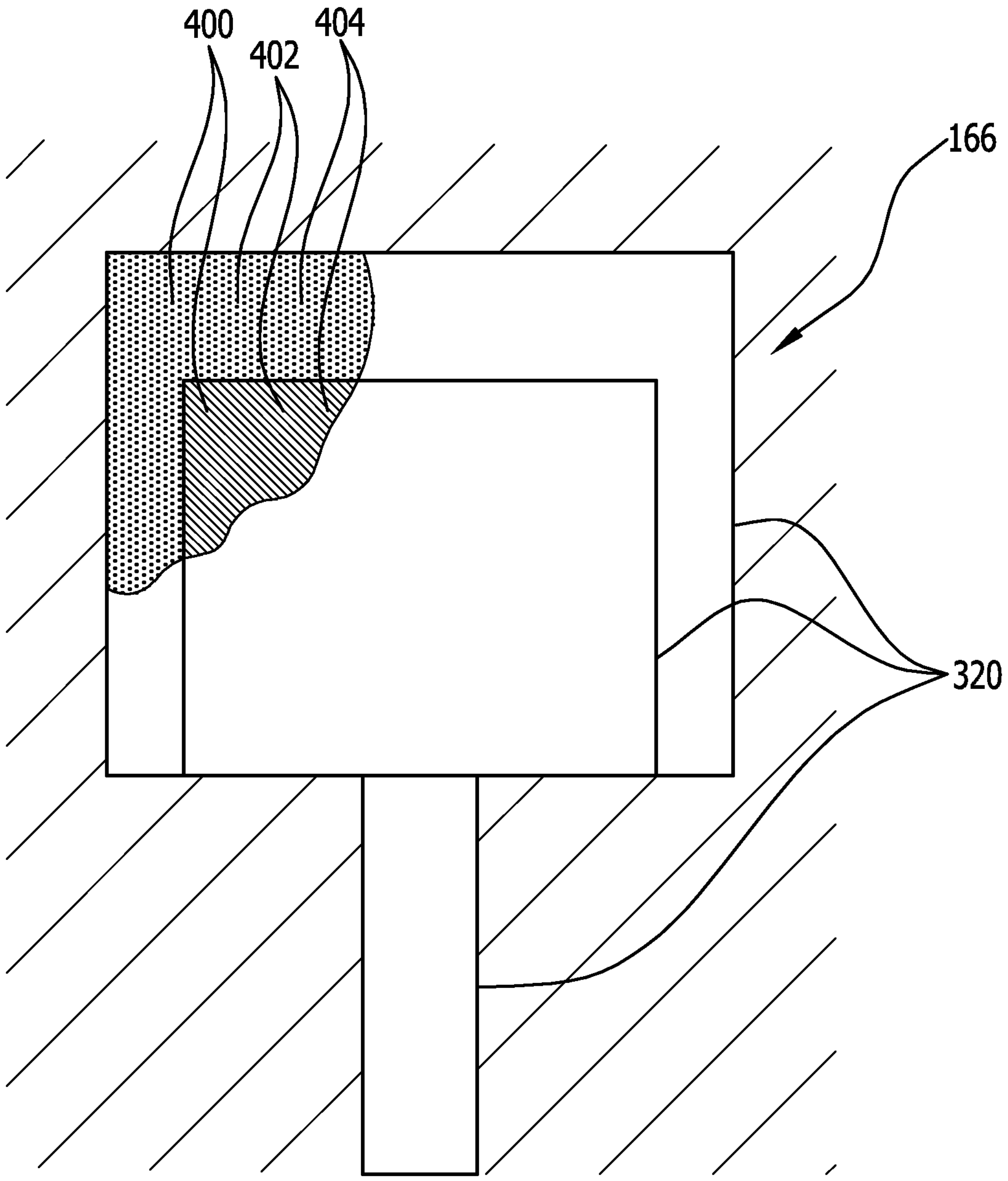
FIG. 21 shows a schematic plan view of an alternative embodiment of an approach opening that comprises a plurality of opening portions.

A front view of an approach opening 166, illustrated in FIG. 21, shows an alternative embodiment of an approach opening 166, in which it is not the case that only a predetermined cross section is permanently open or temporarily openable, but in which, rather, different opening portions 320 are provided that can be opened and/or closed, depending on the operating mode or other general conditions.

In particular, for example the following opening portions 320 can be provided:

A minimum opening portion that is for example rectangular and is surrounded by a maximum opening portion that is for example rectangular.

Moreover, an additional opening portion may for example be provided, in particular an elongate additional opening portion below the minimum opening portion and the maximum opening portion.

The minimum opening portion is for example a temporarily openable or always passable window that has, in particular for the purpose of preventing climbing through it, an edge length of preferably less than 545 mm. As an alternative, an edge length of for example at most approximately 900 mm may be provided, in which case an additional measure for preventing climb-through is preferably provided. The minimum opening portion serves in particular for performing maintenance work of short duration.

The maximum opening portion preferably has larger dimensions than the minimum opening portion and is preferably closable mechanically, at least the part of the maximum opening portion that projects beyond the minimum opening portion if the two opening portions overlap. A maximum edge length of the maximum opening portion is preferably at most approximately 1 400 mm, for example at most approximately 1 200 mm, in particular at most approximately 1 000 mm. The maximum opening portion serves in particular for relatively long-duration maintenance work, for example for the time taken to replace a part on an operating device 130.

The additional opening portion may for example, like the maximum opening portion, likewise provide a closable additional opening for the minimum opening portion, wherein the shape of the additional opening portion is preferably adapted to a shape of an operating device 130 to be maintained. In particular, the additional opening portion may have a height of at least approximately 600 mm and/or at most approximately 1 000 mm, for example approximately 800 mm, and/or a width of at least approximately 200 mm and/or at most approximately 600 mm, for example approximately 300 mm. The additional opening portion serves in particular for maintaining and/or cleaning an operating device 130.

Preferably, arranged or arrangeable at one or more approach openings 166 respectively are one or more blocking elements 400. By means of the blocking elements 400, preferably individual or a plurality or all of the opening portions 320 of the respective approach opening 166 are closable mechanically. For example, the blocking elements 400 are dampers 402 or doors 404 that are configured to be put in an open position or a blocking position for example by means of one or more hinges or sliding elements.

One or more or all of the blocking elements 400 are optionally partly or entirely transparent, in particular such that a person can see through them. In particular, it may be provided for one or more or all of the blocking elements 400 to be formed from or to comprise a transparent material. As an alternative or in addition, it may be provided for one or more or all of the blocking elements 400 to take a form and/or to be arranged such that they are not entirely continuous, but for example interrupted, for example in the manner of a grating.

One or more or all of the blocking elements 400 are optionally configured to be put into a blocking position and/or an open position automatically, in particular driven autonomously and/or mechanically.

As an alternative or in addition, it may be provided for one or more or all of the blocking elements 400 to be configured to be put into a blocking position and/or an open position manually, in particular by a person, for example a worker.

The approach opening 166 illustrated in FIG. 21, or variants thereof, may in principle replace any of the approach openings 166 described above.

Figure 22:
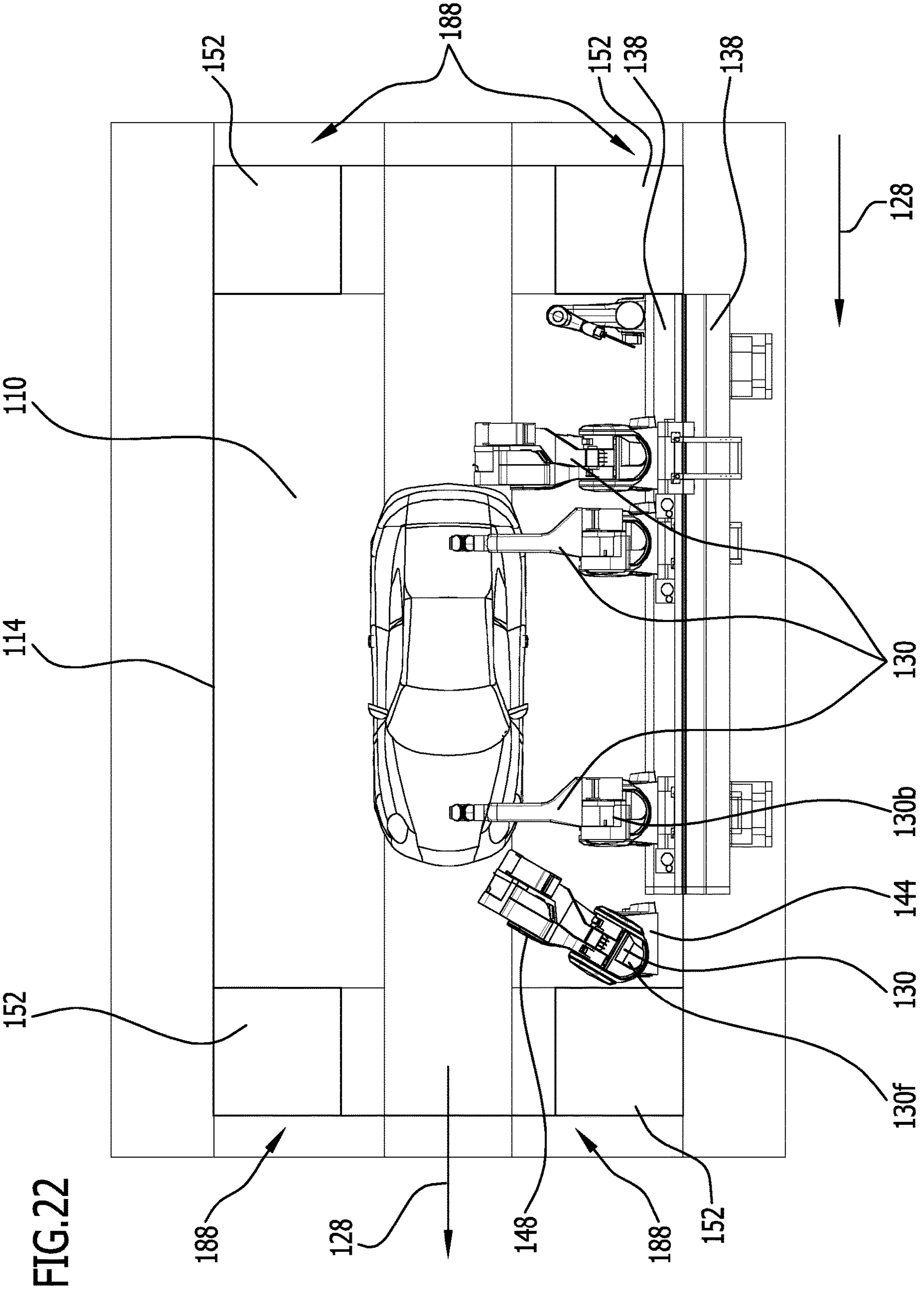
FIG. 22 shows an illustration, corresponding to FIG. 4, of an alternative embodiment of the treatment system, in which both movable operating devices and fixed operating devices are provided.
Figure 23:
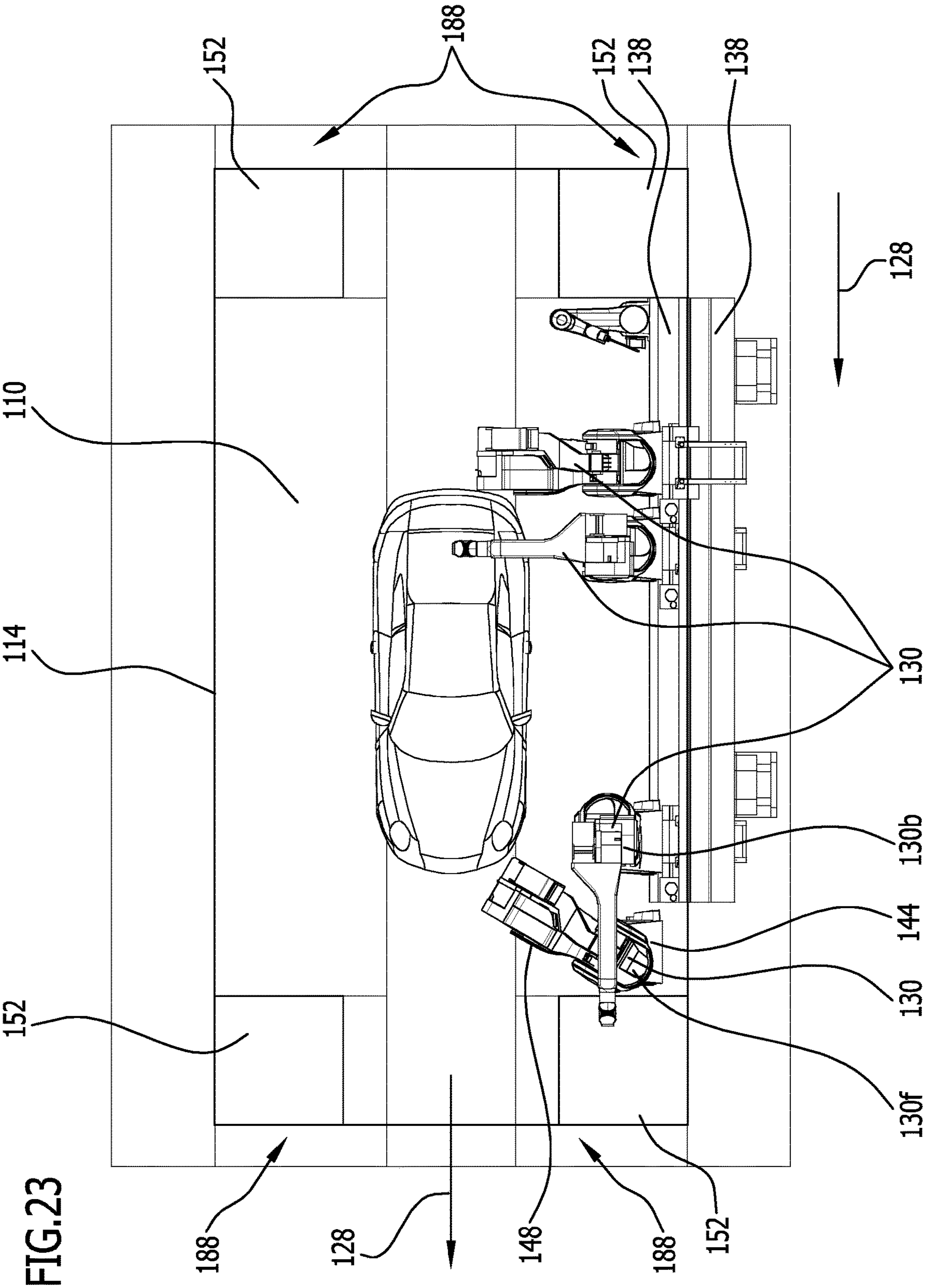
FIG. 23 shows an illustration, corresponding to FIG. 4, of the treatment system from FIG. 22, wherein a movable operating device is arranged in an access position.

FIGS. 22 and 23 illustrate an alternative embodiment of a treatment system 100 that differs from the embodiment illustrated in FIGS. 1 to 10 substantially in that the treatment system 100 comprises one or more fixed operating devices **130*f*. A fixed operating device 130*f* is an operating device 130 that comprises an operational base 144 that is of fixed location and/or unmovable. An operational arm 148 of an operating device 130 of this kind is movable relative to the operational base 144 but not in common with the operational base 144**.

In addition to the one or more fixed operating devices **130*f*, the treatment system 100 according to FIGS. 22 and 23 comprises one or more movable operating devices 130*b* in which the respective operational base 144 is arranged and/or formed to be movable, in particular to be displaceable along a guide element 138**.

The fixed operating device **130*f* is arranged between one or more movable operating devices 130*b* on the one hand and an access region 152 on the other, in relation to the direction of conveying 128, wherein the same access region 152 is associated with this fixed operating device 130***f* and these one or more movable operating devices 130*b*.

As can be seen from FIG. 23, one or more movable operating devices 130*b* may preferably engage over or embrace one or more fixed operating devices 130*f*, in particular on an upper side and/or on a side that is remote from a centre of the treatment space 110, of an operational arm 148 of the one or more fixed operating devices 130*f*, in order to supply an operational element 146 of the respective movable operating device 130*b* to the access region 152 or to introduce it into the access region 152.

In FIGS. 22 and 23, the operating devices 130 are illustrated only on one side. Preferably, an identical configuration of the operating devices 130 is provided on the opposite side of the treatment space 110, wherein these may be arranged to be substantially symmetrical to a vertical longitudinal centre plane of the treatment space 110 or indeed symmetrical in relation to a vertical longitudinal centre axis of the treatment space 110. The fixed operating devices 130*f* are then preferably arranged opposite one another accordingly, in relation to the vertical longitudinal centre plane, or indeed arranged diametrically opposite one another.

Otherwise, the embodiment of the treatment system 100 that is illustrated in FIGS. 22 and 23 corresponds, as regards its structure and functioning, to the embodiment illustrated in FIGS. 1 to 10, so in this respect reference is made to the description thereof above.

Figure 24:
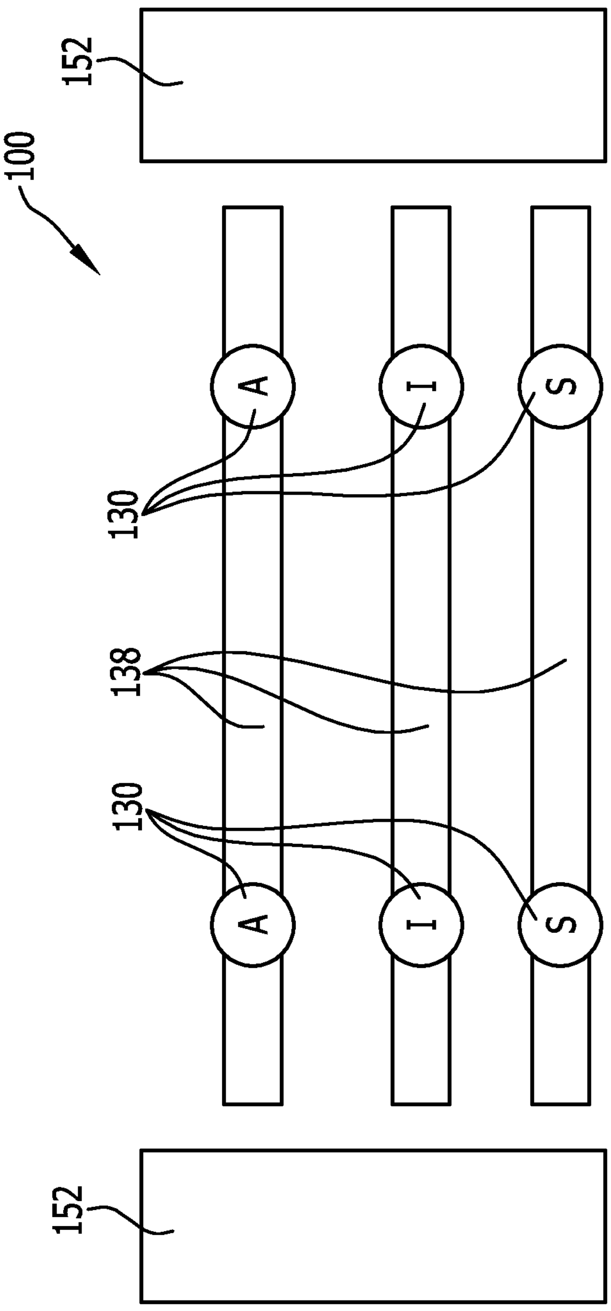
FIG. 24 shows a schematic illustration of a treatment system, in which three guide elements each having two functionally identical operating devices are provided.
Figure 25:
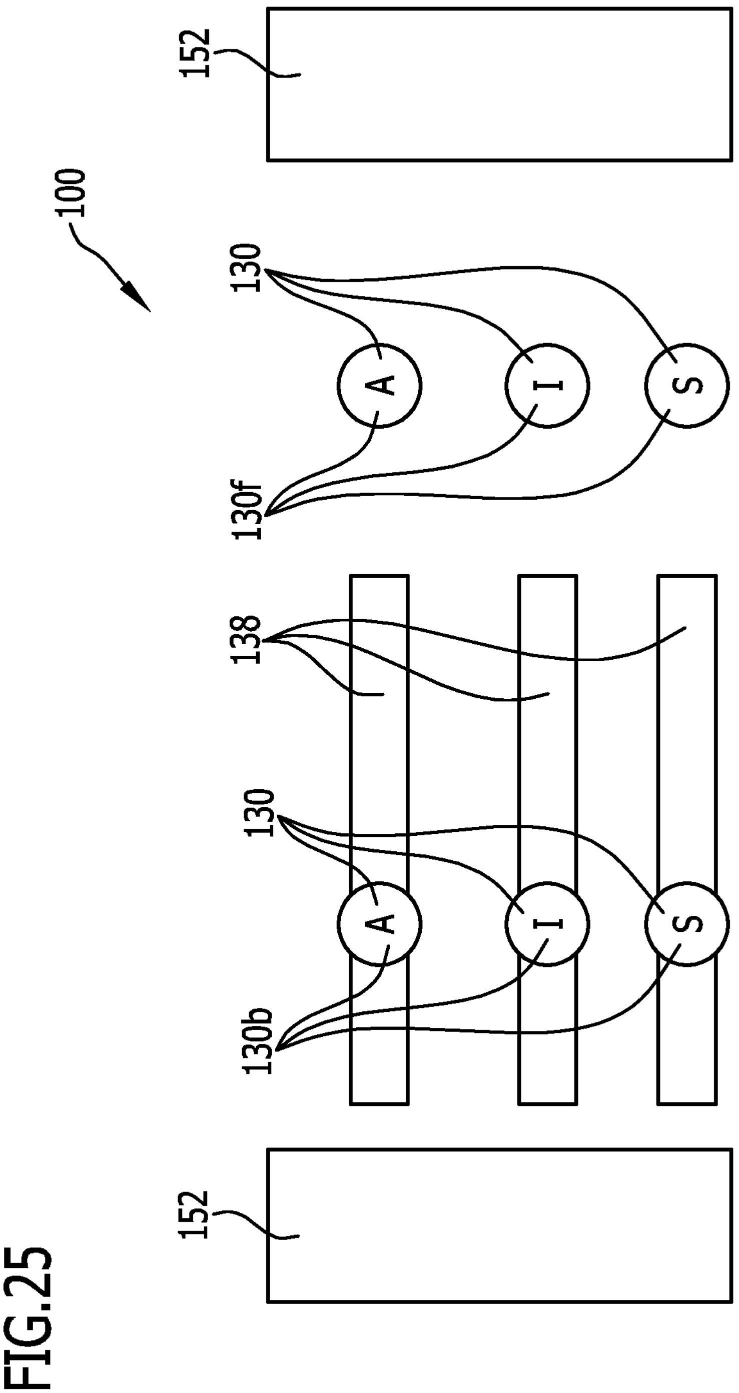
FIG. 25 shows an illustration, corresponding to FIG. 24, of an alternative embodiment of a treatment system, in which three fixed operating devices and three movable operating devices are provided.
Figure 26:
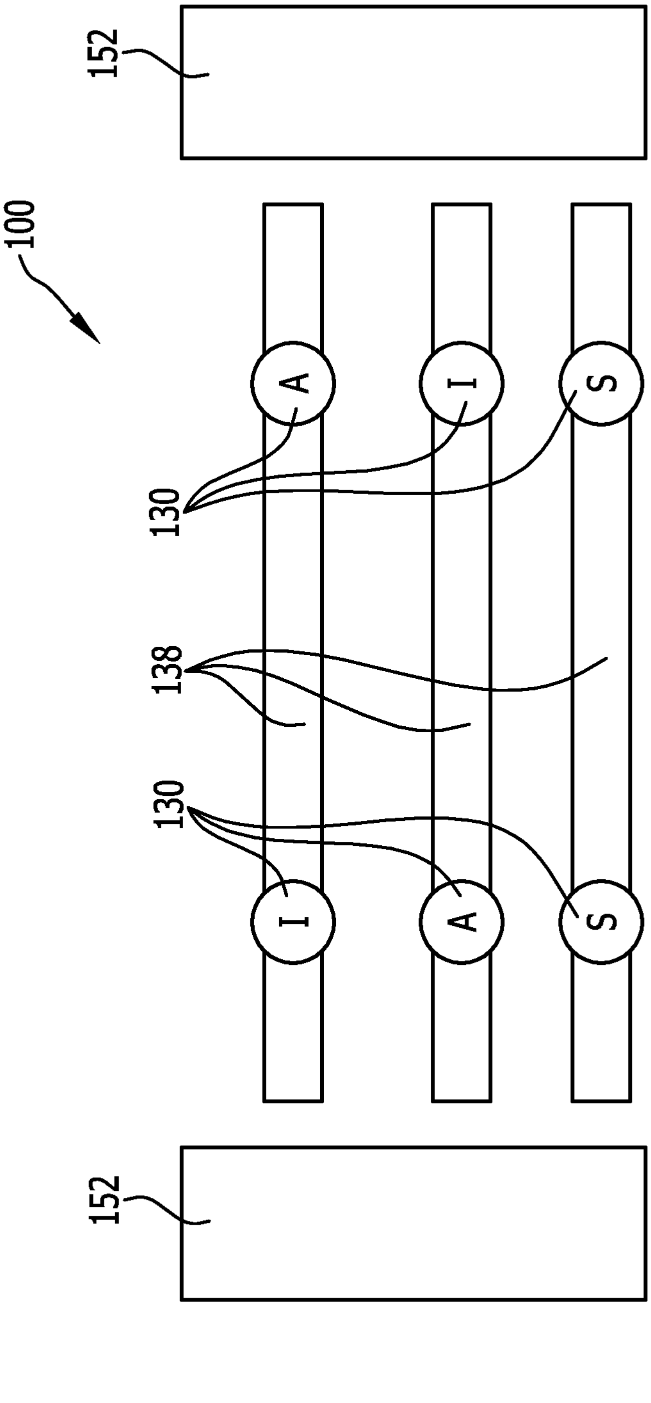
FIG. 26 shows an illustration, corresponding to FIG. 24, of an alternative embodiment of a treatment system, in which two guide elements each having functionally different operating devices and one guide element having two functionally identical operating devices are provided.

FIGS. 24 to 26 illustrate different variants for the arrangement and securing of the operating devices 130. All these variants, and further variants resulting therefrom, may be used for any of the variants of treatment systems 100 that are described.

According to FIG. 24, three guide elements 138 are provided between two access regions 152. Each guide element 138 carries respectively two operating devices 130, so the total of six operating devices 130 are movable operating devices 130. The operating devices 130 of each guide element 138 are functionally identical, at least in respect of their respective main function. For example, two operating devices 130 that take the form of external painting robots A are arranged on a topmost guide element 138. Arranged on a bottommost guide element 138 are for example two operating devices 130 that take the form of manipulating robots S (for example so-called SCARAs). In between, on a middle guide element 138, there are arranged for example two operating devices 130 that take the form of internal painting robots I.

As an alternative to the embodiment illustrated in FIG. 24, it may be provided for the bottommost guide element 138 to be omitted and for one or more manipulating robots S to take the form of fixed operating devices 130*f*. In particular here, a single manipulating robot S that serves in particular for opening a bonnet or boot of a workpiece 102 may be provided on and/or below an end region of the remaining two guide elements 138. One or more doors of the workpiece 102 are then openable for example by means of one or more of the movable operating devices 130*b*. As an alternative, it may further be provided for one or more doors of the workpiece 102 to be openable for example by means of one or more manipulating robots S that take the form of fixed operating devices 130*f*, while a bonnet and/or boot of the workpiece 102 is openable in particular by means of one or more fixed operating devices 130*f*.

According to FIG. 25, three guide elements 138 are provided between two access regions 152. However, these take a shorter form and each carry only a single operating device 130. In addition to the movable operating devices 130*b* formed in this way, according to FIG. 25 three fixed operating devices 130*f* are provided. In this case, respectively one movable operating device 130*b* and one fixed operating device 130*f* take a functionally identical form and/or are mounted at at least approximately the same height in the treatment space 110. The topmost operating devices 130 here take the form for example of external painting robots A. The bottommost operating devices 130 take the form for example of manipulating robots S (for example so-called SCARAs). The operating devices 130 arranged in between take the form for example of internal painting robots I. Preferably, the fixed operating devices 130*f* are associated with one of the access regions 152, while the movable operating devices 130*b* are associated with a further one of the access regions 152.

As an alternative to the embodiment illustrated in FIG. 25, it may be provided for the upper guide element 138 in FIG. 25, together with the upper operating devices 130, to be omitted and for a guide element 138 that runs in particular continuously from one access region 152 to a further access region 152 to be provided with two, or more than two, in particular movable operating devices 130*b*, wherein these movable operating devices 130*b* are preferably universal painting robots that serve to paint both the outside and the inside. On the same or a further guide element 138, in particular in an end region on the same guide element 138, there may be arranged in particular an operating device 130 that takes the form of a manipulating robot S, wherein this operating device 130 is a fixed operating device 130*f* or indeed a movable operating device 130*b*. Below the said guide element 138 there may then be arranged in particular a further guide element 138 of comparatively short construction, which for example carries only one fixed operating device 130*f* or movable operating device 130*b* taking the form of a manipulating robot S.

The variant according to FIG. 26 corresponds very largely to the variant illustrated in FIG. 24, wherein some of the guide elements 138 are provided with functionally different operating devices 130. Thus, the topmost guide element 138 is provided for example with an operating device 130 taking the form of an internal painting robot I and an operating device 130 taking the form of an external painting robot A. The middle guide element 138 is for example likewise provided with an operating device 130 taking the form of an internal painting robot I and an operating device 130 taking the form of an external painting robot A. The functionally different operating devices 130 here are arranged such that on each side of the guide elements 138, and thus associated with each access region 152, there are provided in each case three functionally different operating devices 130. As a result, functionally different operating devices 130 are provided at different heights in the treatment space 110 and moreover on different sides of the guide elements 138, as a result of which preferably an optimised, in particular accelerated, workpiece treatment can be made possible.

FIGS. 24 to 26 show the operating devices 130 on only one side of the treatment space 110. Preferably, on the opposite side of the treatment space 110 there is respectively provided an identical configuration of the guide elements 138 and the operating devices 130, wherein these may be arranged to be substantially symmetrical in relation to a vertical longitudinal centre plane of the treatment space 110 or indeed symmetrical in relation to a vertical longitudinal centre axis of the treatment space 110. Moreover, it may be provided for mutually different configurations of the guide elements 138 and the operating devices 130 to be provided on the two sides of the treatment space 110, for example the configuration according to FIG. 25 on one of the sides and the configuration according to FIG. 26 on the further side.

Figure 27:
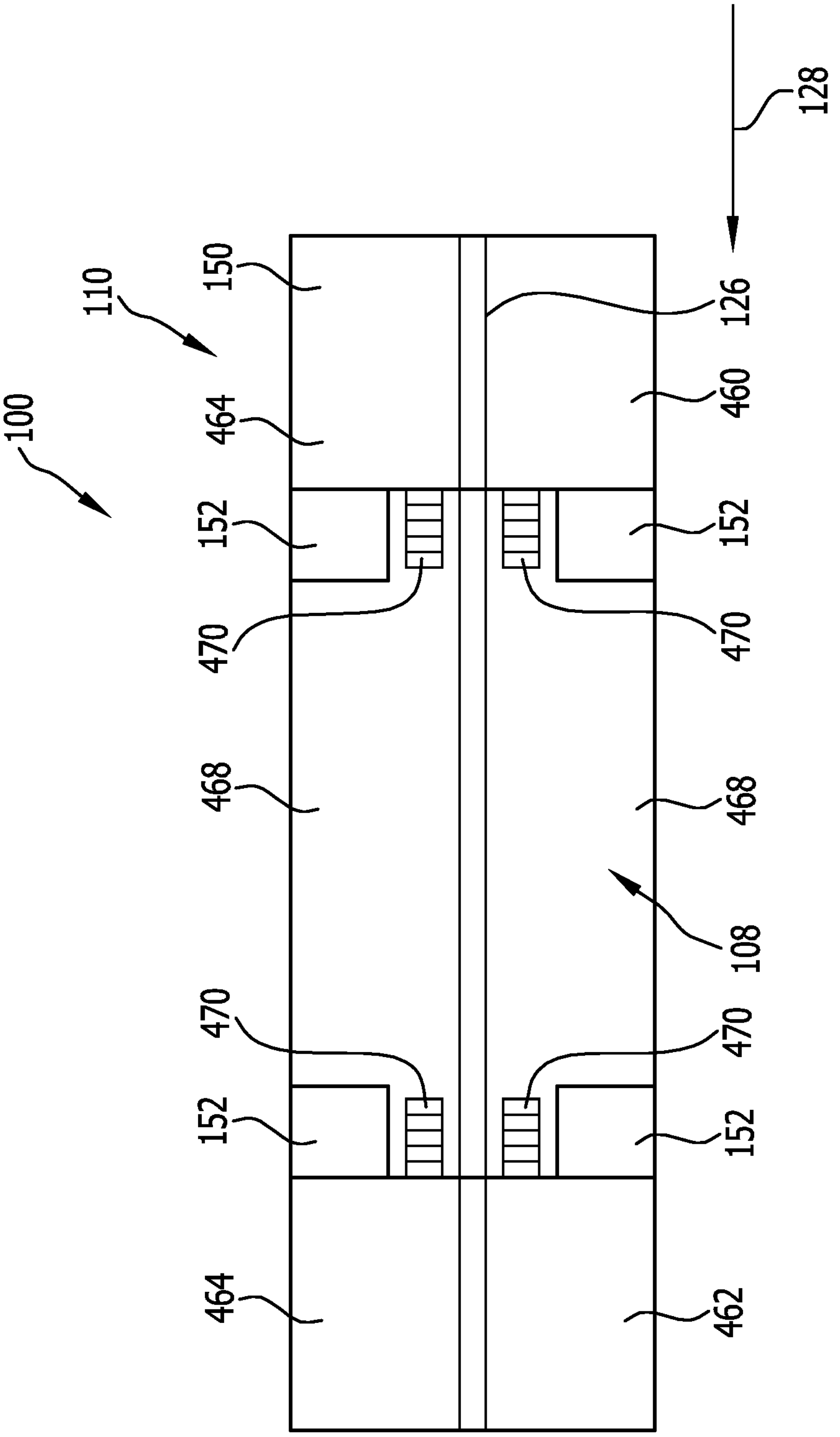
FIG. 27 shows a schematic illustration of the regions of a person-accessible floor of a treatment system, wherein the person-accessible floor has different height levels.

FIG. 27 shows a preferred embodiment of a person-accessible floor 150 of a treatment system 100. This embodiment may partly or entirely replace or be added to all the embodiments described above.

In the illustrated embodiment of the person-accessible floor 150, it is provided for this to extend at different height levels. The person-accessible floor 150 is in particular or comprises a grating floor.

Provided in an entry region 460 and/or an exit region 462 of the treatment space 110 is a normal level 464 of the person-accessible floor 150. The normal level 464 is in particular a height level that makes it possible to step over the conveying device 126 in a transverse direction 466, in particular while observing existing safety regulations.

Provided in the treatment region 108, in particular between the entry region 460 and the exit region 462, is preferably a sunken level 468 in which the person-accessible floor 150 is lower down than in the entry region 460 and/or exit region 462. In the region of the sunken level 468, the person-accessible floor 150 is preferably at least approximately 300 mm, for example at least approximately 400 mm, in particular approximately 500 mm, lower down than the normal level 464.

Preferably, a connection is made between the sunken level 468 and the normal level 464 by one or more flights of stairs 470, wherein the one or more flights of stairs 470 are for example arranged between two access regions 152, as seen in relation to a transverse direction 466 extending horizontally and perpendicularly to the direction of conveying 128, in particular on either side of the conveying device 126 for conveying the workpieces 102.

The height level in the access regions 152 may in particular be adapted to a desired access height for convenient access to the operating devices 130. For example, the normal level 464 or indeed a level higher up than the normal level 464 may be provided here. Further, a surrounding level 472 may optionally be provided in the access regions 152, such that persons can enter the access regions 152 from an area surrounding the treatment system 100 without navigating a height difference.

As a result of the different height levels of the person-accessible floor 150, preferably the advantage can be achieved that the operating devices 130 maintain a movement space that is higher up than floors which are continuous throughout, without this producing problems with work safety. Moreover, the use of the sunken level 468 can optimise flow around the workpiece 102, since in the vicinity of workpieces there are fewer interfering contours to affect flow.

Preferred embodiments are as follows:

1. A treatment system (100) for treating workpieces (102), in particular vehicle bodies (106), wherein the treatment system (100) comprises the following:
   a treatment region (108) for receiving workpieces (102) to be treated;
   one or more operating devices (130) for performing one or more operations on the workpieces (102) to be treated.
2. A treatment system (100) according to embodiment 1, characterised in that the treatment system (100) comprises at least one access region (152) from which and/or at which the one or more operating devices (130) are accessible, at least in an access condition of the one or more operating devices (130).
3. A treatment system (100) according to embodiment 2, characterised in that the treatment system (100) comprises one or more nozzles (304) for the purpose of supplying an infeed air stream, wherein by means of the one or more nozzles (304) an air curtain is producible, by means of which the treatment region (108) and the at least one access region (152) are separable from one another.
4. A treatment system (100) according to embodiment 3, characterised in that by means of one or more nozzles (304) the possibility that the air in the treatment region (108) flows into the at least one access region (152) is preventable.
5. A treatment system (100) according to one of embodiments 3 or 4, characterised in that by means of one or more nozzles (304) an exchange of air between the treatment region (108) and the one or more access regions (154) is preventable or at least minimisable.
6. A treatment system (100) according to one of embodiments 2 to 5, characterised in that the at least one access region (152) is a region that is spatially different from and/or separated from the treatment region (108).
7. A treatment system (100) according to one of embodiments 1 to 6, characterised in that a plurality of operating devices (130) are accessible, at least in an access condition thereof, from a common access region (152) and/or at a common access region (152).
8. A treatment system (100) according to one of embodiments 1 to 7, characterised in that one or more operating devices (130) are arranged and/or formed to be movable, and in that at least some of the one or more operating devices (130) are movable into the at least one access region (152) and/or up to the at least one access region (152).
9. A treatment system (100) according to one of embodiments 1 to 8, characterised in that the at least one access region (152) and the treatment region (108) are connected to one another by means of one or more approach openings (166) in one or more separating elements (154), in particular separating walls (156).
10. A treatment system (100) according to embodiment 9, characterised in that one or more nozzles (304), in particular slot nozzles (306), are arranged above, in relation to the direction of gravity (g), one or more approach openings (166), in particular directly above an upper edge (174) of the one or more approach openings (166).
11. A treatment system (100) according to embodiment 10, characterised in that the one or more nozzles (304) are arranged and take a form such that a main direction of flow of a gas stream applied by means of the nozzles, in particular an air stream, forms an angle (α, alpha) with the direction of gravity (g) of at least approximately 5°, in particular at least approximately 10°, and/or at most approximately 30°, in particular at most approximately 20°.
12. A treatment system (100) according to one of embodiments 9 to 11, characterised in that one or more deflection elements (302) are arranged above, in relation to the direction of gravity (g), one or more approach openings (166), in particular directly above an upper edge (174) of the one or more approach openings (166), wherein by means of the one or more deflection elements (302) an air stream, in particular a recirculating air stream, that is guided through the treatment region (108), downwards in the direction of gravity (g), is configured to be diverted away from the one or more approach openings (166).

13. A treatment system (100) according to embodiment 12, characterised in that an upper side of the deflection element (302), which deflects the air stream, forms an angle (β; beta) with the direction of gravity (g) of at least approximately 10°, in particular at least approximately 20°, and/or at most approximately 40°, in particular at most approximately 30°.

14. A treatment system (100) according to one of embodiments 9 to 13, characterised in that one or more nozzles (304), in particular slot nozzles (306), and one or more deflection elements (302) are arranged above, in relation to the direction of gravity (g), one or more approach openings (166), in particular directly above an upper edge (174) of the one or more approach openings (166), wherein the one or more nozzles (304) are arranged below the one or more deflection elements (304) and/or open into a spatial region arranged directly below the one or more deflection elements (304).

15. A treatment system (100) according to one of embodiments 9 to 14, characterised in that the one or more approach openings (166) and/or the one or more separating elements (154) are each provided with one or more diverting elements, in particular lateral diverting elements (310), by means of which an air flow is influenceable in an area surrounding the one or more approach openings (166).

16. A treatment system (100) according to embodiment 15, characterised in that one or more lateral diverting elements (310) are arranged in particular adjacent to and/or at a spacing from one or more side edges (176) of the one or more approach openings (166), wherein the one or more lateral diverting elements (310) preferably extend at least approximately vertically and/or at least approximately perpendicularly to the separating element (154) that receives or carries or supports the respective lateral diverting element (310).

17. A treatment system (100) according to one of embodiments 9 to 16, characterised in that one or more deflection elements (302), one or more nozzles (304) and/or one or more diverting elements, in particular lateral diverting elements (310), are arranged at a spacing from the respective approach opening (166) such that a separating element portion (308) that surrounds the respective approach opening (166) and is in particular planar is formed, along which and/or by means of which preferably an air stream that is as far as possible free of disruption and/or laminar is achievable.

18. A treatment system (100) according to one of embodiments 9 to 17, characterised in that one or more approach openings (166) each have a plurality of opening portions (320) by means of which differently dimensioned free cross sections of the respective approach opening (166) are clearable or blockable.

19. A treatment system (100) according to embodiment 18, characterised in that, depending on a respective operating mode of the treatment system (100) and/or depending on a respective maintenance operation or set-up operation at one or more operating devices (130), different opening portions (320) of the one or more approach openings (166) are clearable or blockable.

20. A treatment system (100) according to one of embodiments 1 to 19, characterised in that one or more operating devices (130) each have one or more operational elements (146), in particular one or more application elements and/or manipulating elements, and in that one or more of these operational elements (146), in particular all of the operational elements (146), are movable in part and/or entirely and/or simultaneously and/or successively into the access region (152) and/or are movable up to the access region (152).

21. A treatment system (100) according to one of embodiments 1 to 20, characterised in that the access region (152) is spatially separated from the treatment region (108) by means of one or more separating elements (154), in particular separating walls (156), and (a) in that the access region (152) is accessible to one or more operating devices (130) from the treatment region (108) through an approach opening (166), and/or (b) in that the access region (152) is accessible to a person from outside a housing (112) of the treatment system (100) through an admission opening (168), in particular a door (170).

22. A treatment system (100) according to one of embodiments 1 to 21, characterised in that the treatment system (100) comprises an air supply device (199) that comprises a recirculating air supply device (200) and/or an infeed air supply device (202), wherein, by means of the recirculating air supply device (200), a recirculating air stream (184) is guidable through the treatment region (108) multiple times, and/or wherein, by means of the infeed air supply device (202), one or more infeed air streams (186), in particular one or more fresh air streams and/or one or more streams of factory air, are suppliable to the one or more access regions (152).

23. A treatment system (100) according to embodiment 22, characterised in that, by means of the recirculating air supply device (200), the recirculating air stream (184) from the treatment region (108) and at least one infeed air stream (186) from the one or more access regions (152) are combinable into a common stream, and in that, by means of the recirculating air supply device (200), at least a stream part by volume of the common stream is suppliable to the treatment region (108) again, as a recirculating air stream (184).

24. A treatment system (100) according to one of embodiments 1 to 23, characterised in that the treatment system (100) comprises a control device by means of which the treatment system (100) is configured to be selectively put in different operating modes, wherein in particular one or more of the following operating modes are provided:

a treatment mode, in which one or more workpieces (102) are treated in the treatment region (108) by means of one or more operating devices (130), during which preferably no persons are or may be in the one or more access regions (152); and/or a safety mode, in which one or more workpieces (102) are treated in the treatment region (108) by means of one or more operating devices (130), during which preferably at least one person is or may be in the one or more access regions (152); and/or a maintenance mode, in which no treatment of workpieces (102) takes place in the treatment region (108).

25. A treatment system (100) according to embodiment 24, characterised in that, in safety mode, one or more operating devices (130), in particular one or more operational elements (146) of the one or more operating devices (130), are movable in particular successively in time into the at least one access region (152) and/or up to the at least one access region (152) such that a maintenance operation and/or a set-up operation is performable by a person.

26. A treatment system (100) according to one of embodiments 1 to 25, characterised in that the treatment system (100) comprises a conveying device (126) by means of which the workpieces (102) are conveyable in a direction of conveying (128) into the treatment region (108), through the treatment region (108) and/or out of the treatment region (108), wherein at least two access regions (152) are provided that are arranged and/or formed on mutually opposite sides of a vertical longitudinal centre plane (136) of the treatment system (100) running parallel to the direction of conveying (128).

27. A treatment system (100) according to one of embodiments 1 to 26, characterised in that the treatment system (100) comprises a conveying device (126) by means of which the workpieces (102) are conveyable in a direction of conveying (128) into the treatment region (108), through the treatment region (108) and/or out of the treatment region (108), wherein at least two access regions (152) are provided, of which at least one access region (152) is arranged upstream of the treatment region (108), as seen in the direction of conveying (128), and of which at least one further access region (152) is arranged downstream of the treatment region (108), as seen in the direction of conveying (128).

28. A treatment system (100) according to one of embodiments 1 to 27, characterised in that the treatment system (100) comprises one or more guide elements (138), in particular guide rails (140), on which there are displaceably arranged respectively one or more operating devices (130).

29. A treatment system (100) according to embodiment 28, characterised in that the guide elements (138) are formed and/or oriented in certain regions or entirely at least approximately parallel to one another and/or in certain regions or entirely at least approximately parallel to a direction of conveying (128) of a conveying device (126) of the treatment system (100).

30. A treatment system (100) according to one of embodiments 28 or 29, characterised in that the treatment system (100) comprises two or more than two guide elements (138) that are arranged on the same side in respect of a vertical longitudinal centre plane (136) of the treatment system (100), in particular on a side wall (114) of a housing (112) of the treatment system (100) that surrounds the treatment region (108).

31. A treatment system (100) according to one of embodiments 28 to 30, characterised in that the treatment system (100) comprises two or more than two guide elements (138) that are arranged on mutually opposite sides in respect of a vertical longitudinal centre plane (136) of the treatment system (100), in particular on mutually opposite side walls (114) of a housing (112) of the treatment system (100) that surrounds the treatment region (108).

32. A treatment system (100) according to one of embodiments 28 to 31, characterised in that the treatment system (100) comprises a conveying device (126) by means of which the workpieces (102) are conveyable in a direction of conveying (128), into the treatment region (108), through the treatment region (108) and/or out of the treatment region (108), wherein one or more guide elements (138) are arranged below the conveying device (126), in relation to the direction of gravity (g), in particular entirely below an upper side of the conveying device (126) that upwardly delimits the conveying device (126), as seen in the direction of gravity (g).

33. A treatment system (100) according to one of embodiments 28 to 32, characterised in that a plurality of operating devices (130) are displaceable past one another in a guide direction (of one or more guide elements (138) of the treatment system (100) and/or in a direction of conveying (128) of a conveying device (126) of the treatment system (100).

34. A treatment system (100) according to one of embodiments 28 to 33, characterised in that one or more guide elements (138) of the treatment system (100) each guide exactly two or more than two operating devices (130).

35. A treatment system (100) according to one of embodiments 28 to 34, characterised in that there is associated with a plurality of operating devices (130) a common access region (152), from which and/or at which the operating devices (130) are accessible, at least in an access condition thereof.

36. A treatment system (100) according to embodiment 35, characterised in that a common access region (152) is associated with two or more than two operating devices (130) that are guided on mutually different guide elements (138) of the treatment system (100).

37. A treatment system (100) according to one of embodiments 28 to 36, characterised in that the treatment system (100) comprises one or more fixed operating devices (1300 and one or more movable operating devices (**130*b***).

38. A treatment system (100) according to embodiment 37, characterised in that the one or more fixed operating devices (1300 are arranged between one or more movable operating devices (**130*b*) on the one hand and an access region (152) on the other, in particular in relation to a direction of conveying (128) of a conveying device (126) of the treatment system (100**).

39. A treatment system (100) according to one of embodiments 37 and 38, characterised in that the one or more fixed operating devices (1300 and the one or more movable operating devices (**130*b*) are associated with a common access region (152**).

40. A treatment system (100) according to one of embodiments 28 to 39, characterised in that there is arranged between two guide elements (138), in a guide direction of one or more guide elements (138) of the treatment system (100) and/or in a direction of conveying (128) of a conveying device (126) of the treatment system (100), an access region (152) from which and/or at which at least two operating devices (130) that are guided on the two guide elements (138) are accessible, at least in an access condition of the operating devices (130).

41. A treatment system (100) according to one of embodiments 28 to 40, characterised in that a respective access region (152) is arranged at mutually opposite end regions of one or more guide elements (138), in a guide direction of one or more guide elements (138) of the treatment system (100) and/or in a direction of conveying (128) of a conveying device (126) of the treatment system (100).

42. A treatment system (100) according to one of embodiments 1 to 41, characterised in that the treatment system (100) comprises an at least approximately cuboid treatment space that, substantially centrally, comprises the treatment region (108), wherein there are arranged and/or formed in one, two, three or four corner regions (188) of the treatment space (110) one, two, three or four access regions (152).

43. A treatment system (100) according to one of embodiments 1 to 42, characterised in that the treatment system (100) comprises a treatment line that comprises a plurality of treatment regions (108) succeeding one another in a conveying direction (128) of a conveying device (126) of the treatment system (100), wherein arranged between two treatment regions (108) are in each case one or more access regions (152) from which and/or at which at least two operating devices (130) are accessible for the purpose of performing operations in mutually different treatment regions (108), at least in an access condition of the operating devices (130).
44. A method for treating workpieces (102), in particular vehicle bodies (106), wherein in the method one or more operations are performed on the workpieces (102) in a treatment region (108) by means of one or more operating devices (130).
45. A method according to embodiment 44, characterised in that the one or more operating devices (130) are accessible, at least in an access condition thereof, preferably from at least one access region (152) and/or at at least one access region (152), in particular for the purpose of performing maintenance operations and/or set-up operations.
46. A method according to one of embodiments 44 or 45, characterised in that the treatment system (100) is selectively put in different operating modes, wherein in particular one or more of the following operating modes are provided:
    - a treatment mode, in which one or more workpieces (102) are treated in the treatment region (108) by means of one or more operating devices (130), during which preferably no persons are or may be in the one or more access regions (152); and/or
    - a safety mode, in which one or more workpieces (102) are treated in the treatment region (108) by means of one or more operating devices (130), during which preferably at least one person is or may be in the one or more access regions (152); and/or
    - a maintenance mode, in which no treatment of workpieces (102) takes place in the treatment region (108).
47. A method according to one of embodiments 44 to 46, characterised in that operating devices (130) that are different from one another are successively put in an access condition, and in that at least one maintenance operation and/or at least one set-up operation is performed on each of them, while one or more treatment operations for treating the workpieces (102) are performed, in particular are continued and/or maintained uninterrupted, by means of one or more operating devices (130) that are not in the access condition.
48. A method according to one of embodiments 44 to 47, characterised in that by means of one or more nozzles 304) of the treatment system (100), an air curtain is produced, by means of which the treatment region (108) and the at least one access region (152) are separated from one another.

LIST OF REFERENCE NUMERALS

100 Treatment system
102 Workpiece
104 Painting system
106 Vehicle body
108 Treatment region
110 Treatment space
112 Housing
114 Side wall
116 Inlet side
118 Supply opening
120 Outlet side
122 Base wall
124 Cover wall
126 Conveying device
128 Direction of conveying
130 Operating device
**130*f*** Fixed operating device
**130*b*** Movable operating device
132 Application robot
134 Manipulating robot
136 Longitudinal centre plane
138 Guide element
140 Guide rail
142 Guide direction
144 Operational base
146 Operational element
148 Operational arm
150 Person-accessible floor
152 Access region
154 Separating element
156 Separating wall
158 Shaft wall
160 Maintenance shaft
162 Inlet
164 Outlet
166 Approach opening
168 Admission opening
170 Door
172 Lower edge
174 Upper edge
176 Side edge
177 High-risk region
178 Low-risk region
180 Intermediate-risk region
182 Filter cover
184 Recirculating air stream
186 Infeed air stream
188 Corner region
190 Separation region
192 Guiding-away opening
194 Valve
196 Treatment line
198 Treatment box
199 Air supply device
200 Recirculating air supply
202 Infeed air supply
204 Plenum
206 Stripping device
208 Raw gas shaft
210 Exhaust air guide
300 Air curtain device
302 Deflection element
304 Nozzle
306 Slot nozzle
308 Separating element portion
310 Lateral diverting element
312 Nozzle casing
314 Distributor duct
316 Supply duct 318 Fan nozzle
320 Opening portion
440 Blocking element
402 Damper
404 Door
460 Entry region
462 Exit region
464 Normal level
466 Transverse direction
468 Sunken level
470 Flight of stairs
472 Surrounding level
α Angle
β Angle
g Direction of gravity
H Height
A External painting robot
I Internal painting robot
S Manipulating robot

The invention claimed is:

1. A treatment system for treating workpieces, the treatment system comprising:
a treatment region for receiving workpieces to be treated; and
one or more operating devices for performing one or more operations on the workpieces to be treated,
wherein the treatment system includes at least one access region from which and/or at which the one or more operating devices are accessible, at least in an access condition of the one or more operating devices, and wherein the treatment region and the at least one access region are sub-regions inside a treatment space of the treatment system that is surrounded by a housing.

2. A treatment system according to claim 1, wherein the treatment system includes one or more nozzles for the purpose of supplying an infeed air stream, and wherein by the one or more nozzles an air curtain is producible, by which the treatment region and the at least one access region are separable from one another.

3. A treatment system according to claim 2, wherein by one or more nozzles the possibility that the air in the treatment region flows into the at least one access region is preventable.

4. A treatment system according to claim 2, wherein by one or more nozzles an exchange of air between the treatment region and the one or more access regions is preventable or at least minimizable.

5. A treatment system according to claim 1, wherein the at least one access region is a region that is spatially different from and/or separated from the treatment region.

6. A treatment system according to claim 1, wherein a plurality of operating devices are accessible, at least in an access condition thereof, from a common access region and/or at a common access region.

7. A treatment system according to claim 1, wherein one or more operating devices are arranged and/or formed to be movable, and wherein at least some of the one or more operating devices are movable into the at least one access region and/or up to the at least one access region.

8. A treatment system according to claim 1, wherein the at least one access region and the treatment region are connected to one another by one or more approach openings in one or more separating elements, optionally separating walls.

9. A treatment system according to claim 8, wherein one or more nozzles are arranged above, in relation to the direction of gravity (g), one or more approach openings, directly above an upper edge of the one or more approach openings.

10. A treatment system according to claim 9, wherein the one or more nozzles are arranged and take a form such that a main direction of flow of a gas stream applied by the nozzles, optionally an air stream, forms an angle (α, alpha) with the direction of gravity (g) of at least approximately 5°, in particular at least approximately 10°, and/or at most approximately 30°, optionally at most approximately 20°.

11. A treatment system according to claim 8, wherein one or more deflection elements are arranged above, in relation to the direction of gravity (g), one or more approach openings, in particular directly above an upper edge of the one or more approach openings, wherein by the one or more deflection elements an air stream, optionally a recirculating air stream, that is guided through the treatment region, downwards in the direction of gravity (g), is configured to be diverted away from the one or more approach openings.

12. A treatment system according to claim 11, wherein an upper side of the deflection element, which deflects the air stream, forms an angle (β; beta) with the direction of gravity (g) of at least approximately 10°, optionally at least approximately 20°, and/or at most approximately 40°, optionally at most approximately 30°.

13. A treatment system according to claim 8, wherein one or more nozzles, in particular slot nozzles, and one or more deflection elements are arranged above, in relation to the direction of gravity (g), one or more approach openings, optionally directly above an upper edge of the one or more approach openings, wherein the one or more nozzles are arranged below the one or more deflection elements and/or open into a spatial region arranged directly below the one or more deflection elements.

14. A treatment system according to claim 8, wherein the one or more approach openings and/or the one or more separating elements are each provided with one or more diverting elements, optionally lateral diverting elements, by which an air flow is influenceable in an area surrounding the one or more approach openings.

15. A treatment system according to claim 14, wherein one or more lateral diverting elements are arranged optionally adjacent to and/or at a spacing from one or more side edges of the one or more approach openings, wherein the one or more lateral diverting elements preferably extend at least approximately vertically and/or at least approximately perpendicularly to the separating element that receives or carries or supports the respective lateral diverting element.

16. A treatment system according to claim 8, wherein one or more deflection elements, one or more nozzles and/or one or more diverting elements are arranged at a spacing from the respective approach opening such that a separating element portion that surrounds the respective approach opening and is planar is formed, along which and/or by which an air stream that is as far as possible free of disruption and/or laminar is achievable.

17. A treatment system according to claim 8, wherein one or more approach openings each have a plurality of opening portions by which differently dimensioned free cross sections of the respective approach opening are clearable or blockable.

18. A treatment system according to claim 17, wherein, depending on a respective operating mode of the treatment system and/or depending on a respective maintenance operation or set-up operation at one or more operating devices, different opening portions of the one or more approach openings are clearable or blockable.

19. A treatment system according to claim 1, wherein one or more operating devices each have one or more operational elements and wherein one or more of these operational elements are movable in part and/or entirely and/or simultaneously and/or successively into the access region and/or are movable up to the access region.

20. A treatment system according to claim 1, wherein the access region is spatially separated from the treatment region by one or more separating elements, and (a) wherein the access region is accessible to one or more operating devices from the treatment region through an approach opening, and/or (b) wherein the access region is accessible to a person from outside a housing of the treatment system through an admission opening.

21. A treatment system according to claim 1, wherein the treatment system includes an air supply device that includes a recirculating air supply device and/or an infeed air supply device, wherein, by the recirculating air supply device, a recirculating air stream is guidable through the treatment region multiple times, and/or wherein, by the infeed air supply device, one or more infeed air streams are suppliable to the one or more access regions.

22. A treatment system according to claim 21, wherein, by the recirculating air supply device, the recirculating air stream from the treatment region and at least one infeed air stream from the one or more access regions are combinable into a common stream, and wherein, by the recirculating air supply device, at least a stream part by volume of the common stream is suppliable to the treatment region again, as a recirculating air stream.

23. A treatment system according to claim 1, wherein the treatment system includes control device by which the treatment system is configured to be selectively put in different operating modes, wherein one or more of the following operating modes are provided:

a treatment mode, in which one or more workpieces are treated in the treatment region by one or more operating devices, during which no persons are or may be in the one or more access regions;

a safety mode, in which one or more workpieces are treated in the treatment region by one or more operating devices, during which at least one person is or may be in the one or more access regions; and/or a maintenance mode, in which no treatment of workpieces takes place in the treatment region.

24. A treatment system according to claim 23, wherein, in the safety mode, one or more operating devices, optionally one or more operational elements of the one or more operating devices, are movable optionally successively in time into the at least one access region and/or up to the at least one access region such that a maintenance operation and/or a set-up operation is performable by a person.

25. A treatment system according to claim 1, wherein the treatment system includes a conveying device by which the workpieces are conveyable in a direction of conveying into the treatment region, through the treatment region and/or out of the treatment region, wherein at least two access regions are provided that are arranged and/or formed on mutually opposite sides of a vertical longitudinal centre plane of the treatment system running parallel to the direction of conveying.

26. A treatment system according to claim 1, wherein the treatment system includes a conveying device by which the workpieces are conveyable in a direction of conveying into the treatment region, through the treatment region and/or out of the treatment region, wherein at least two access regions are provided, of which at least one access region is arranged upstream of the treatment region, as seen in the direction of conveying, and of which at least one further access region is arranged downstream of the treatment region, as seen in the direction of conveying.

* * * * *